United States Patent
Lee et al.

(10) Patent No.: US 11,914,572 B2
(45) Date of Patent: *Feb. 27, 2024

(54) ADAPTIVE QUERY ROUTING IN A REPLICATED DATABASE ENVIRONMENT

(71) Applicant: SAP SE, Walldorf (DE)

(72) Inventors: Juchang Lee, Seoul (KR); Kyu Hwan Kim, Seoul (KR); Joo Yeon Lee, Seoul (KR); Kyungyul Park, Seoul (KR); Deok Hoe Kim, Seoul (KR)

(73) Assignee: SAP SE, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/087,712

(22) Filed: Dec. 22, 2022

(65) Prior Publication Data

US 2023/0129099 A1  Apr. 27, 2023

Related U.S. Application Data

(63) Continuation of application No. 15/589,160, filed on May 8, 2017, now Pat. No. 11,573,947.

(51) Int. Cl.
*G06F 16/23* (2019.01)
*G06F 16/248* (2019.01)
(Continued)

(52) U.S. Cl.
CPC ...... *G06F 16/2329* (2019.01); *G06F 11/2035* (2013.01); *G06F 11/2094* (2013.01); *G06F 11/2097* (2013.01); *G06F 16/2322* (2019.01); *G06F 16/2379* (2019.01); *G06F 16/248* (2019.01); *G06F 16/2471* (2019.01); *G06F 16/27* (2019.01); *H04L 67/1095* (2013.01); *G06F 11/1658* (2013.01); *G06F 11/2048* (2013.01); *G06F 2201/80* (2013.01)

(58) Field of Classification Search
CPC .................................................. G06F 16/2429
See application file for complete search history.

(56) References Cited

U.S. PATENT DOCUMENTS 6,070,191 A   5/2000   Narendran et al.
7,305,421 B2  12/2007  Cha et al.
(Continued)

FOREIGN PATENT DOCUMENTS

EP   2653986   10/2013
EP   2738695   6/2014
(Continued)

*Primary Examiner* — Mohammad S Rostami
(74) *Attorney, Agent, or Firm* — Klarquist Sparkman, LLP

(57) ABSTRACT

Technologies are described providing adaptive query routing in a replicated database environment. The technologies can be used with a variety of replication protocols. Prepared statements, such as for queries, from a database client can be routed to a source node, or a source node and available replica nodes, when a replica node becomes unavailable. When a replica node becomes available again, a prepared statement can be updated to indicate that the updated prepared statement can be executed at nodes including the replica node that is available again. Prepared statement routing can also be used when a portion of replicated data becomes unavailable at a replica node, but a portion of replicated data remains available.

40 Claims, 23 Drawing Sheets

(51) Int. Cl.
*G06F 16/27* (2019.01)
*G06F 16/2458* (2019.01)
*G06F 11/20* (2006.01)
*H04L 67/1095* (2022.01)
*G06F 11/16* (2006.01)

(56) References Cited

U.S. PATENT DOCUMENTS

| | | |
|---|---|---|
| 7,685,109 B1 | 3/2010 | Ransil |
| 8,301,593 B2 * | 10/2012 | Hoffmann .......... G06F 11/2094 |
| | | 707/658 |
| 8,442,962 B2 | 5/2013 | Lee et al. |
| 8,700,660 B2 | 4/2014 | Lee et al. |
| 8,768,927 B2 | 7/2014 | Yoon et al. |
| 8,782,100 B2 | 7/2014 | Yoon et al. |
| 8,793,276 B2 | 7/2014 | Lee et al. |
| 8,903,779 B1 | 12/2014 | Holenstein et al. |
| 8,918,436 B2 | 12/2014 | Yoon et al. |
| 8,935,205 B2 | 1/2015 | Hildenbrand et al. |
| 9,009,182 B2 | 4/2015 | Renkes et al. |
| 9,037,677 B2 | 5/2015 | Lee et al. |
| 9,063,969 B2 | 6/2015 | Lee et al. |
| 9,098,522 B2 | 8/2015 | Lee et al. |
| 10,176,222 B2 | 1/2019 | Schneider et al. |
| 2003/0061537 A1 | 3/2003 | Cha et al. |
| 2004/0254948 A1 | 12/2004 | Yao |
| 2005/0138073 A1 | 6/2005 | Zhou et al. |
| 2006/0200507 A1 | 9/2006 | Holstein et al. |
| 2007/0008890 A1 | 1/2007 | Tseitin et al. |
| 2007/0088684 A1 | 4/2007 | Chan et al. |
| 2007/0168336 A1 * | 7/2007 | Ransil ................ G06F 16/958 |
| 2008/0065670 A1 | 5/2008 | Cha et al. |
| 2008/0163062 A1 | 7/2008 | Lee et al. |
| 2009/0138848 A1 | 5/2009 | Okubo |
| 2010/0005124 A1 | 1/2010 | Wagner |
| 2011/0225121 A1 | 9/2011 | Cooper |
| 2011/0302566 A1 | 12/2011 | Abadi et al. |
| 2012/0023209 A1 * | 1/2012 | Fletcher .......... H04L 12/40195 |
| | | 709/223 |
| 2012/0084273 A1 | 4/2012 | Lee et al. |
| 2012/0084274 A1 | 4/2012 | Renkes et al. |
| 2012/0084315 A1 * | 4/2012 | Schneider ........ G06F 16/24558 |
| | | 707/769 |
| 2012/0102006 A1 | 4/2012 | Larson et al. |
| 2012/0105424 A1 | 5/2012 | Lee et al. |
| 2012/0124413 A1 | 5/2012 | Bauer et al. |
| 2012/0124431 A1 | 5/2012 | Bauer et al. |
| 2012/0166407 A1 | 6/2012 | Lee et al. |
| 2012/0167098 A1 | 6/2012 | Lee et al. |
| 2013/0124475 A1 | 5/2013 | Hildenbrand et al. |
| 2013/0166534 A1 | 6/2013 | Yoon et al. |
| 2013/0166553 A1 | 6/2013 | Yoon et al. |
| 2013/0166554 A1 | 6/2013 | Yoon et al. |
| 2013/0235000 A1 | 9/2013 | Lee et al. |
| 2013/0275457 A1 | 10/2013 | Lee et al. |
| 2013/0275467 A1 | 10/2013 | Lee et al. |
| 2013/0275468 A1 | 10/2013 | Lee et al. |
| 2013/0275550 A1 | 10/2013 | Lee et al. |
| 2013/0290282 A1 | 10/2013 | Faerber et al. |
| 2013/0304714 A1 | 11/2013 | Lee et al. |
| 2014/0122439 A1 | 5/2014 | Faerber et al. |
| 2014/0122452 A1 | 5/2014 | Faerber et al. |
| 2014/0136473 A1 | 5/2014 | Faerber et al. |
| 2014/0136788 A1 | 5/2014 | Faerber et al. |
| 2014/0149353 A1 | 5/2014 | Lee et al. |
| 2014/0149368 A1 | 5/2014 | Lee et al. |
| 2014/0149527 A1 | 5/2014 | Lee et al. |
| 2014/0156619 A1 | 6/2014 | Lee et al. |
| 2014/0201126 A1 | 7/2014 | Zadeh et al. |
| 2014/0222418 A1 | 8/2014 | Richtarsky et al. |
| 2014/0244628 A1 | 8/2014 | Yoon et al. |
| 2014/0297686 A1 | 10/2014 | Lee et al. |
| 2014/0304219 A1 | 10/2014 | Yoon et al. |
| 2014/0337393 A1 | 11/2014 | Burchall et al. |
| 2015/0074082 A1 | 5/2015 | Yoon et al. |
| 2015/0149409 A1 | 5/2015 | Lee et al. |
| 2015/0149413 A1 | 5/2015 | Lee et al. |
| 2015/0149426 A1 | 5/2015 | Kim et al. |
| 2015/0149704 A1 | 5/2015 | Lee et al. |
| 2015/0149736 A1 | 5/2015 | Kwon et al. |
| 2015/0178343 A1 | 6/2015 | Renkes et al. |
| 2015/0242400 A1 | 8/2015 | Bensberg et al. |
| 2015/0242451 A1 | 8/2015 | Bensberg et al. |
| 2015/0261805 A1 | 9/2015 | Lee et al. |
| 2016/0110434 A1 | 4/2016 | Kakaraddi et al. |
| 2016/0140175 A1 | 5/2016 | Weyerhaeuser et al. |
| 2016/0171090 A1 | 6/2016 | Schwartz et al. |
| 2016/0283331 A1 | 9/2016 | Barber et al. |
| 2016/0371319 A1 | 12/2016 | Park et al. |
| 2017/0034040 A1 | 2/2017 | Pettovello |
| 2017/0060702 A1 | 3/2017 | Dave et al. |
| 2017/0091003 A1 | 3/2017 | Das et al. |
| 2017/0103106 A1 | 4/2017 | Kass |
| 2017/0177658 A1 | 6/2017 | Lee et al. |
| 2017/0177697 A1 | 6/2017 | Lee et al. |
| 2017/0193054 A1 | 7/2017 | Tang et al. |
| 2017/0201451 A1 | 7/2017 | Allan |
| 2018/0322157 A1 | 11/2018 | Lee et al. |

FOREIGN PATENT DOCUMENTS

| | | |
|---|---|---|
| WO | WO 2012/067910 | 5/2012 |
| WO | WO 2012/069091 | 5/2012 |

\* cited by examiner

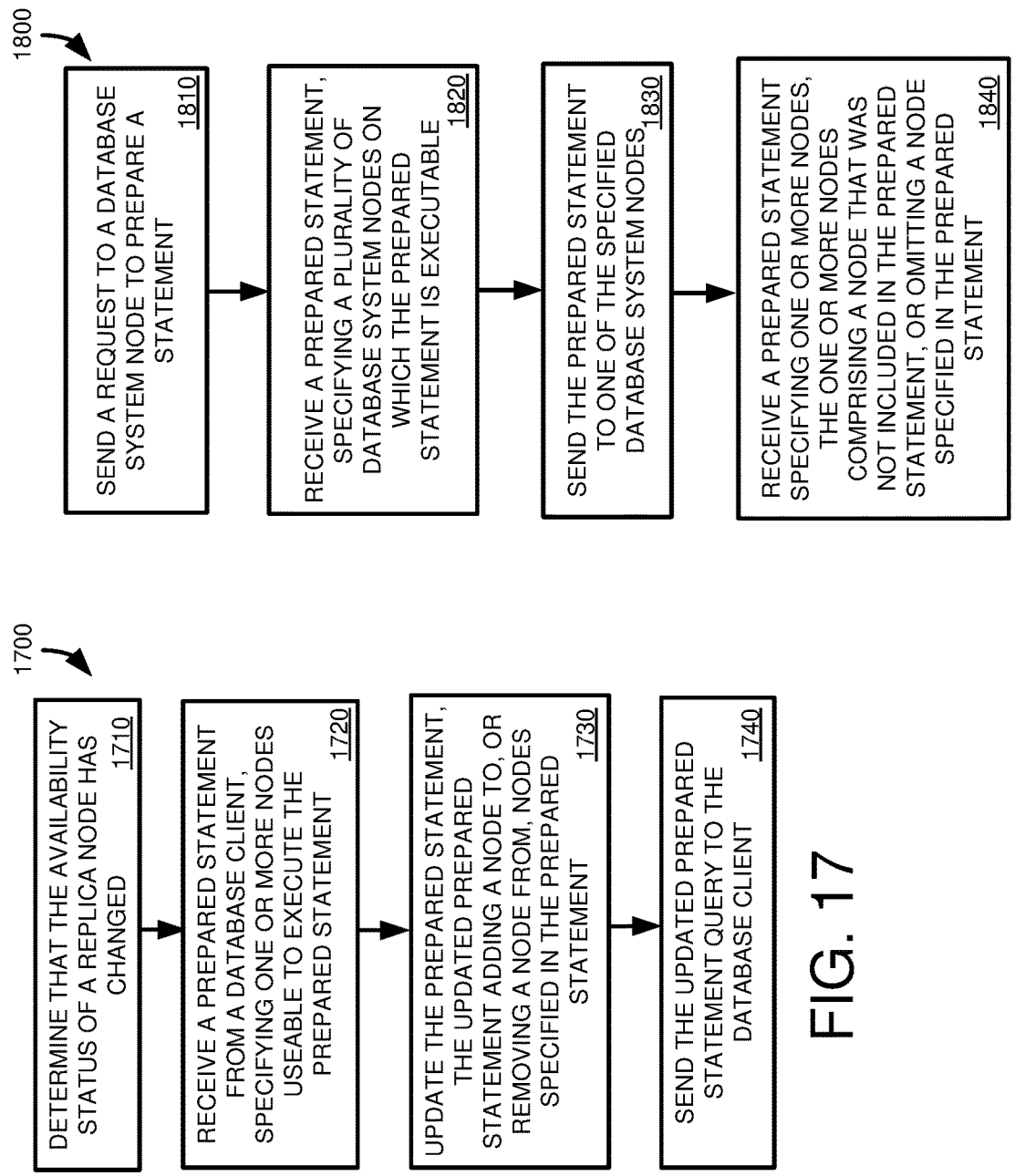

ADAPTIVE QUERY ROUTING IN A REPLICATED DATABASE ENVIRONMENT

CROSS REFERENCE TO RELATED APPLICATIONS

This application is a continuation of U.S. patent application Ser. No. 15/589,160, filed on May 8, 2017, which is hereby incorporated herein by reference.

FIELD

The present disclosure generally relates to the replication of information. Particular implementations relate to routing of prepared statements, such as for queries, to nodes in a replicated database environment.

BACKGROUND

Database performance can be enhanced by creating a replica of a source table. For example, the replicated table may be hosted on a different computing system than the source table, with the source and replica hosts having different processors. Having replicas available to service database read requests can help balance computing loads among multiple processors, improving system performance. In some cases, replicas can also be used for "high-availability data" purposes, such as when the replica is able to take over one or more functions of the source table if the source table becomes unavailable.

Challenges in replicated systems include maintaining consistency between the source table and the replica table. Replication can also result in reduced system performance if the overhead associated with replication is too high. For example, in typical synchronous replication protocols, the replica is updated within the same transaction boundary as the source. However, this can result in delayed transaction visibility at both the source and replica hosts, as synchronous replication typically involves multiple communications between the computing system hosting the source table and the computing system hosting the replica table. In some cases, performance can be improved by asynchronously replicating changes to the replica table.

When replicated database systems are used to handle a larger volume of database requests, such as read requests, issues can arise if a replica to which a request is directed is not available to serve the request. For instance, if a read request is routed (or indicated for routing) to a replica node that has crashed or is otherwise offline, the read request may return an error to the database client. In at least some cases, the read request may not be processable until the replica node comes back online or specific corrective action is taken, which may be outside of the technical expertise of a user of the database system who issued the read request, and, in any event, may significantly delay processing of the read request. In other cases, replication may be deactivated, with all database operations being routed to the source database system, which can greatly degrade the performance of the database system. Thus, room for improvement remains in replicated, distributed database systems.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and solutions are described for facilitating prepared statement execution in a replicated database environment, such for executing queries. The database environment includes at least one source node, at least one replica node, and a database client.

In one aspect, a database system node determines that the availability status of a replica node has changed. The database system node receives a prepared statement, such as for a query, from a database client. The prepared statement specifies one or more nodes usable to execute the prepared statement. The prepared statement is updated. The updating includes adding a node to the one or more nodes of the prepared statement, such as if the replica node became available, or removing at least one of the one or more nodes from the prepared statement, such as if the replica node became unavailable.

In another aspect, the database client sends a request to a database system node to prepare a statement. The database client receives a prepared statement from the database system node. The prepared statement specifies at least one database system node on which the prepared statement is executable. The prepared statement is sent by the database client to the at least one database system node. The database client receives an updated prepared statement. The updated prepared statement specifies one or more nodes on which the updated prepared statement is executable. The one or more nodes on which the updated prepared statement is executable include a node that was not specified in the prepared statement, or omits the at least one database system node specified in the prepared statement.

In yet another aspect, a node of a plurality of database system nodes in a replicated database environment determines that an availability status of a replica node of the replicated database environment has changed. The availability status change is recorded in a data store that includes availability status for nodes of the replicated database system. A metadata identifier is incremented at the node. A prepared statement is received by the node from a database client. The prepared statement is associated with a version timestamp. The version timestamp is compared with the incremented metadata identifier. It is determined that the prepared statement should be updated. The prepared statement is updated using the availability status information of the data store. The updated prepared statement is sent to the database client.

As described herein, a variety of other features and advantages can be incorporated into the technologies as desired.

BRIEF DESCRIPTION OF THE DRAWINGS

FIG. 17 is a flowchart of example operations, at a database system node, relating to query/prepared statement routing when a replica node of the database system experiences a change in availability status.

FIG. 18 is a flowchart of example operations at a database client relating to requesting the compiling of a prepared statement, and execution of a prepared statement.

DETAILED DESCRIPTION

Example 1

Overview

Figure 1:
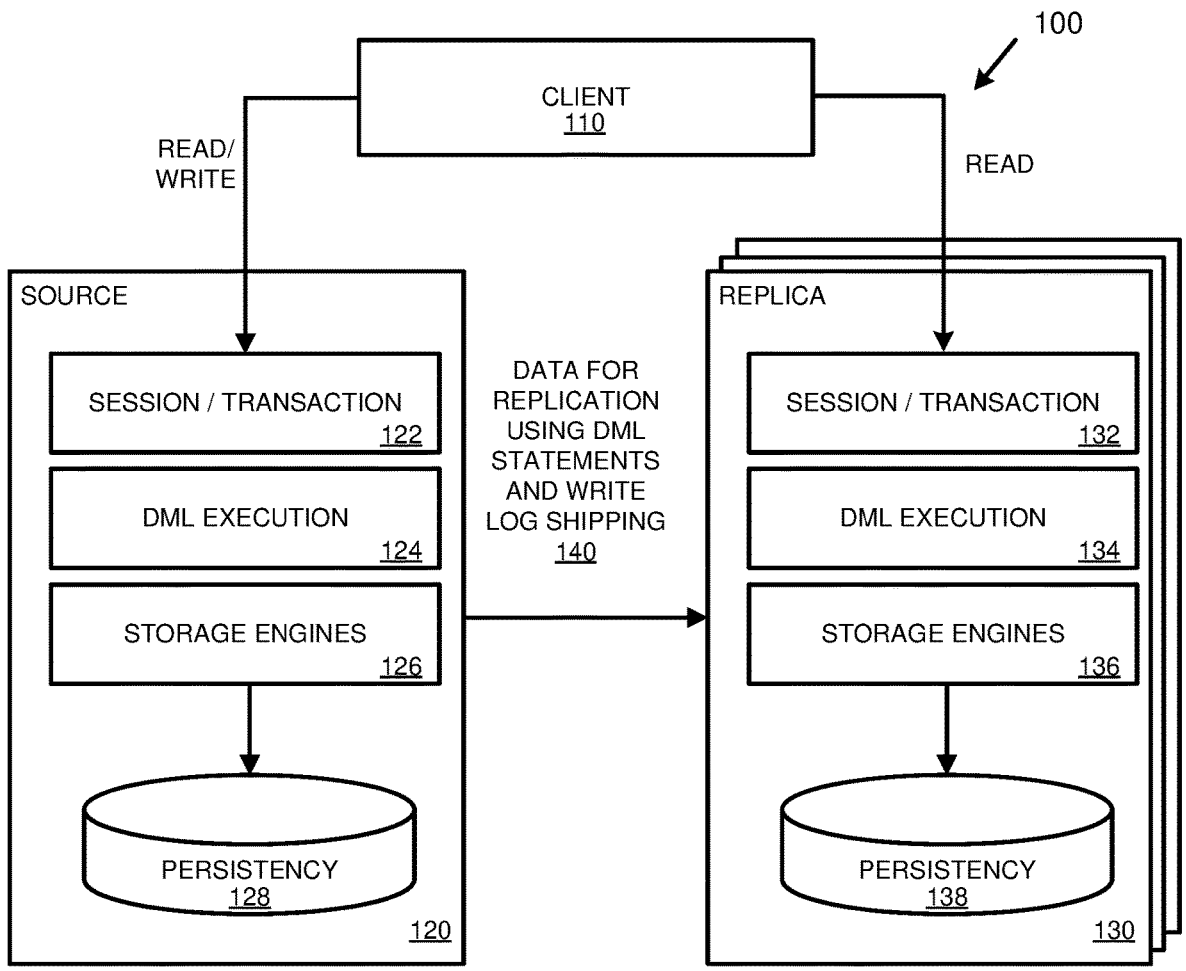
FIG. 1 is a diagram of an environment supporting replication using DML statements and write log shipping.

Database performance can be enhanced by creating a replica of a source table. For example, the replicated table may be hosted on a different computing system than the source table, with the source and replica hosts having different processors. Having replicas available to service database read requests can help balance computing loads among multiple processors, improving system performance. In some cases, replicas can also be used for "high-availability data" purposes, such as when the replica is able to take over one or more functions of the source table if the source table becomes unavailable.

Challenges in replicated systems include maintaining consistency between the source table and the replica table. Replication can also result in reduced system performance if the overhead associated with replication is too high. For example, in typical synchronous replication protocols, the replica is updated within the same transaction boundary as the source. However, this can result in delayed transaction visibility at both the source and replica hosts, as synchronous replication typically involves multiple communications between the computing system hosting the source table and the computing system hosting the replica table. In some cases, performance can be improved by asynchronously replicating changes to the replica table.

When replicated database systems are used to handle a larger volume of database requests, such as read requests, issues can arise if a replica to which a request is directed is not available to serve the request. For instance, if a read request is routed (or indicated for routing) to a replica node that has crashed or is otherwise offline, the read request may return an error to the database client. In at least some cases, the read request may not be processable until the replica node comes back online or specific corrective action is taken, which may be outside of the technical expertise of a user of the database system who issued the read request, and, in any event, may significantly delay processing of the read request. In other cases, replication may be deactivated, with all database operations being routed to the source database system, which can greatly degrade the performance of the database system. Thus, room for improvement remains in replicated, distributed database systems.

The present disclosure provides for rerouting of read requests, such as queries, directed to a replica database node that is inactive, or having data (e.g., tables or records) that are otherwise unavailable at the replica node. The read requests can be represented by a prepared statement, which can be associated, for example, with an execution plan stored on a database node. A replica node that is inactive can be a replica node that cannot be reached by a database client, such as because the replica node has crashed or is offline. In some cases, a replica node can be considered inactive even if it has not crashed, and is not offline, such as if there is a network error that is preventing the client, or a source node, from communicating with the replica node, or if the replica node is out of memory. In some cases, only a portion of data at a replica may be unavailable, such as if a process having a lock on certain tables or records becomes deadlocked, but other processes, involving other tables or records, are not deadlocked, as the replica node is otherwise available and functional.

In some cases, when a replica node is determined to be unavailable, completely, or, in some cases, for particular data, rather than returning an error to the database client, a read request can be routed to the source node. In other cases, when a replica node is determined to be unavailable, in whole or part, the read request can be routed to the source node or any operational replica node having the replicated data. Routing the read request to any available node can help preserve the benefits of the replicated database environment, even if not all of the replica nodes are fully available. In either case, when a replica node becomes available again, read requests can once again be routed to the replica node.

The disclosed innovations can provide a number of advantages. In particular, the disclosed innovations can allow read requests directed to non-operational replica nodes to be executed, rather than simply returning an error. Redirecting read requests to any available node can help preserve the benefits of replication even if not all replica nodes are available. The database system can automatically resume normal operation when a replica node that was not fully operational becomes fully operational. Thus, the disclosed innovations can provide database systems that are less error-prone, provide improved throughput of read requests, and which are easier to maintain.

Example 2

Distributed and/or Replicated Database Environment

Database performance can be enhanced by creating a replica of a source table. For example, the replicated table may be hosted on a different computing system than the source table, with the source and replica hosts having different processors. Having replicas available to service database read requests can help balance computing loads among multiple processors, improving system performance. In some cases, replicas can also be used for "high-availability data" purposes, such as when the replica is able to take over one or more functions of the source table if the source table becomes unavailable.

The following description is directed to techniques and solutions for accessing data in a replicated database environment. Although the disclosed innovations are not limited to any particular data replication technique, efficient replication of database data can be performed using data manipulation (DML) statements and write log shipping. As used herein, a DML statement refers to any statement, command, message, or other instruction that specifies any manipulation (e.g., insert, update, delete, select) of data. In some implementations, DML statements are executed (e.g., at a first database system) and write logs are created reflecting the DML statements and transaction commit operations. In one example, a separate write log entry is created for each DML statement or transaction commit operation. In a specific example, a write log entry can include a DML statement and associated parameters and/or values (e.g., parameters and/or values that may be needed when the DML statement is executed at another database system). The write logs entries can be inserted into a write log queue and sent to one or more other database systems for execution. In this way, database data can be replicated between a first database system (e.g., a source host or a source system distributed among multiple source nodes) and one or more other database systems (e.g., a replica system having a replica host or being replicated among multiple replica nodes).

As used herein, a source system refers to a database system (e.g., one or more computing devices implementing a database environment) from which database information (e.g., one or more database tables, an entire database, or other selection of database information) is replicated to other systems. The term database table indicates any portion of a database, however organized. A host refers to a computing system having a processor and memory. In some cases, a source system can include multiple hosts, typically referred to as nodes. However, unless the context clearly indicates otherwise, a node can refer to the host in a single host system, or one of a plurality of hosts in a system. A master (or coordinator) node refers to a source node that manages information regarding the master node and one or more slave (or worker) nodes. A slave node refers to a source node that is installed on a different host than the master source node.

Tables (e.g., database tables) can be replicated to multiple nodes (e.g., database nodes) in a scale-out system. This feature can provide scalable search or query throughput by leveraging multiple cores in multiple nodes beyond the limitation of a single machine. It can also reduce network traffic for joins performed on multiple tables, when those tables are replicated on multiple nodes, by providing more localized access. In a specific example, data replication can improve performance of a database system for both online analytical processing (OLAP) queries and operations and online transaction processing (OLTP) transactions and queries.

A performance penalty can occur when DML statements are replicated in a synchronous manner (e.g., when a DML statement is executed on a source system and a replica system within the same transaction boundary, where execution on all nodes must complete before the transaction is committed). In some cases, the penalty can be reduced, which achieves a larger degree of scale-out benefits, through asynchronous replication. In some implementations of asynchronous replication, a transaction is committed when the DML statements in the transaction are committed at the source system, and the changes are propagated to the replica system outside the transaction boundary. The performance penalty associated with synchronous table replication can be reduced by modifying the typical synchronous replication protocol, such by reducing the number of synchronous operations between the source system and the replica system (e.g., "optimistic" synchronous table replication).

As used herein, a replica system refers to a database system that replicates database information (e.g., replicates one or more database tables, an entire database, or other selection of database information) from a source system, such as a single source host or a source system distributed among multiple source nodes. In some examples, the replica system may include a single replica host. In other examples, the replica system includes a plurality of replica nodes, which may store multiple copies of database tables maintained at the source system, have source database tables distributed across a plurality of replica nodes, or combinations thereof. In yet further examples, a single table may be distributed among multiple source nodes and/or may be distributed among multiple replica nodes.

The data at different database nodes in a distributed database system (such as a database system that includes more than one replica node, more than one source node, or more than one source node and more than one replica node) can be a database table that is partitioned (that is, divided, split) between database nodes. The database table can be partitioned between rows (different rows in different partitions) and/or between columns (different columns in different partitions). The database nodes of a distributed database system can contain one or more partitions (parts) of partitioned tables. Alternatively, the partitioned data is organized in some other way (e.g., a graph database, a document store, or a key-value store). Unless indicated otherwise, a database table can refer to a partition of a database table. In further examples, the table is not partitioned.

When partitioned, a database table may be split among multiple source nodes and replicated to multiple replica nodes. In some cases, the partitioning is the same between the source nodes and the replica nodes, while in other cases it is different. In other implementations, the table may be partitioned at the source nodes, but replicated to a single, non-partitioned, replica table at a single replica node. In yet further examples, a table that is not partitioned at a source node may be partitioned and distributed to multiple replica nodes.

Example 3

Write Logs

In any of the examples herein, DML statements (e.g., DML structured query language (SQL) statements) can be replicated using write logs. For example, a write log format can be created that comprises a DML statement with additional information associated with the DML statement (e.g., additional information for use when the DML statement is executed). In some implementations, a write log entry comprises a single DML statement.

In some implementations, a write log entry comprises a transaction identifier (ID), a DML statement, parameter values, and nondeterministic values. The transaction identifier identifies (e.g., uniquely identifies) the DML replication transaction, which can include one or more replicated DML statements. For example, the transaction identifier can uniquely identify the DML replication transaction that occurs on the source system and one or more replica nodes where the DML statement will be executed.

The DML statement can be a statement used to modify (e.g., add, update, and/or delete) data. For example, the DML statement can be a SQL statement used to modify data in a database. In some implementations, the DML statement is a SQL insert, update, or delete statement (e.g., a single SQL insert, update, or delete statement).

Parameter values are values used by the DML statement. For example, the parameter values can be values for binding to variables in the DML statement (e.g., a prepared or precompiled DML SQL statement). When the DML statement is executed (e.g., replayed), bind variables can be replaced with their corresponding parameter values. For example, if a DML statement contains a variable "NAME", the variable can be replaced with a specific string value when the DML statement is executed (e.g., the variable "NAME" can be replaced with a specific value, such as "John").

Nondeterministic values refer to values that may be different between different computing devices (e.g., different between source nodes and replica nodes). For example, a timestamp function will return a current timestamp value when run on the source system, which may be a different timestamp value when run at a later time on the replica system. In implementations where the same value is to be used for such nondeterministic functions, the nondeterministic function can be evaluated once (e.g., on the source system) and the resulting value can be provided in the logical log to the replica system so that when the DML statement is executed on the replica system the same value will be used (the same value that was used at the source system). For example, the nondeterministic function (e.g., current timestamp function) can be evaluated at the source system during DML statement execution and the resulting value can be sent in a write log entry to the replica system for use when executing the DML statement at the replica system.

In some implementations, a write log entry is the set of shipped values to perform replication of data at a replica location (e.g., a replica node) using a DML statement. In a specific implementation, the write log entry consists of:
  Transaction ID
  DML SQL statement
  Parameter values: values of bind variables (labeled '?') in prepared statement
  Nondeterministic values: If the SQL statement includes nondeterministic functions, such as sequence or CURRENT_TIMESTAMP function, evaluated values of the nondeterministic functions may be included As used herein, the terms "ship" or "send" to a destination entity refer to any way of transmitting or otherwise conveying data within a computer system or between two computer systems, whether the data is directly conveyed or conveyed through one or more intermediate entities. Similarly, the term "receive," such as to receive from a source entity, refers to the receipt of data within a computer system or between two computer systems, whether the data is received directly from the computer system of original transmission or received through one or more intermediate entities.

As described above, write log entries can include information regarding other features of a database transaction. In one aspect, the write log includes entries for when a transaction is committed by the source system. For example, a transaction may include multiple DML statements. In one implementation, the transaction is committed after all of the DML statements in the transaction have been executed on the source system. The write log may include additional entries, such as regarding individual DML statements within the transaction having been precommitted on the source system.

Example 4

Environment Providing Replication Using DML Statements

In any of the examples herein, technologies can be provided for more efficient replication (e.g., replication of database information) using DML statements and write logs. For example, DML statements can be executed at a source system and incorporated into write logs for sending (shipping) to a replica system for execution to replicate data between the source system and the replica system for one or more database tables. Additionally, DML replication can be applied to different types of storage engines, such as row stores, column stores, etc.

In some implementations, the concept of DML replication (e.g., DML synchronous replication) with write log shipping is intended to perform replication across multiple nodes with minimum replication overhead. However, synchronous replication can result in longer response times, as both the source and replica(s) are updated in the same transaction boundary. That is, the transaction may not commit, even at the source system, until the operation is committed at the source system and all replicated systems.

Asynchronous replication, where the replica is not necessarily updated in the same transaction boundary, can allow for the use of a replica system while improving the response time for write transactions at the source system. However, asynchronous replication typically involves a risk that a read request on the replica table may return information that is outdated compared to the source table.

FIG. 1 is a diagram 100 illustrating database data replication using DML statements and write log shipping. As depicted in the diagram 100, a client 110 (e.g., a client computing device) communicates with a source system 120 (e.g., one or more server computers operating a database at which data will be modified and replicated to a replica system). For example, the client 110 can perform database manipulation operations (e.g., insert data, change data, and/or delete data in one or more database tables stored at the source system 120). The client 110 can also issue requests to read data (e.g., queries), which can be sent to the source system 120 or a replica system 130.

The source system 120 includes a number of components, including a session/transaction component 122, a DML execution component 124, and storage engines 126 (e.g., row-store and/or column-store storage engines). The storage engines 126 store database data in a persistency store 128 (e.g., hard disk drives, solid-state drives, and/or other types of persistent storage).

The source system 120 can receive data manipulation operations (e.g., operations to add, modify, and/or delete data, such as in the form of insert, update, and/or delete DML statements) from the client 110 and/or from other clients or sources. Upon receiving the data manipulation operations (e.g., via the session/transaction component 122), the source system 120 can execute DML statements to perform the data manipulation operations (e.g., via the DML execution component 124). The source system 120 can also create write log entries incorporating the DML statements and send them (as depicted at 140) to the replica system 130 for execution, where they can then be read by requests from the client 110.

In some cases, the replica system 130 can replicate all of the data of the source system 120. In other cases, the replica system 130 can replicate a portion (e.g., selected tables) of the data of the source system. In yet further cases, data of the source system 120 can be replicated to multiple replica systems 130, which can hold copies of the same data, copies of different data, or combinations thereof.

The replica system 130 can receive the write logs and execute the entries contained within, including DML statements (e.g., along with other parameters, values, and/or other associated information in the write logs), transaction commit operations, and DML statement precommit operations. For example, the replica system 130 can include components similar to the source system 120 (e.g., session/transaction component 132, DML execution component 134, storage engines 136, and persistency store 138). The replica system 130 can replicate database information stored at the source system 120 (e.g., one or more database tables) via DML statements (e.g., so that database data changes at the source system 120 are replicated to the replica system 130). In some cases, the replica system 130 can execute the DML statements and return results to the source system 120. Results can be provided to the source system 120 and/or to the client 110.

Figure 2:
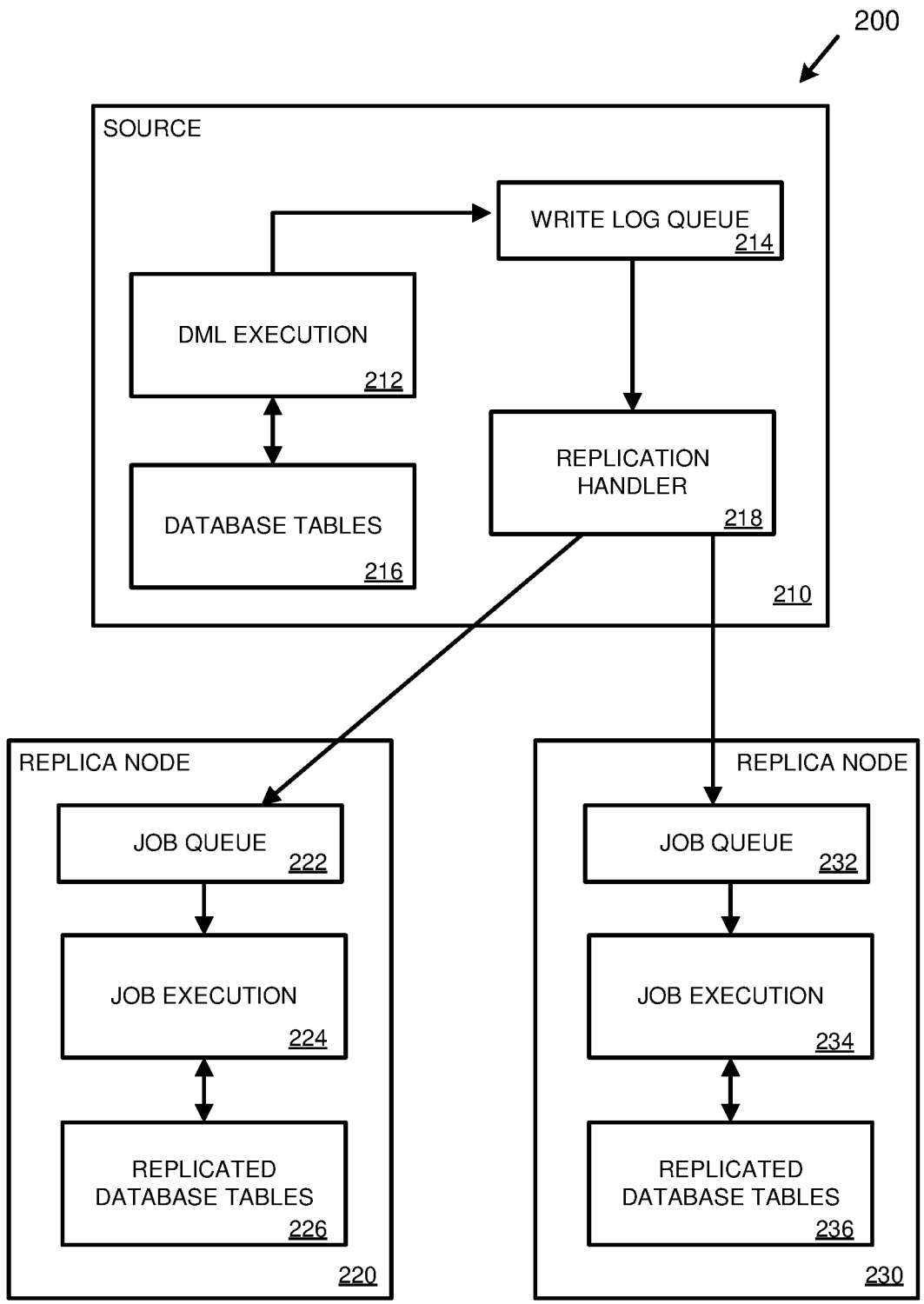
FIG. 2 is a diagram depicting a database environment for performing replication of database tables using DML statements and write log shipping.

FIG. 2 is a diagram depicting an example database environment 200 for performing replication of database tables using DML statements and write log shipping. The database environment 200 includes a number of replica nodes 220, 230 among which source database tables 216 are replicated.

As depicted in the database environment 200, a source system 210 (e.g., a source host or a source node) comprises a number of components supporting database activity and replication. Specifically, the source system 210 stores source database tables 216 (e.g., in memory and/or in one or more persistent storage repositories). The source system 210 includes a DML execution component 212 that executes DML statements that read and/or write database data in the database tables 216. The source system 210 also includes a write log queue 214 for storing write logs and a replication handler 218 for sending write logs to other database nodes (e.g., to replica nodes 220 and/or 230).

In order to replicate database tables (e.g., to replicate the database information stored in one or more database tables so that the database tables remain synchronized between database nodes), the DML execution component 212 of the source system 210 can receive a DML statement (e.g., originally from a user, application, or from another source) and execute the DML statement on one of the source database tables 216 (e.g., to add, modify, and/or delete data in the database table, which can be called a primary table). The DML execution component 212 can then create a write log entry (which includes the DML statement) and insert the write log entry into the write log queue 214. Once the write log entry has been inserted into the write log queue 214, the DML execution component 212 can be free to handle other DML requests (e.g., the DML execution component 212 does not have to wait for the write log entry to be replicated to the replica nodes 220, 230 before performing other DML operations).

In some implementations, the DML execution component 212 includes a number of threads of execution, where each thread can work independently to handle DML requests. In such an implementation, a thread can execute a DML statement, create a write log entry (which includes the DML statement), insert the write log entry into the write log queue 214, and be free to handle other requests without having to wait for replication of the DML statement to be completed (e.g., for the DML statement to be sent to other nodes or for results of DML statement execution at the other nodes).

In some implementations, the DML execution component 212 determines parameter values and/or nondeterministic values used by the DML statement when executing the DML statement in relation to the database table. In such implementations, the DML execution component 212 can include the parameter values and/or nondeterministic values in the write log entry with the DML statement. The DML execution component 212 can also include a transaction identifier in the write log entry to identify the replication transaction. The DML execution component 212 orders the DML statements for execution such that any given DML statement is not executed until the underlying data it affects is ready. For example, an update statement for a record is not executed until after an insert statement adding the record. The DML execution component 212 can modify information (e.g., in non-deterministic values or row-ID values that act as state counters) indicating how to serialize DML statements in the write log entries.

The source system 210 also comprises a replication handler 218 for handling write log entries in the write log queue 214. The replication handler 218 can take write logs from the write log queue 214 and send them to one or more replica nodes (e.g., node 220 and/or node 230) in order for the replica nodes 220, 230 to perform replication by executing the DML statements contained within the write log entries. For example, the replication handler 218 can retrieve a write log entry from the write log queue 214 and send the write log entry to node 220 and/or to node 230. The write log entry can pass through various internal or external structures, queues, etc., when it is routed to the replica nodes 220, 230.

A replica node receiving a write log entry, such as replica node 220, can receive the write log entry and insert it into a job queue 222. Reception of the write log entry by replica node 220 can be performed by a separate component (e.g., a write log receiver component, not pictured) or by the job queue 222. Once the write log entry has been received and inserted into the job queue 222, a job execution component 224 can retrieve the write log entry and execute the DML statement contained within (e.g., along with parameter values and/or nondeterministic values, if present) on one of the replicated database tables 226. Other replica nodes can also receive the write log entry from the replication handler 218 (e.g., node 230, with its own job queue 232, job execution component 234, and replicated database tables 236).

In some implementations, database tables can be replicated on a node-by-node basis. For example, a source system (e.g., source system 210) can store a full set of database tables while a first replica node (e.g., node 220) may replicate some or all of the tables stored at the source system and a second replica node (e.g., node 230) may also replicate some or all of the tables stored at the source system 210. Furthermore, each replica node 220, 230 may replicate the same tables as one or more other replica nodes, or may replicate different tables from one or more other replica nodes. As an example, source system 210 may store database tables 1, 2, and 3. Replica node 220 may replicate database tables 1 and 2. Replica node 230 may replicate database tables 1 and 3.

In some implementations, a write log entry that contains a DML statement modifying a particular database table is sent to replica nodes that replicate the particular database table (e.g., only to those replica nodes that replicate the particular database table and not to replica nodes that do not replicate the particular database table). For example, the replication handler 218 can send a write log entry from the write log queue 214 to replica nodes that replicate a database table being modified by the DML statement within the write log entry.

In some implementations, grouping of write log entries is performed. For example, multiple write logs entries that modify database tables replicated at a particular replica node can be grouped and sent to the particular replica node. Consider an example arrangement in which the source system 210 stores store database tables 1, 2, and 3, replica node 220 replicates database tables 1 and 2, and replica node 230 replicates database tables 1 and 3. In this example arrangement, if the write log queue 214 contains three write logs entries that all modify database information stored in database table 1, then the three write log entries can be grouped (e.g., combined into a write log group) and sent to both replica node 220 and replica node 230 which both replicate table 1. If the write log queue 214 contains two write logs entries that both modify database information stored in database table 3, then the two write log entries can be grouped and sent to replica node 230, which replicates database table 3 (and not to replica node 220, which does not replicate database table 3). If the write log queue 214 contains two write log entries that both modify database information stored in database table 1 and one write log entry that modifies database information stored in database table 2, then a first write log group can be created for sending all three write log entries to replica node 220 and a second write log group can be created for sending only the two write log entries that modify table 1 to replica node 230.

Write log grouping can be applied so that network resources are utilized more efficiently. For example, to minimize the penalty of replication, write log grouping can be used in which multiple write log entries for multiple clients are grouped into a single network communication. This technique can reduce network resources needed to perform replication and may increase DML execution throughput.

The job execution component 224, 234 of a replica node 220, 230 that receives write log entries can include a number of processes or threads for executing jobs in the job queue. For example, the job execution component 224 of replica node 220 can include a number of job execution threads that retrieve write log entries from the job queue 222 and execute them. In some implementations, the job execution threads can execute write log entries in parallel, which can increase efficiency. In dispatching write log entries, the job execution component 224 can use information (e.g., non-deterministic values or row-ID values that act as state counters) to control the timing of execution, so that any given DML statement is not executed until the underlying data it affects is ready.

In some implementations, DML statements are executed on a source node (or multiple source nodes) and one or more replica nodes within the same transaction boundary (also called an execution boundary). For example, one or more DML statements can be associated with a transaction (e.g., identified by a transaction identifier). The one or more DML statements associated with the transaction can be executed at a source node (or multiple source nodes), incorporated into write logs and sent to one or more replica nodes, and executed at the replica nodes within the same transaction boundary. In some implementations, the DML statements are executed at the replica nodes within a sub-statement boundary of the overall transaction boundary.

In some implementations, DML statements within a transaction boundary can be rolled back. For example, a DML statement being executed on a source node and one or more replica nodes can be rolled back across the source and replica nodes (e.g., if execution at one of the nodes fails). In some implementations, partial rollback is supported, in which one or more DML statements of a transaction can be rolled back independently of one or more other DML statements of the transaction. For example, if a transaction includes multiple DML statements, and one of the DML statements is rolled back on the source node, that DML statement can be rolled back on any replica nodes as well.

Execution of DML statements within a transaction boundary can provide for database consistency. For example, DML statements can be executed on a source node and one or more replica nodes and committed within the same transaction boundary (e.g., committed using an atomic commit operation).

In some implementations, thread decoupling is used to provide for more efficient replication. In some implementations, separate threads (e.g., dedicated handler threads) perform write log shipping (e.g., operations including retrieving write logs from the write log queue, grouping, and/or sending to replica nodes). Using separate threads for write log shipping and DML execution can free up the DML execution threads from having to perform write log shipping operations (e.g., the DML execution threads can be free to handle other DML operations once they have placed write logs into the write log queue). For example, DML execution threads can take pending DML jobs from other sources without having to wait for results of write logs that have been sent to replica nodes.

Figure 3:
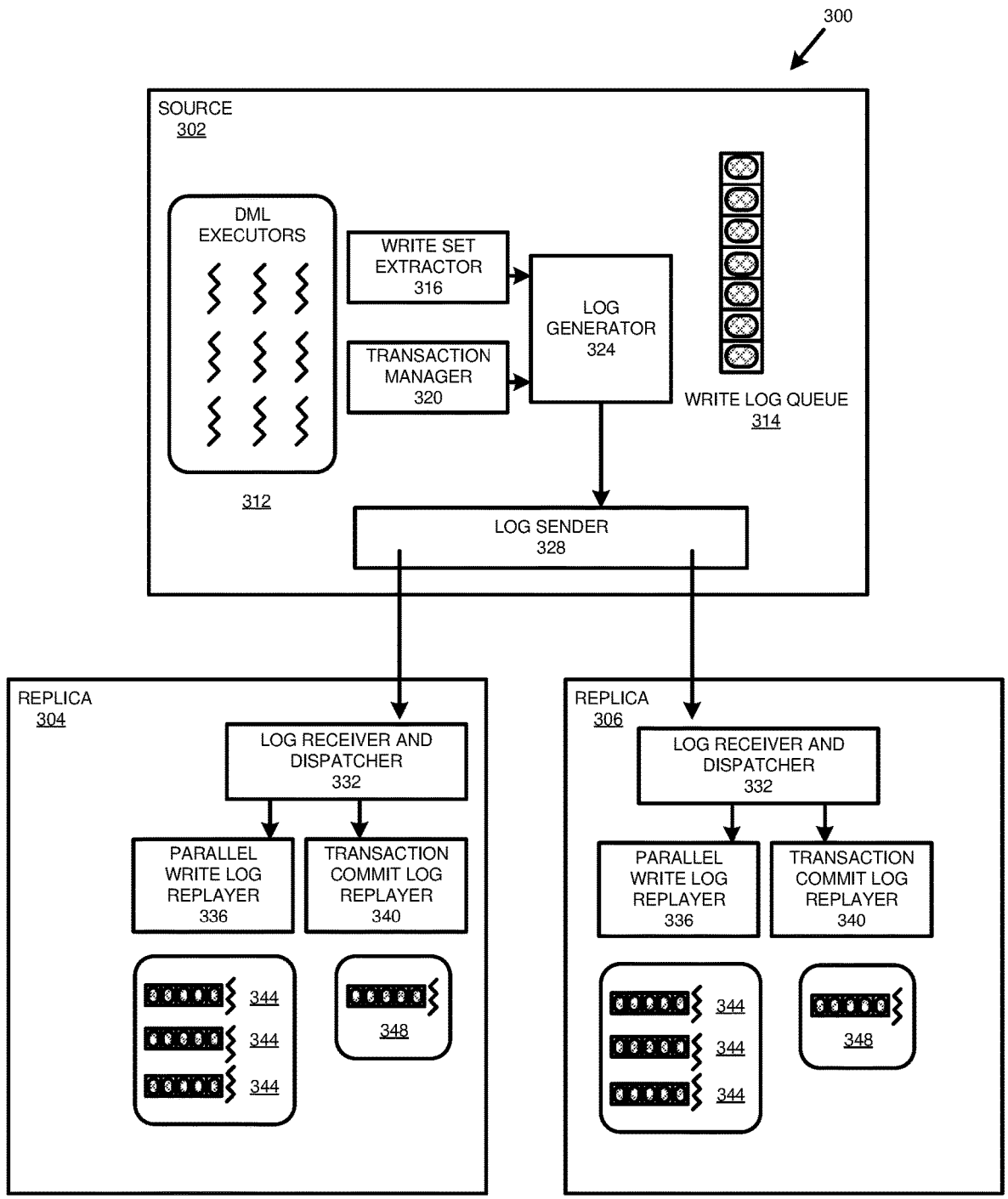
FIG. 3 is a diagram depicting a database environment for performing replication of database tables from a source node to replica nodes.

FIG. 3 is a diagram depicting a database environment 300 for performing replication of database tables from a source system 302 to a replica system having replica nodes 304, 306. While two replica nodes are depicted, replication of database tables can be performed between the source system 302 and any number of replica nodes.

As depicted in the example database environment 300, the source system 302 includes a number of DML executors 312 (threads of execution for handling DML requests). To support replication, a write set extractor 316 extracts appropriate DML information from the DML request. Similarly, a transaction manager 320 monitors transaction commit operations. Commit operations determine when the result of a transaction is available for reading. Read requests will typically receive the last committed version of a record, even if the record is currently being modified by a DML operation.

A log generator 324 communicates with the transaction manager 320 and the write set extractor 316. The log generator 324 generates logs entries for the write and commit operations and adds them to a write log queue 314. The write log queue 314 is emptied, and log entries are sent to appropriate replica nodes (e.g., through one or more intermediary nodes) by a log sender 328 that communicates with the log generator 324. In some cases, write logs can be grouped together such that multiple logs can be sent to a replica node in a single communication. When the database environment includes multiple replicas, replicating different portions of the source system (such as a source host), in particular implementations, the replica node may only receive and execute write logs for tables replicated by that replica node. Accordingly, logical log grouping can take into account the tables replicated by a particular replica node.

Each replica node 304, 306 includes a log receiver and dispatcher 332. The log receiver and dispatcher 332 receives the write log entries from the log sender 328. The log receiver and dispatcher 332 parses the write log entries. Write operations are sent by the log receiver and dispatcher 332 to a parallel write log replayer 336, while commit operations are sent by the log receiver and dispatcher 332 to a transaction commit log replayer 340.

As shown in FIG. 3, the parallel write log replayer 336 includes multiple replayers 344 that can operate concurrently. This structure helps improve system performance by allowing multiple write operations on the replicated table to be carried out simultaneously, in the absence of dependencies between the write operations. In at least some implementations, write logs associated with the same transaction are replayed by the same replayer 344 in the same order that the operations occurred at the source node.

In order to help ensure consistency between the source system 302 and the replica nodes 304, 306, the transaction commit log replayer operates serially, such as with a single replayer 348. Also, the log receiver and dispatcher 332 can use information provided with write log entries to order write operations appropriately, honoring dependencies between write operations.

At least certain implementations of the present disclosure include an additional feature that helps maintain consistency in the system 300. That is, each replicated table has associated with it a row-ID generator. The value of the row-ID generator is incremented each time a write (change) operation is performed on a record within the table. The value is copied to a row-ID column of the database record being changed. When the write log entries are generated by the log generator (324, FIG. 3), the information may be included in the write log entries.

For example, operations inserting a new record will include information for the (new, incremented) row-ID of the inserted record. Operations updating a record will result in the write log including information for the row-ID of the record prior to the write operation and the incremented row-ID after the write operation. Delete operations will include information for the row-ID of the deleted row. In particular implementations, the delete operation does not, at least immediately, result in the deletion of a record. That is, the deleted record can be maintained as a new version of the record and, in some examples, linked to prior record versions. The new record can be assigned a new row-ID. The use of the unique row-ID can assist both in replicating data on an ongoing basis, and when replication is resumed, such as due to manual intervention or a system exception.

Both source 302 and replica tables, such as tables located at replica 304, can include the row-ID information, such as in a column of the respective table. When replication is restarted, such as on restart of the replica node 304 after a system exception, a manual restart, or switching off and switching back on replication services, the row-ID column values of the source table hosted by the source 302 can be compared to the row-ID column values of its replica table the replica node 304. If there are any mismatching row-ID between them, then they can be identified as a lost change and can be resolved by re-sending the corresponding data from the source table or by deleting the corresponding row at the replica.

For example, if a row-ID value is found both at the source 302 and the replica 304, the data is consistent and no action needs to be taken for that row-ID upon restarting replication. If a row-ID value is found only at the table at the source 302, the corresponding database record is sent (or resent) from the source 302 to the replica 304 for insertion into the copy of the table. If a row-ID value is found only at the table copy hosted by the replica 304, it can be deleted from the table copy.

The above-described method for synchronizing source and replica tables upon restarting replication can be modified to improve performance or reduce the changes of data being inconsistent between source and replica tables, or between copies of different replicated tables hosted in the replica 304. On such modification that may be used with at least certain Examples of the present disclosure is described in Example 16.

Example 5

Record Version Visibility

Regarding the property isolation of the four properties in the principles of ACID (atomicity, durability, isolation, and durability) commonly used in guiding the operation of database environments, at least some database environments of the present disclosure can provide one or both of two variants of snapshot isolation: statement-level snapshot isolation (SSI) and transaction-level snapshot isolation (TSI). Snapshot isolation provides non-blocking read access against any concurrent write transactions.

If a transaction consists of one or more statements (such as data manipulation language, or DML, statements), which can be, for example, either of read and write (e.g. INSERT, UPDATE, or DELETE), in SSI, each statement reads data from a snapshot of the committed data at the time the statement started. In TSI, each transaction reads data from a snapshot of the committed data at the time the transaction started, called the snapshot timestamp. In at least some database environments, SSI and TSI can co-exist, such as being configurable on a per user connection. The definitions of SSI and TSI imply that data once read, in a statement or a transaction respectively, should be visible again within the same statement or transaction even though the data has been changed by a different concurrent transaction. For example, when executing a join query with some predicate, the same record can be visited multiple times within a single statement scope since the intermediate result of a query operator can be passed to the next query operator by a set of references to the filtered records (e.g. row IDs) without necessarily fully materializing them.

Although a Write Skew anomaly can happen under snapshot isolation, where two transactions concurrently read overlapping data, make disjoint updates, and commit, it typically can be avoided in practice by using SELECT FOR UPDATE properly in applications. Contrasted to other concurrency control options like optimistic concurrency control or two-phase locking, a benefit of snapshot isolation is that read queries can proceed without any query abort or any lock waiting situation, even though they read a database object which is being changed by other transactions.

Typically, in SSI and TSI, a snapshot timestamp is assigned to a new snapshot when the new snapshot starts. Under SSI, each statement has its own snapshot, while each transaction has its own snapshot under TSI. The cost of the snapshot timestamp assignment operation typically becomes more significant in SSI than in TSI, because the snapshot timestamp is assigned for each transaction under TSI, but for each statement under SSI. SSI thus offers more room for optimizations within the database kernel, because it can be known which tables or partitions need to be accessed in that particular snapshot scope by looking up the statement's query plan before actually executing it.

In some aspects of the present disclosure, a database environment incudes a table having database records. A new version of a record is created on each update operation instead of overwriting the existing record version. Even for record deletion operations, a new version header is typically created with an empty payload instead of deleting the existing record right away. When creating a new record version, a versioning token, such as a version timestamp, representing the version creation time (the commit time (e.g., commit ID) of the transaction creating the version), is stored, such as in a version header. In a particular implementation, the version timestamp is derived from a global synchronization token, such as a transaction commit timestamp, maintained by a central transaction manager (which may be, for example, the source node 302 of FIG. 3) which will be incremented on each commit of a write transaction.

According to a particular example, the versions of a single record are chained to each other in a sorted order, such as by their version timestamps. Older versions in the version chain can be deleted, such as in a process sometimes referred to as garbage collection, when specified criteria are met, such as when it is determined that there is no potential reader in the system for that record version. In a particular implementation, there being no potential reader in the system can be detected by maintaining a minimum value of snapshot timestamps of active snapshots in the system and comparing it with the version timestamps of the garbage collection candidates.

When a query tries to read a record version, the visibility of the record is checked by comparing the query's snapshot timestamp with the version timestamp of the candidate record version. If the version timestamp of the record is higher than the snapshot timestamp of the query, the particular record version should typically not be visible to the query because the created version of the record was committed after the query started. Otherwise, if the version timestamp of the record is not higher than the snapshot timestamp of the query, the record version should typically be visible to the query.

One potential issue in snapshot isolation implementation is updating version timestamps of multiple different rows in a transaction with the transaction's assigned commit timestamp in an atomic way. At version creation time, the embracing version timestamp can typically be correctly and finally set only after the embracing write transaction receives its commit timestamp within the commit procedure. However, if the versions of the write transactions are updated with their commit timestamp one by one, then some of those versions could be visible to another snapshot while the others might still be invisible. Such an outcome would not fully comply with the atomicity rule in the ACID properties.

To avoid this potential anomaly concerning visibility atomicity, a transaction context may be maintained for each write transaction. When a write transaction starts its first write operation, a transaction context entry is created. In a particular example, all created row versions store a pointer to the transaction context entry in their version header field. At commit time, the transaction context entry is updated with the write transaction's commit timestamp, and thus is available to the other versions through the pointer to the transaction context entry. After the transaction commit processing is completed, the commit timestamp written in the transaction context entry is asynchronously propagated to the version timestamp fields. The transaction context entry may then be garbage-collected. With this atomic indirect commit timestamp assignment to the created versions, visibility atomicity is still facilitated under this snapshot isolation implementation.

Figure 4:
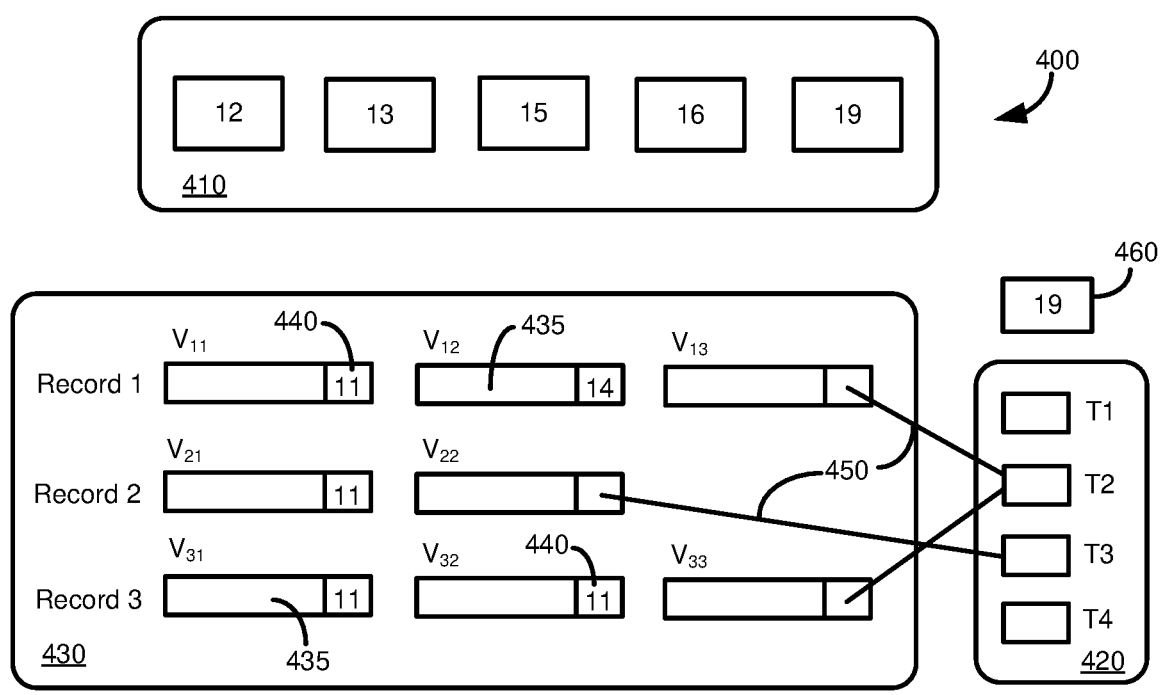
FIG. 4 is a diagram depicting an architecture of a transaction context providing version space management that may be used in at least certain implementations of the present disclosure.

FIG. 4 depicts an architecture 400 illustrating a transaction context providing version space management. The architecture 400 includes a snapshot timestamp store 410 that stores five active timestamps 12, 13, 15, 16, and 19. Architecture 400 further includes a transaction context store 420 for four active write transactions, T1, T2, T3, T4, each with their own transaction context entry. A record chain store 430 holds three database records, Record 1, Record 2, and Record 3, each with own version chain of record versions 435. Each record version 435 includes a version timestamp 440.

As shown, from the viewpoint of a snapshot whose snapshot timestamp is 12, $V_{11}$ and $V_{21}$ are visible (because their version timestamps are less than the snapshot timestamp) but the other record versions 435 are not. $V_{13}$, $V_{22}$, and $V_{33}$ do not have their version timestamps yet, because their write transactions are not yet committed. The timestamp of versions $V_{31}$ and $V_{32}$ are greater than the snapshot timestamp (12), and so are not visible in the snapshot.

Under this transaction state, the record versions 435 store a pointer 450 to the corresponding transaction context entries ($T_2$ and $T_3$). Once $T_2$, for example, commits, then the transaction commit timestamp (19, as shown) of the transaction manager 460 at that time is copied to the transaction context entry 420, thus providing visibility atomicity indirectly. Note that the data structures in FIG. 4 are provided to give a conceptual overview, but their actual implementation can be different. For example, depending on whether the corresponding table is a row store or a column store, both of which may be supported in a single database system, the storage layout of the record versions may be different.

Although read statements do not acquire locks in at least certain implementations of the present disclosure, a write transaction typically acquires an exclusive lock of its updated record to ensure a serializable schedule of concurrent write operations. If the latest version of the record is not visible to the snapshot after the exclusive record lock is acquired, then a transaction under TSI may throw an error to the end user. A statement under SSI, however, may be configured to restart the statement by substituting its statement timestamp with a newer value of the transaction commit timestamp. In at least certain examples, database objects are finally updated after lock acquisition and validation. In further examples, lock tables are partitioned according to the location of their corresponding tables, or partitioned together with a multi-node deadlock detection implementation, to detect when dependencies between write operations carried out at different nodes prevent transaction commitment.

Table 1 provides a set of symbols that may be used to describe a distributed database transaction protocol.

TABLE 1

Notations

| Symbol | Description |
| --- | --- |
| CTS | Transaction commit timestamp of the source node, incremented when a write transaction commits |
| CID($T_i$) | Commit ID of a write transaction $T_i$, assigned from CTS when $T_i$ commits |
| pCID($T_i$) | Precommit ID of a write transaction $T_i$, assigned from CTS when $T_i$ pre-commits |
| Status($T_i$) | Status of a write transaction $T_i$, either of {Unused, Active, Precommitted, Committed, Aborted} |
| TID($T_i$) | Transaction identifier of a transaction $T_i$ |
| STS(Si) | Snapshot timestamp of a snapshot $S_i$, assigned from CTS when the snapshot (statement or transaction) starts |

Algorithm 1 shows how a statement checks if a record version V should be visible or not to a snapshot S (a statement under SSI or a transaction under TSI). For the visibility decision, first, V's creator transaction's state is checked. If it is aborted or active, then V should not be visible to S (lines 8 to 11). If it is committed, then V's CID is compared to STS(S). V is visible to S only if STS(S) is equal to or larger than V's CID (lines 3-7).

---

Algorithm 1 Visibility decision algorithm: check if a record version V should be visible to a snapshot S or not

---

```
 1:  while TRUE do
 2:    if V's status is Committed then
 3:      if V's CID ≤ STS(S) then
 4:        return TRUE
 5:      else
 6:        return FALSE
 7:      end if
 8:    else if V's status is Aborted then
 9:      return FALSE
10:    else if V's status is Active then
11:      return FALSE
12:    else if V's status is Precommitted then
13:      if V's pCID ≥ STS(S) then
14:        return FALSE
15:      else
16:        wait until V's status becomes Committed or Aborted
17:      end if
18:    end if
19:  end while
```

---

In addition to the basic visibility rules, the following extensions are provided. As previously mentioned, and as recited in Algorithm 1, at least certain implementations provide a statement or transaction status of being precommitted, where the final commitment of the statement or transaction is treated as in-doubt, with the visibility decision being delayed until the in-doubt status has been resolved, such as by the statement or transaction being committed. If V's status is precommitted (lines 12 to 17), the corresponding record version's visibility decision is postponed. The precommitted/in-doubt state makes sub-operations of a transaction commit effectively atomic without relying on any latch or lock.

The delayed visibility decision scheme may result in a situation where a read statement may need to wait for another write transaction's commit to be completed. However, this waiting situation is typically uncommon, because it happens when a read statement is trying to check the visibility of a record version which was created by a write transaction committed at the same time as the read attempt. To further reduce the possibility of a reader waiting for an in-doubt transaction to complete, particular implementations of the disclosed distributed database transaction protocol can include early pruning of record versions that will never be visible.

As explained above, the in-doubt period of a transaction is started by setting the transaction's state as precommitted. By assigning pCID, which is typically defined to be smaller than its CID value to be decided later, at the time when the transaction state is set as precommitted, record versions which will never be visible to the pending reader statement, such as because the query was started later than the write operations and thus should only view records that were available when the query was started, can be pruned. More specifically, if STS(S) is smaller than or equal to pCID(T) for a write transaction T and a snapshot S, then STS(S) will also be smaller than CID(T) because pCID(T) is smaller than CID(T) assigned by the commit protocol. Thus, if STS(S)≤pCID(T), it can be determined that the tested version V is not visible to S (lines 13 to 14 of Algorithm 1) without waiting any further.

As will be further described, table replication can be carried out synchronously, where records on the source system and the replica system are updated at one time (e.g., the commit is carried out atomically). However, synchronization can require more communication between the source system and the replica system, and can delay execution. Table replication can be carried out asynchronously, where transaction commit is carried out atomically at the source system, but the changes are propagated asynchronously to the replica system. In asynchronous replication, read operations received at the replica and source systems may retrieve different results. Specifically, the read operation at the replica may return data that is out of date with respect to the version of the source system.

Example 6

Table Replication and Table Replication Protocols

Figure 5A:
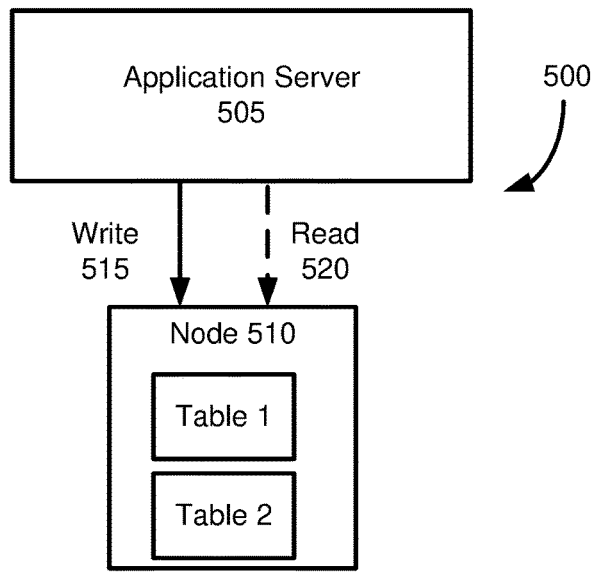
FIG. 5A is a diagram illustrating an unreplicated database system.

As described above, table replication can be useful in facilitating the implementation of distributed database systems. FIG. 5A illustrates a database environment 500 that does not include data replication. The environment 500 includes an application server 505 that communicates with a node 510 acting as a database server and hosting Table 1 and Table 2. The application server 505 sends write requests 515 and read requests 520 to the node 510. Because the environment 500 includes a single node 510, the performance of the environment 500 is tied to the resources of a single host, and can thus degrade if the number of write requests 515 or read requests 520 becomes too large.

Figure 5B:
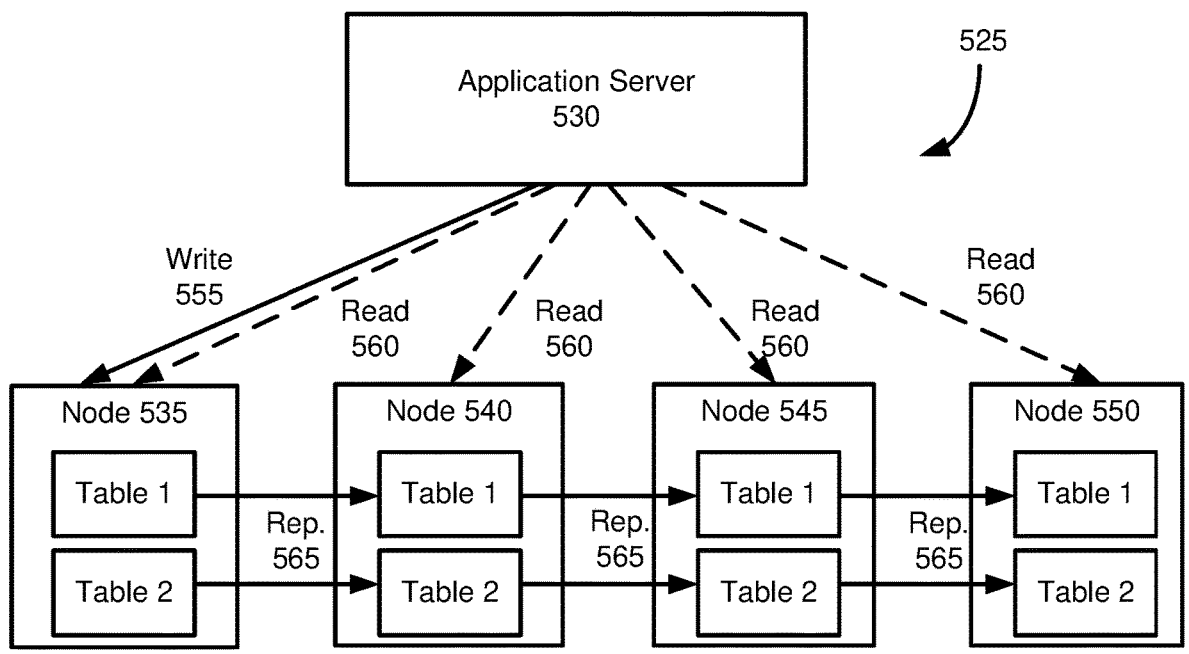
FIG. 5B is a diagram depicting how replicating database tables from a source node to replica nodes can provide for load balancing in a database system.

FIG. 5B illustrates an environment 525 providing for replication of data between a plurality of database server nodes 535, 540, 545, 550, each of which is in communication with an application server 530 and hosts Table 1 (or a copy thereof) and Table 2 (or a copy thereof). The application server 530 sends write requests 555 to the node 535, which stores the "source" versions of Table 1 and Table 2. However, the application server 530 can send read requests 560 to any of the nodes 535, 540, 545, 550.

The results of the write requests 555 sent to node 535 are propagated to nodes 540, 545, 550 by a replication process 565. Because the node 535 is the only node that receives the write requests 555 for Tables 1 and 2, and changes to those tables at node 535 are replicated to the other nodes 540, 545, 550, node 535 acts as a source node for Tables 1 and 2. Nodes 540, 545, 550 act as replica nodes for Tables 1 and 2.

For purposes of query processing and other online analytical processing (OLAP) operations, the environment 525 of FIG. 5B provides for load balancing as compared with the environment 500 of FIG. 5A, as read requests 560 can be sent to the source node 535 and any of the replica nodes 540, 545, 550.

Figure 6A:
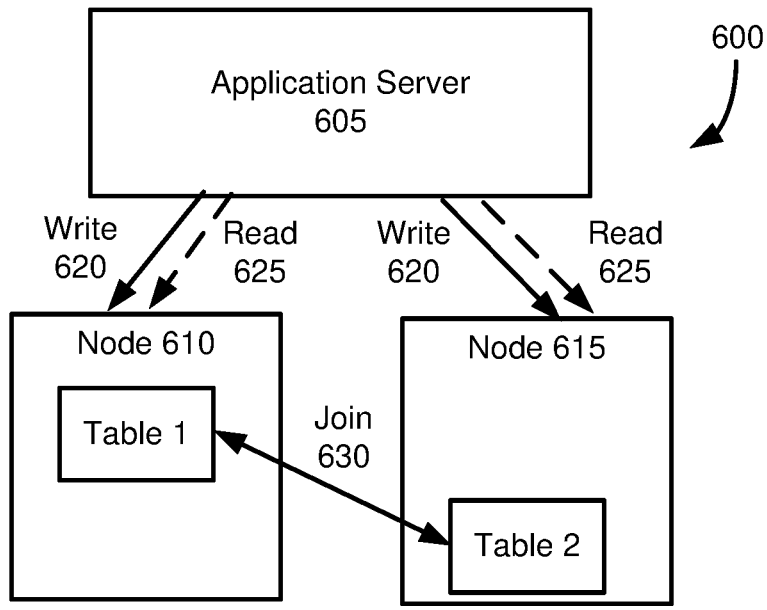
FIG. 6A is a diagram depicting how inefficient cross-node join operations may be executed in a distributed database system without table replication.

Table replication can also help a database system avoid inefficient cross-node join operations. FIG. 6A illustrates a database system 600 having an application server 605 that is in communication with a database server node 610 hosting Table 1 and a database server node 615 hosting Table 2. Application server 605 sends write requests 620 and read requests 625 to node 610 for Table 1. Application server 605 sends write requests 620 and read requests 625 to node 615 for Table 2. An operation, such as a SQL join operation 630 accessing Tables 1 and 2 must access both nodes 610 and 615, which can cause performance degradation compared with an operation where only one database server node is accessed.

Figure 6B:
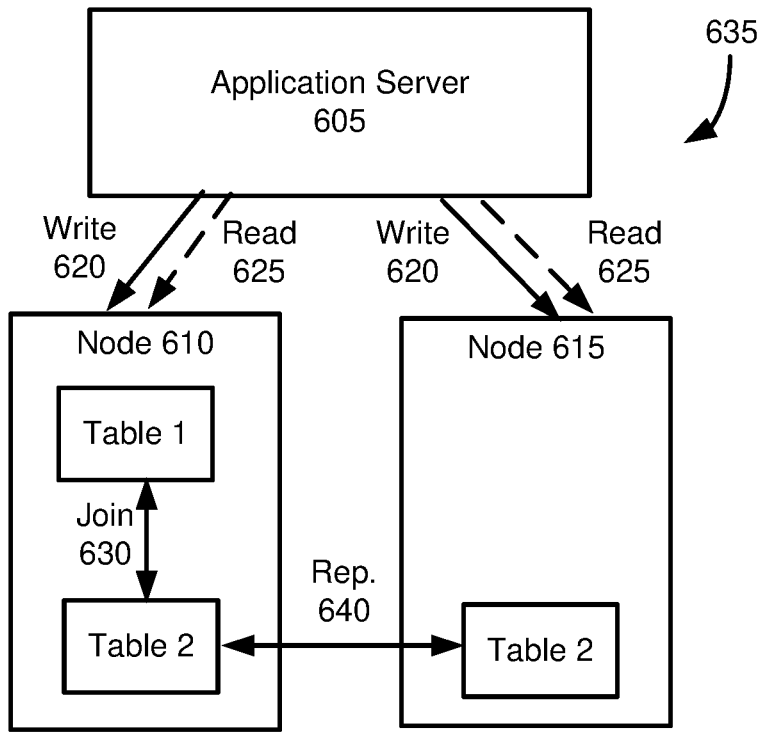
FIG. 6B is a diagram illustrating how replication can be used in a distributed database system to avoid cross-node join operations.

FIG. 6B illustrates an alternative environment 635 that is generally similar to the environment 600. However, Table 2 has been replicated from node 615 to node 610 using a replication process 640. A read-only operation, such as SQL join operation 630, accessing both Tables 1 and 2 can simply be routed to node 610, improving performance by helping to avoid cross-node operations. As will be further described, a query can be sent from the application server 605 to a database server node 610, 615 to be precompiled. A precompiled query can indicate on which nodes the query is executable. When the query is to be executed, the precompiled query can be sent from the application server 605 directly to an appropriate node.

As described above, replication can be carried out synchronously or asynchronously. Asynchronous table replication (ATR) can help reduce performance degradation resulting from table replication, but it can be complex to implement and use. For example, because replication is asynchronous, a replica table may have an outdated state compared with its source table. To address this issue, application developers may need to distinguish their workloads or queries that run on such asynchronous replicas, versus those workloads or queries that run only on the source node, or on a replica operating under synchronous replication.

Synchronous table replication provides a simpler usage model, because all the replicas have the same state as their source tables. However, typical synchronous table replication implementations add high performance overhead to source transactions, particularly in view of the following two implementation issues. Typical synchronous table replication protocols synchronize the source table with the replica tables for each DML statement.

Figure 7:
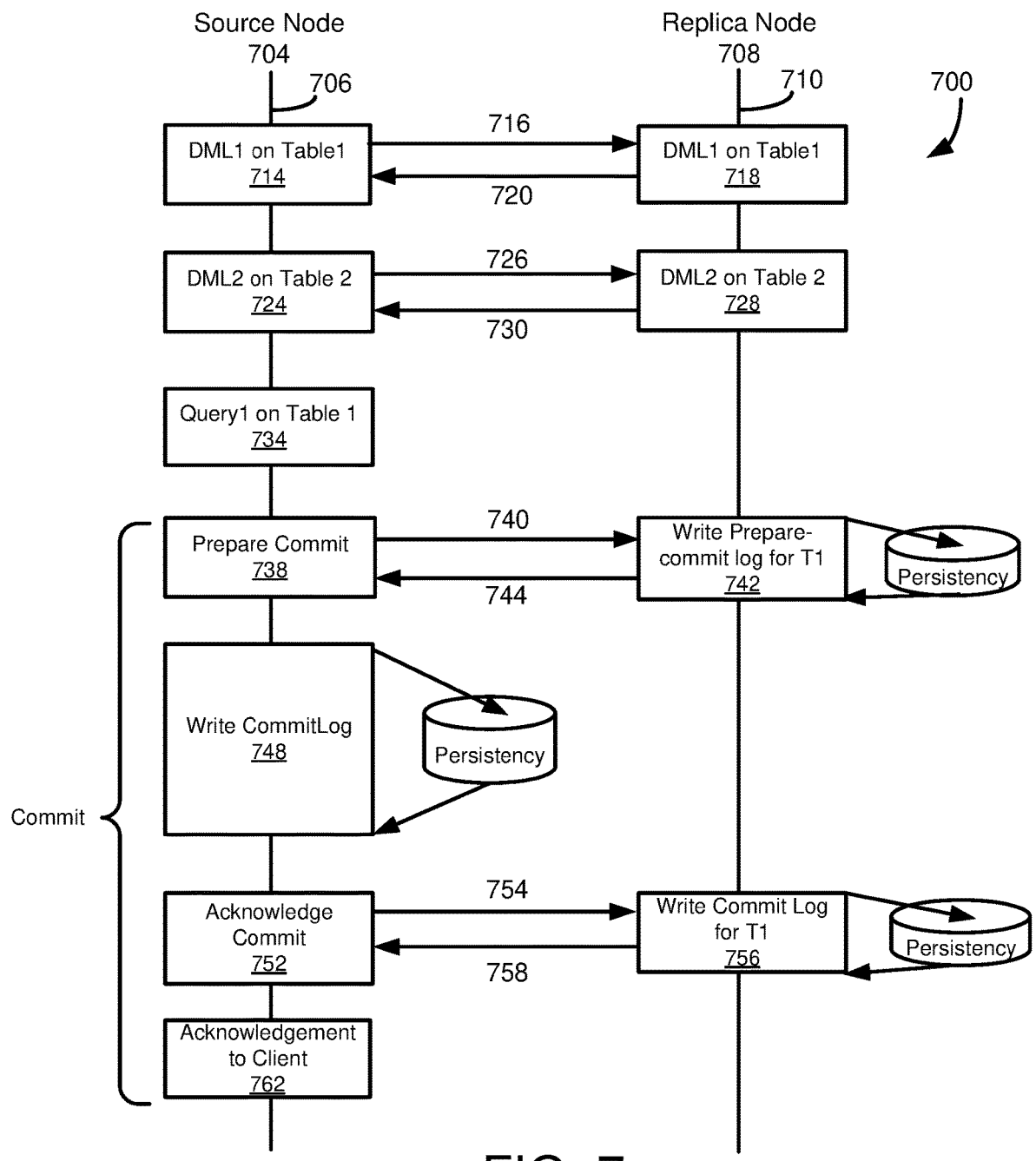
FIG. 7 is a diagram depicting a synchronous database replication protocol.

FIG. 7 illustrates an example synchronous table replication protocol 700. The operations of the protocol 700 are carried out using a source node 704 and a replica node 708, having respective execution timelines 706, 710. DML statements DML1 and DML 2 are executed at the source node 704 in blocks 714 and 724. These DML statements are synchronously sent to the replica node 708 in communications 716 and 726, respectively. DML1 is executed at the replica node 708 in process 718. DML2 is executed at the replica node 708 in process 728.

After execution of DML1 and DML2 at the replica node 708, the replica node 708 sends synchronous acknowledgments to the source node 704 in communications 720 and 730, respectively. In FIG. 7, the source node 704 waits for the synchronous acknowledgement for DML1 before executing DML2. Query1, associated with transaction T1, is executed by the source node in process 734. Note that Query1 is executed after DML1 and DML2 have been synchronized between the source node 704 and the replica node 708, with synchronous acknowledgements received from the replica node 708.

When the transaction T1 is to be committed, in step 738, the source node 704 prepares the replica 708 to commit the transaction by sending a synchronous prepare commit request 740. After receiving the notification 740, the replica node 708 prepares the transaction for commitment in block 742, including writing a prepare-commit log to persistent storage and marking the transaction as "in-doubt" at the replica node 708. The replica node 708 then sends a synchronous prepare commit acknowledgement 744 to the source node 704.

When the source node 704 receives the acknowledgement 744, the source node 704 writes a commit log for the transaction in block 748, including writing the commit log to persistent storage. The source node 704 sends a synchronous notification, or commit request, 754 to the replica node 708 in block 752. When the notification 754 is received by the replica node 708, the replica node 708, in block 756, writes a commit log for the transaction, including writing the commit log to persistent storage and marks the transaction as "committed" at the replica node 708. The replica node 708 then sends a synchronous commit acknowledgement 758 to the source node 704. Upon receiving the commit acknowledgement 758, the source node 704 acknowledges the commit to the client (not shown) in block 762.

In the conventional two-phase commit protocol 700, the execution of every DML statement requires a network round trip between the source node 704 and the replica node 708. Two additional round trips are required as part of the commit process. These network communications can delay transaction processing, and can increase the network and processing loads at the source node 704, which can be undesirable, particularly if the system using the protocol 700 include multiple replica nodes. Further delays are incurred by the system waiting to acknowledge the commit to the client in block 762 until the write logs have been written to persistent storage at both the source node 704 and the replica node 708, in blocks 748, 756.

Note that the replication protocol 700 is completely synchronous. Each DML statement is fully executed by the source node 704 and the replica node 708 before the next DML statement, or another operation, is executed. In addition, the commit process is synchronous, as the prepare commit step 738 and the acknowledge commit step 752 are not completed until a confirmation or acknowledgement from the replica node 708 has been received by the source node 704.

Synchronous table replication is implemented in such a way because subsequent read operations in the same transaction may try to read data changes from the replica node. For example, the transaction execution scenario of FIG. 7 includes DML operations DML1 and DML 2 that are executed on the source node for transaction T1. Query1 should be able to read the outcome of DML1 because both Query1 and DML1 belong to the same transaction T1. If DML1 is asynchronously propagated to the replica, then there is chance that when Query1 is dispatched to the replica, Query1 may not see the result of execution of DML1, even though DML1 was executed at the source node as part of the same transaction. (For example, Query1 may arrive before DML1 at the replica node.) Although the example transaction of FIG. 7 includes two DML statements, in general, a transaction can include any number of DML statements, up to an implementation-dependent threshold. Also, in general, a transaction can include any number of queries, up to an implementation-dependent threshold.

Figure 8:
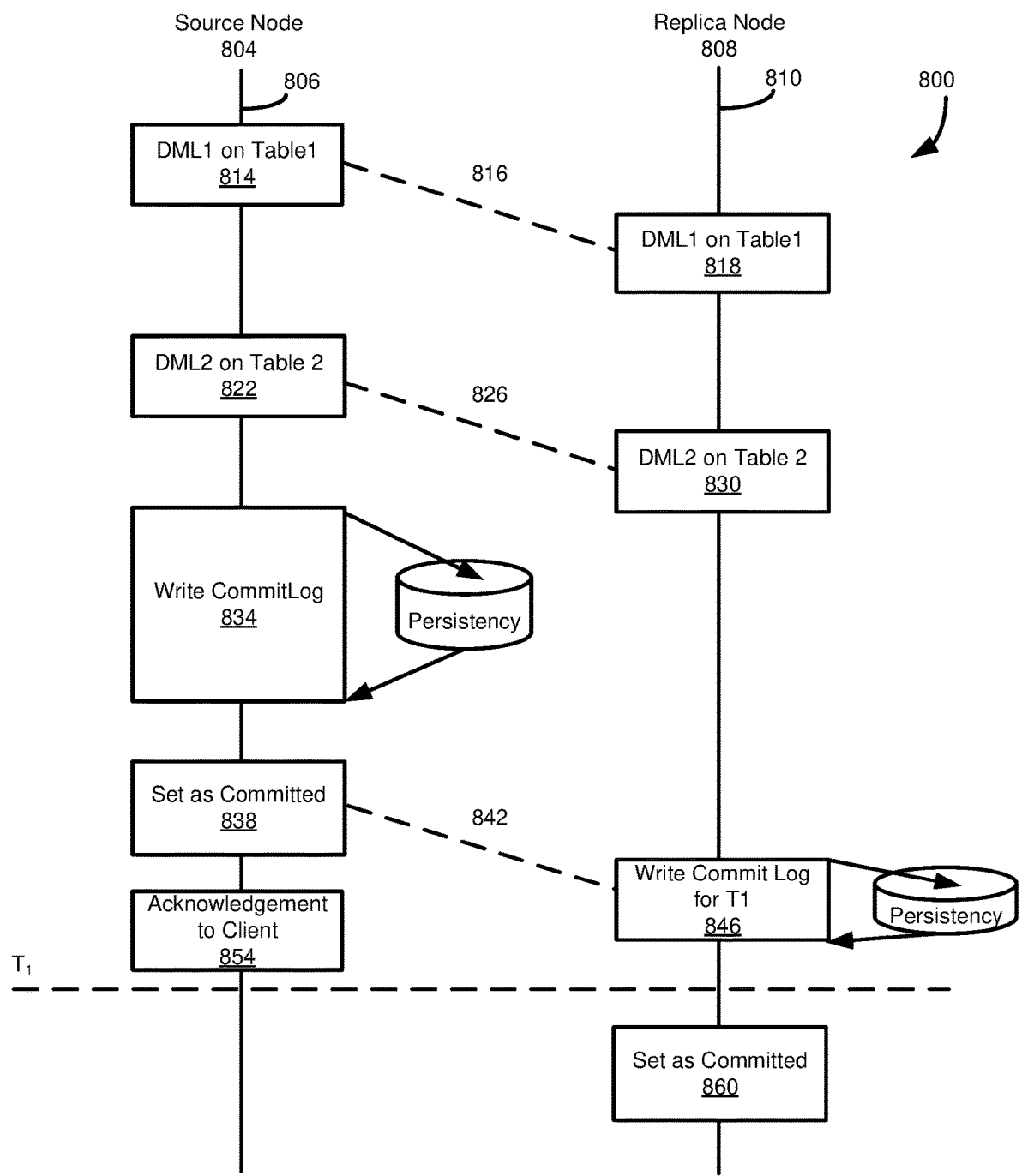
FIG. 8 is a diagram depicting an asynchronous database replication protocol.

FIG. 8 illustrates an asynchronous replication protocol 800. The protocol 800 is carried out at a source node 804 and a replica node 808, having respective execution timelines 806, 810. A first DML statement, DML1, of a transaction T1, is executed on Table 1 by the source node 804 at 814. The first DML statement is asynchronously sent to the replica node 808 in communication 816, and is executed by the replica node at 818. A second DML statement, DML2, of T1 is executed on Table 2 by the source node 804 at 822. The second DML statement is asynchronously sent to the replica node 808 in communication 826, and is executed by the replica node at 830.

Without coordinating with the replica node 808, the source node 804 writes a commit log entry for the transaction T1 at 834. The source node 804 sets the transaction as committed at 838. The source node 804 asynchronously sends the commit operation (including a commit ID) to the replica node 808 in communication 842. The replica node 808 writes a commit log entry for the transaction at 846, and marks the transaction as committed at 860. Without waiting for the replica node 808 to start, or complete, its commit processing, the source node 804 returns a commit acknowledgement to a database client at 854.

Although the DML statements and commit operations are shown as being sent in separate communications 816, 826, 842, in other cases, two or more of these statements and operations can be grouped into a single communication. As explained above, while the protocol 800 includes less overhead, it can result in database read operations seeing different data versions depending on whether the query is processed by the source node 804 or the replica node 808. In particular, at time $T_1$, the transaction T1 has committed at the source node 804, and so a query will see the versions of Table 1 and Table 2 having the changes of T1. In contrast, a query executed by the replica node 808 at time $T_1$ will see a version of Table 1 and Table 2 without the changes of T1.

Figure 9:
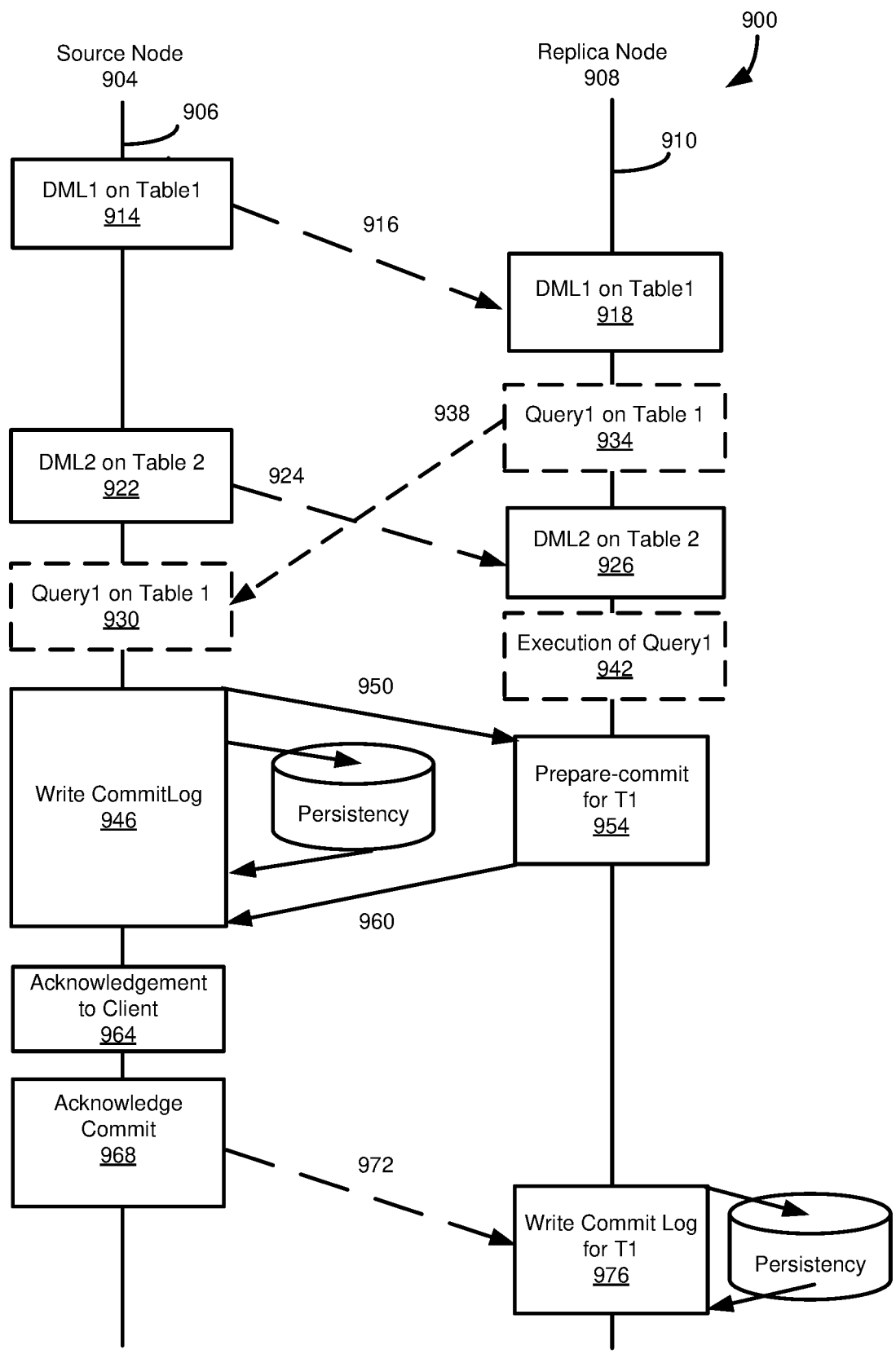
FIG. 9 is a diagram depicting a partially, or "optimistic," synchronous database replication protocol.

Variants of synchronous table replication can provide stronger consistency guarantees (e.g., queries executed by the source and replica nodes will see the same version of the database) than asynchronous table replication, but with reduced overhead compared with completely synchronous replication. An example protocol 900 is illustrated in FIG. 9, and includes operations carried out at a source node 904 and a replica node 908, with respective execution timelines 906, 910.

At 914, a DML statement DML1 on Table 1 is executed at the source node 904 and then asynchronously sent to the replica node 908 in communication 916. At 918, DML1 is executed on the replica node 908. Another DML statement DML2 on Table 2 is executed at the source node 904 at 922, and then asynchronously sent to the replica node 908 in communication 924. DML2 is executed at the replica node 908 at 926.

In optional block 930, Query1, part of the same transaction as DML1 and DML2, is carried out at the source node 904. In some cases, Query1 is received by the source node 904 directly from a database client. In other examples, Query1 is forwarded to the source node 904 by the replica node 908. For example, the replica node 908 optionally receives Query1 at 934.

In some cases, the replica node 908 forwards the query to the source node 904, such as in optional communication 938, when the replica node 908 determines that the query will access tables modified in the same transaction as the query. In other examples, the query may be first held by the replica node 908 pending the execution by the replica node 908 of the DML statements upon which the query depends in the same transaction. Upon execution of the DML statements by the replica node 908, the replica node 908 may optionally process the query at 942.

In other examples, if the query is pending at the replica node 908 for a time exceeding a predetermined threshold, the query is forwarded to the source node 904 by the replica node 908 in optional communication 938. The source node 904 then executes the same-transaction query in optional block 930. By ensuring that the necessary DML statements have been executed on the replica node 908 before executing Query1, or forwarding Query1 to the source 904, the protocol 900 can ensure that Query1 accesses the appropriate version of the database, and a version that will provide consistent results even though DML statements are sent asynchronously from the source node to the replica node.

The predefined threshold may depend on a particular implementation and can be, for example, about 0.1 milliseconds, about 0.25 milliseconds, about 0.5 milliseconds, about 0.75 milliseconds, about 1 millisecond, about 1.5 milliseconds, about 2 milliseconds, about 5 milliseconds, about 10 milliseconds, or about 50 milliseconds, such as being 0.1 milliseconds, 0.25 milliseconds, 0.5 milliseconds, 0.75 milliseconds, 1 millisecond, 1.5 milliseconds, 2 milliseconds, 5 milliseconds, 10 milliseconds, or 50 milliseconds. In further implementations, the predefined threshold is between about 0.05 milliseconds and about 50 milliseconds, between about 0.1 milliseconds and about 10 milliseconds, between about 0.25 milliseconds and about 5 milliseconds, between about 0.5 milliseconds and about 2.5 milliseconds, or between about 0.1 milliseconds and about 1 millisecond, such as being between 0.05 milliseconds and 50 milliseconds, between 0.1 milliseconds and 10 milliseconds, between 0.25 milliseconds and 5 milliseconds, between 0.5 milliseconds and 2.5 milliseconds, or between 0.1 milliseconds and 1 millisecond. In other implementation, the predefined threshold has some other value.

The protocol 900 can provide improved processing of queries, and DML statements, because database operations are propagated asynchronously. For example, the source node 904 can execute DML2 without waiting for DML1 to be synchronized with the replica node 908. Similarly, Query1 can be executed by the source node 904 without waiting for synchronization of DML1 and DML2 with the replica node 908.

At 946, the source node 904 prepares to commit the transaction that includes DML1, DML2, and Query1. The source node 904 sends the replica node 908 a synchronous prepare commit request in communication 950. The replica node 908 precommits the transaction at 954, marking the transaction as "in-doubt" at the replica node 908. In some implementations, the precommitting can include having the replica node 908 write a precommit log to persistent storage.

The replica node 908 sends a synchronous precommit acknowledgment to the source node 904 in communication 960. During the period where communications 950, 960 and the precommit process 954 are occurring, the source node 904 writes a commit log entry at 946. Overlapping writing the write log at the source node 904 with the precommit process at the replica node 908 can help reduce delays incurred by the replication process.

If desired, communications between the source node 904 and the replica node 908 can be grouped to further reduce the effect of network communications on the time needed to commit transactions at the source host 904, or to precommit or commit transactions on the replica node 908. For example, concurrent precommit requests 950 can be grouped by the source node 904 into a single physical network call. Similarly, precommit acknowledgements 960 from the replica node 940 can be grouped into a single physical network call. The asynchronous commit requests 972 (described below) from the source node 904 may similarly be grouped to be sent to the replica node 908.

At 964, after the commit process 946 has completed at the source node 904, and the source node 904 has received the synchronous precommit acknowledgement 960 from the replica node 908, the source node 904 acknowledges the commit of the transaction to a client (not shown). At 968, the source node 904 prepares the replica node 908 to commit the transaction, including by sending an asynchronous commit request in communication 972. In some examples, preparing the replica to commit at 968 occurs before, or in parallel with, acknowledging the commit to the client at 964.

The replica node 908 commits the transaction at 976, including by writing a commit log to persistent storage and marking the transaction as "committed" at the replica node 908.

In addition to expediting transaction processing at the source node by not requiring synchronization at every DML transaction, the protocol 900 can improve replication performance by including a single synchronization point (the precommit process, communications 950 and 960) as part of the transaction commit process. This process also allows the results of the transaction to be made available at the source node 904 (for queries in the same transaction or outside the transaction) without waiting for the transaction to be fully committed at the replica node 908. The replicated data can be made available at the replica node 908, to queries outside the transaction, when the transaction is committed by the replica node 908. Because the replica node 908 marks the DML statements as being in-doubt until the transaction is committed, and because queries outside the transaction will not execute on the replica node 908 if the results of earlier changes in the transaction are not visible, there is no danger of read requests obtaining out of date data from the replica node 908.

If desired, various modifications can be made to the protocol 900. For instance, rather than having the DML statements asynchronously sent from the source node 904 to the replica node 908, the DML statement can be sent synchronously, but the commit acknowledgment at 972 can remain asynchronous. In addition, or alternatively, the commit acknowledgement at 972 can be made synchronous.

Example 7

Replicated Database Environment Providing Fault-Tolerant and Adaptive Query/Prepared Statement Routing In replicated database systems, including database systems using a replication protocol described in Example 6, all or a portion of a replica node may become unavailable. When a client attempts to connect with an unavailable replica node, or retrieve particular data (e.g., via a read request/query) that has become unavailable, database systems typically return an error. In addition, in many systems, when an error is detected at a replica node, replication for the entire database system is suspended. Thus, a high number of aborted queries can be encountered when a replica node becomes unavailable, and system performance can be drastically reduced.

Figure 10:
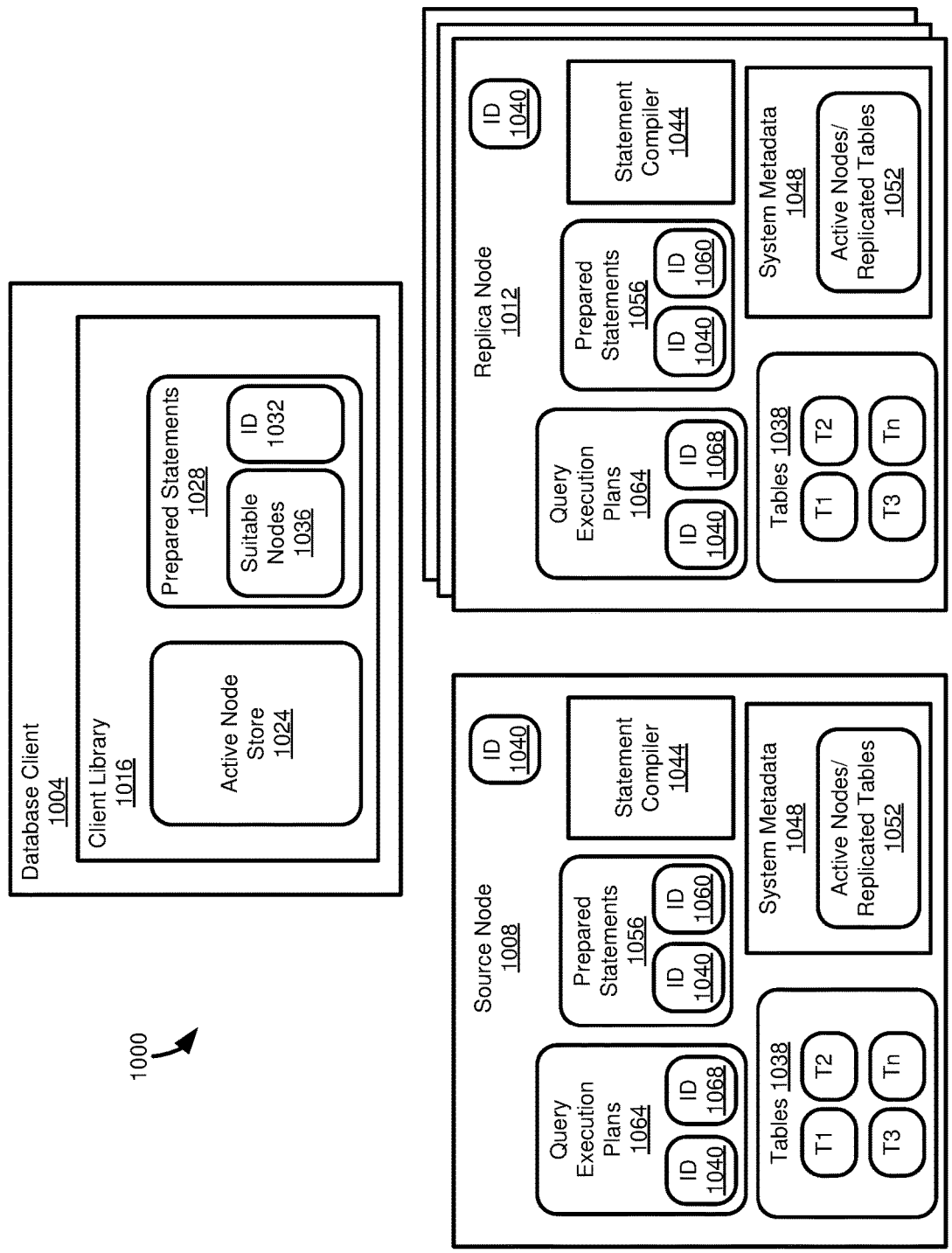
FIG. 10 is a block architectural diagram illustrating an example replicated database environment in which at least certain disclosed innovations may be implemented.

FIG. 10 illustrates an architecture 1000 in which certain disclosed innovations can be implemented that can allow for queries or prepared statements (including a prepared statement for a query) to be rerouted when a replica node, or particular data of a replica node, becomes unavailable. The architecture 1000 includes a database client 1004, a source node 1008, and one or more replica nodes 1012. The database client 1004 can include a client library 1016. The client library 1016 can include an active node store 1024 that includes identifiers of available database nodes of the architecture 1000, including the source node 1008 and any available replica nodes 1012. The store 1024 can be periodically updated, such as by the source node 1008 or one of the replica nodes 1012, whenever there is a change in the availability status of a node. Alternatively, the database client 1004 can directly determine the availability status of nodes 1008, 1012. Although the database client 1004 can include information about the nodes that are present in the architecture 1000, and with which the database client can establish a connection, the store 1024 may not include information about the particular data stored by a particular node. Thus, the database client 1004 may not have information sufficient to determine which nodes are suitable for processing a particular query.

In distributed systems, the database client 1004 can typically send statements (e.g., SQL statements, such as for a query) to one of the nodes to be prepared, providing prepared statements (which can be, for example, prepared statements for queries) 1028. Each prepared statement 1028 can be associated with an identifier 1032, which can be used to identify a corresponding prepared statement and/or query execution plan at a node 1008, 1012, and a list of suitable nodes 1036 for processing the prepared statement. The list of suitable nodes 1036 can include nodes that are capable of processing the prepared statement. In some cases, the list of suitable nodes 1036 can be ordered, such as being ordered by how efficiently each node may be able to process the prepared statement, which can be based on, for example, a communication speed with the node, a processing load of the node, a portion of the prepared statement that can be executed by the node, and combinations thereof.

Preparing a statement, such as a SQL statement, can expedite statement processing, including because the prepared statement can include information about which nodes are best suited to process the statement, such as storing information needed for at least part of the statement. In this way, rather than, for example, sending a query (or other SQL statement) to a replica node 1012 that does not store the needed data, and then forwarding the query from that replica node to another replica node, the query can be sent directly from the database client 1004 to a replica node 1012 that can at least partially process the query, which can reduce the number inter-node communications and speed query processing.

Each node 1008, 1012 can store one or more tables 1038, which can be source tables (where data can be both read from and written to) or replica tables (from which data can be read). The nodes 1008, 1012 can maintain one or more identifiers 1040 that can be used to track the status of the database system of the architecture 1000. In some cases, one or more of the identifiers 1040 can be synchronized, including being periodically synchronized, among multiple nodes 1008, 1012. In other cases, one or more of the identifiers 1040 can be different between the different nodes 1008, 1012.

A particular identifier 1040 can be associated with metadata versioning. For instance, certain metadata entities, such as prepared statements 1028, can become out of date based on certain changes to the database system. To ensure that the database system operates appropriately, metadata entities can be checked to see if they are out of date with respect to an identifier 1040, and out of date entities can be reevaluated or recreated. In particular, an identifier 1040 associated with metadata versioning can be used by a node 1008, 1012 to determine whether a prepared statement 1028 sent by the client 1004 is out of date. The identifier 1040 of the nodes 1008, 1012 can increment upon the occurrence of particular database events, such as a change in the availability status of a node 1012, such as the node becoming inactive (e.g., because the replica node has crashed or has been turned off or otherwise removed from communication with the other nodes 1008, 1012 or the database client 1004) or all or a portion of the replica node is otherwise unavailable (e.g., there is a network error, the replica node is out of memory, a process of the replica node has become deadlocked, etc.).

The identifier 1040 may also be incremented if there is a change in the replication behavior of the architecture 1000, such as if replication is stopped, started, or modified (e.g., replica nodes 1012 are added or removed from the replication environment, or there is a change in the distribution of replicated data among the replica nodes). In some cases, a change in the replication status (e.g., replication being started or stopped), or a replica node becoming unavailable or available, can be detected at the source node 1008 and the replica nodes 1012. In other cases, a change can be detected by the source node 1008, and the source node can direct the replica nodes 1012 to update their identifiers 1040. For instance, if replaying a write transaction at a replica node 1012 encounters errors, the errors may be detected by the source node 1012, but may not be detectible by the other replica nodes. In this case, the source node 1008 can inform the other replica nodes 1012 that a particular replica node is unavailable, or particular tables or records of the particular replica node are unavailable, and direct the replica nodes to update their identifiers 1040.

Statements can be prepared (including for queries) by a statement compiler component 1044 of the source node 1008 and the replica nodes 1012. In preparing a statement, the statement compiler component 1044 can access system metadata 1048, which can include information 1052 regarding active nodes 1008, 1012 in the architecture, and the distribution of data among the nodes (e.g. a list of tables replicated at particular database system nodes). The system metadata 1048 can be used by the statement compiler component 1044 to determine candidate nodes for executing all or a portion of a statement being prepared. These candidate nodes can be included in the list of suitable nodes 1036 included in the prepared statements 1028 of the database client 1004.

When a request to prepare a statement is received from the database client 1004, the statement compiler 1044 can prepare the statement, including creating a stored prepared statement 1056 that can include the identifier 1040 (e.g., a value indicating when the prepared statement was generated) and an identifier 1060 for the particular prepared statement (which, in some cases, can be the same as the identifier 1032). If the prepared statement 1056 is executable at the node 1008, 1012 where the statement is being prepared (e.g., because the node has at least one table 1038 with relevant data), the statement compiler 1044 can generate (or cause to be generated) a query execution plan 1064, which can also include the identifier 1040 (e.g., a value corresponding to when the query execution plan 1064 was generated) and an identifier 1068 (which, in some cases, can be the same as the identifier 1060 or the identifier 1032). When a request to execute a prepared statement 1028 is received by a node 1008, 1012 from the database client 1004, the node can determine whether a prepared statement 1056 is available, and, if so, can determine if the prepared statement is associated with a query execution plan 1064. If a query execution plan 1064 exists, the query execution plan can be executed by the node 1008, 1012 (optionally, after determining that the prepared statement 1054/query execution plan are still valid, such as using values of the identifier 1040).

Note that, in at least some cases, prepared statements 1056 and/or query execution plans 1064 can be specific to a particular node 1008, 1012. So, if, for example, a node 1008 1012 creates a prepared statement that indicates that the prepared statement can be executed on another node, before the other node executes the prepared statement, the database client 1004 may need to request the other node to also generate a prepared statement 1056, and potentially a query execution plan 1064. After generating those entities, the database client 1004 can request the other node to execute the prepared statement 1056 generated by that node. In some aspects, different prepared statements 1056, and query execution plans 1064, can have different version identifiers 1040 (e.g. the versions may have been created at different times by different nodes).

If a prepared statement 1028 is received at a node 1008, 1012 from the database client 1004, the identifier 1032 of the prepared statement can be used to retrieve the appropriate prepared statement 1056. The value of the identifier 1040 associated with the prepared statement 1056 can be compared with a current value of the identifier 1040. If the result of the comparing indicates that the status of the database system of the architecture 1000 has changed since the statements 1056, 1028 were prepared (and, potentially, when a corresponding query execution plan 1064 prepared), the prepared statement 1028 can be invalidated, the statement prepared again, the new prepared statement 1056 stored at the node 1008, 1012, and a new prepared statement 1032 sent to the database client 1004.

In this way, when there is a change in replica nodes 1012 available to process a prepared statement, rather than simply aborting the statement (such as aborting a query), the statement can be re-prepared and executed by currently available replica nodes, or the source node (including after such nodes also prepare the statement and, optionally, a query execution plan). Or, in other cases, when a replica node 1012 becomes unavailable, or problems are encountered during replication, prepared statements 1028 can be directed to the source node 1008 only. In some cases, routing prepared statements 1028 to the source node 1008 can be accomplished by updating the list of active nodes 1024 at the client device 1004 to only list the master node. In other cases, when a statement is sent to a source node 1008 or a replica node 1012 to be prepared, or a prepared statement sent to be executed, the statement is prepared to be executed only at the source node. When replication is reactivated, the list of active nodes 1024 at the database client 1004 can be updated to include the replica nodes 1012, or a metadata identifier 1040 can be incremented, so that a statement sent to a node 1008, 1012 to be prepared, or a prepared statement 1028 sent for execution, can be prepared (including re-prepared) for execution at appropriate replica nodes 1012 (as well as, potentially, the source node 1008).

Example 8

Adaptive Prepared Statement/Query Routing Strategies

Figure 11A:
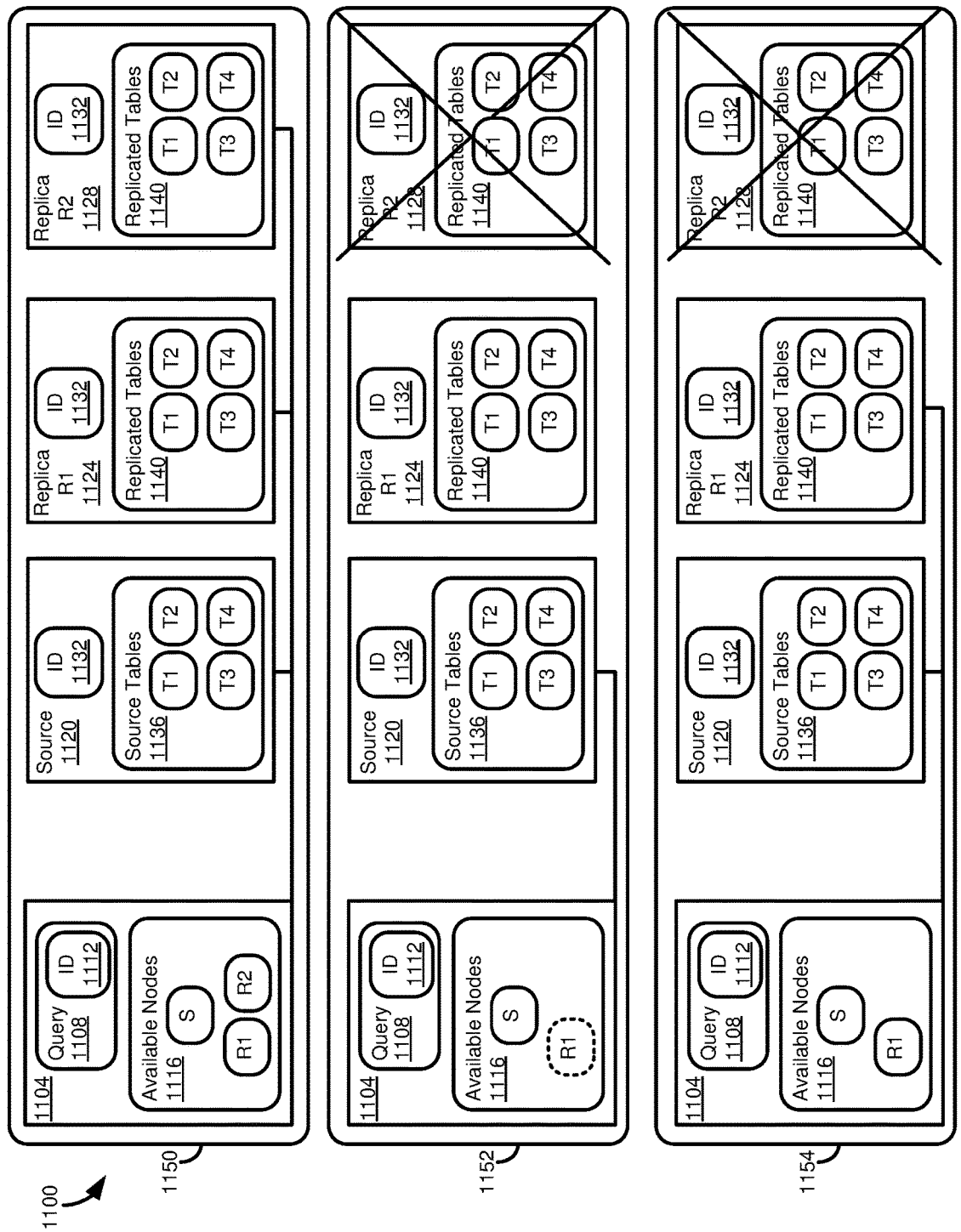
FIG. 11A is diagram schematically depicting different strategies for prepared statement/query routing when a replica database system node becomes fully or partially unavailable.
Figure 11B:
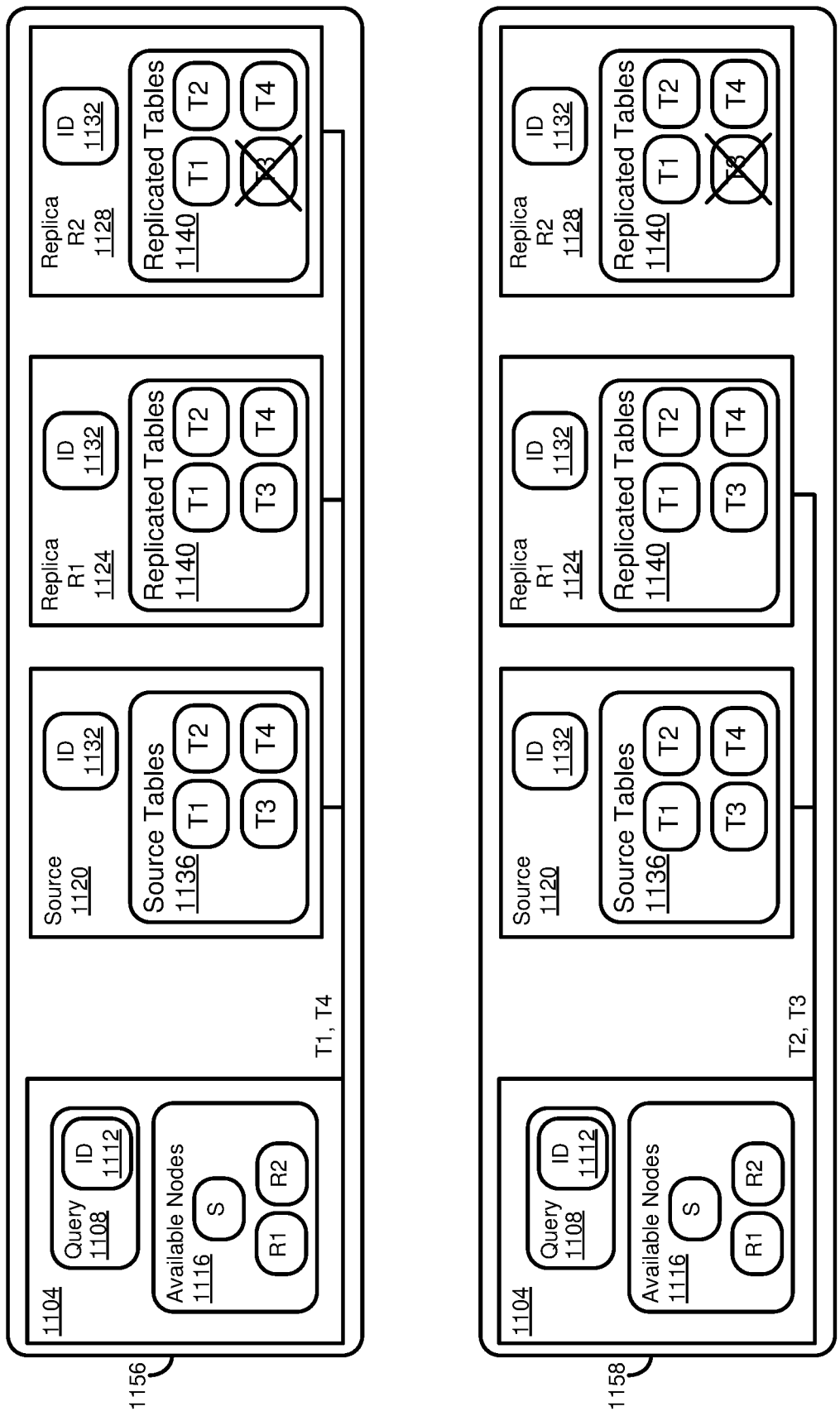
FIG. 11B is diagram schematically depicting prepared statement/query routing strategies when a portion of tables replicated at a replica database system node are unavailable, while another portion remain available.

FIGS. 11A and 11B illustrate various scenarios for routing prepared statements/queries in a replicated database system 1100 after a status change of a replica node, such as using queries embodied in a prepared statement. The database system 1100 includes a database client 1104 having a prepared statement (or precompiled query) 1108 associated with an identifier 1112 (e.g., the identifier 1032) and a list 1116 of available nodes in the database system. The database system 1100 includes a source node 1120 (which, in some cases, can represent a source database system having a plurality of nodes, and can be designated as S), a first replica node 1124 (which can be designated as R1), and a second replica node 1128 (which can be designated as R2).

Each of the nodes 1120, 1124, 1128 includes an identifier 1132, which can be associated with a current metadata version. In at least some cases, the identifiers 1132 can be different among the different nodes 1120, 1124, 1128, but optionally can be periodically synchronized. The source node 1120 includes a plurality of source tables 1136. Each replica node 1124, 1128 includes replicated tables 1140 for all or a portion of the source tables 1136 of the source node 1120. Although FIG. 11A illustrates all source tables 1136 being replicated, in other cases a replica node 1124, 1128 may only replicate a portion of the source tables, and different replica nodes may replicate different tables.

Diagram 1150 illustrates the database system 1100 at a time $T_0$. The database system 1110 includes tables T1, T2, T3, T4, which are stored in the source node 1120 and at each of the replica nodes 1124, 1128. The list 1116 of available nodes at the database client 1104 lists S, R1, and R2 as available in the database system. The prepared statement 1108 is executable at any of nodes S, R1, and R2.

At a time $T_1$, illustrated in diagram 1152, replica node 1128, R2, becomes unavailable. For instance, replica node 1128 could have crashed, could have experienced a network error, or could be otherwise unresponsive. The list 1116 of available nodes at the database client 1104 is updated to reflect that replica node 1128 is unavailable. In some cases, the unavailability of replica node 1128 is determined by the database client 1104. In other cases, the unavailability of the replica node 1128 is sent to the database client by the source node 1120 or the replica node 1124.

In the scenario represented in diagram 1152, the prepared statement 1108 is only executable at the source node 1120. In some cases, the prepared statement 1108 can be indicated as executable only at the source node 1120 by incrementing the identifiers 1132 of the source node 1120 and the replica node 1124. When the prepared statement 1108 is sent to the source node 1120 or the replica node 1124, the source or replica node determines that the version identifier of the prepared statement (e.g., the identifier 1040 of prepared statement 1056) of the prepared statement is out of date, prepares the statement to be only executable at the source node, and sends the new prepared statement to the database client 1104.

In a specific example, a prepared statement 1108 is associated with a version timestamp of 11, and the current value of the identifiers 1132 is 11. After the replica node 1128 has been determined to be unavailable, the source node 1120 and the replica node 1124 increment their identifiers to 12. When the prepared statement 1108 is received, such as by the replica node 1124, the version timestamp of the prepared statement (11) is determined to be less than the identifier value of the replica node 1124 (12), as so the prepared statement can be determined to be out of date, or in need of being re-prepared.

In other cases, the list 1116 of available nodes at the database client 1104 is updated to list only the source node 1120 as available in the database system 1100, optionally also incrementing the identifier 1132, invalidating the prepared statement 1108, re-preparing the statement, and sending the updated prepared statement to the database client (as discussed above, although the prepared statement may only list the source node as a node that can execute the prepared statement). Thus, in the scenario in diagram 1152, when a replica node 1124, 1128 becomes unavailable, prepared statements (for example, representing a query) are routed only to the source node 1120.

Diagram 1154 illustrates an alternative for how the database system 1100 may operate when a replica node 1124, 1128 becomes unavailable. The list 1116 of available nodes at the database client 1104 is updated to reflect that source node 1120 and replica node 1124 are available, which may be carried out as described above. In this case, rather than being executable only at the source node 1120, the prepared statement 1108 is executable at the source node or at the replica node 1124. When the prepared statement 1108 is sent to the source node 1120 or the replica node 1124, the prepared statement can be identified using the identifier 1112, a current (incremented) value of the identifier 1132 can be compared with the version identifier of the prepared statement (e.g., the identifier 1040 associated with the prepared statement 1056). The prepared statement 1108 can be determined to be out of date, and the statement re-prepared (e.g., a query plan recompiled) to indicate that it can be executed at the source node 1120 at the replica node 1124.

The example scenarios of FIG. 11A illustrate operation of the database system 1100 when a replica node 1124, 1128 is completely unavailable, or is treated as being completely unavailable (e.g., even if part of the replica node is operational, the replica node is treated as being unavailable). However, in some cases, there may be a problem with a replica node 1124, 1128 that affects only certain tables, such as a write process for a particular table that is experiencing errors or is deadlocked. In some aspects of the present disclosure, rather than marking an entire replica node 1124, 1128 as unavailable, the replica node can be marked as unavailable (or available) for particular data (e.g., particular tables or records).

When a replica node 1124, 1128 is partially available, the replica node can remain in the list 1116 of the database client 1104. When part of a replica node 1124, 1128 is unavailable, the identifiers 1132 can be updated, forcing a prepared statement 1108 to be re-prepared when the prepared statement is sent from the database client 1104. Prepared statements 1108 that do not involve the unavailable portion of a replica node 1124, 1128 can continue to be routed to the source node 1120 and all replica nodes. Prepared statements 1108 that involve the unavailable portion of a replica node 1124, 1128 can be routed to the source node 1120 and any replica node 1124, 1128 where the needed data is available.

In FIG. 11B, part of replica node 1128 has become unavailable, such that table T3 is no longer available. In diagrams 1156 and 1158, the source node 1120 and both replica nodes 1124, 1128 remain in the list 1116 of available nodes at the database client 1104. Diagram 1156 illustrates a scenario for a statement (e.g., a query) that accesses tables T1 and T4. Tables T1 are T4 are available at all of the nodes 1120, 1124, 1128. When, table T3 becomes unavailable, the identifiers 1132 of the nodes 1120, 1124, 1128 can be incremented. When the prepared statement 1108 is sent to a node 1120, 1124, 1128 to be executed, the prepared statement is determined to be out of date, the statement re-prepared, and the updated prepared statement sent to the database client 1104. The updated prepared statement can then be sent to any of nodes 1120, 1124, 1128, where it is executed (including after preparing the statement and, optionally, creating a query execution plan).

Diagram 1158 illustrates a scenario for a prepared statement 1108 that accesses tables T2 and T3. Although table T2 is available at all of the nodes 1120, 1124, 1128, table T3 is not available at replica node 1128. As described above, when table T3 became unavailable, the identifiers 1132 of nodes 1120, 1124, 1128 were incremented. When the prepared statement 1108 that accesses T2 and T3 is sent to a node 1120, 1124, 1128, the prepared statement is determined to be out of date, the statement is re-prepared, and the updated prepared statement is sent to the database client 1104. The updated prepared statement 1108 can be sent to the source node 1120 or the replica node 1124, where it is executed (including after preparing the statement and, optionally, creating a query execution plan).

Tracking the availability of data at a level more granular than whether an entire replica node is available or not (e.g., tracking the availability of individual tables) can add additional overhead to the database system 1100. However, this more granular level of tracking can maintain more of the benefits of replication, as the unavailability of a single (or limited number) of tables on a replica node will not prevent that replica node from servicing other queries, which can increase the throughput and response time of the database system 1100.

In any of the example scenarios depicted in FIGS. 11A and 11B, when the replica node 1128 becomes available again (either the entire node, as in FIG. 11A, or table T3, as in FIG. 11B), the metadata identifiers 1132 of the nodes 1120, 1124, 1128 can be incremented. The next time a prepared statement 1108 is sent from the database client 1104 to a node 1120, 1124, 1128, the prepared statement can be determined to be out of date, the statement re-prepared, and the updated prepared statement sent to the database client. The updated prepared statement 1108 can include replica node 1128 as an active node capable of processing the prepared statement. The updated prepared statement can be sent to one of the nodes 1120, 1124, 1128 to be executed, and can be executed by such node (including after preparing the statement and, optionally, creating a query execution plan).

In the example scenarios of FIGS. 11A and 11B, and as described elsewhere in the present disclosure, an updated prepared statement (e.g., for a query) is described as being sent to the database client, and then the database client sending the updated prepared statement to a database node for execution (where the statement is then executed, including after generating a prepared statement 1056, and possibly a query plan 1064 for that particular node). In other aspects, the updated prepared statement can be sent from the node re-preparing the statement to a database node specified in the updated prepared statement as capable of executing the prepared statement. The updated prepared statement can also be sent to the database client by the database node performing the re-preparation of the statement, or can be sent to the database client along with statement execution results by the executing node.

Example 9

Routing of Queries to Source Node on Replica Node Failure

Figure 12:
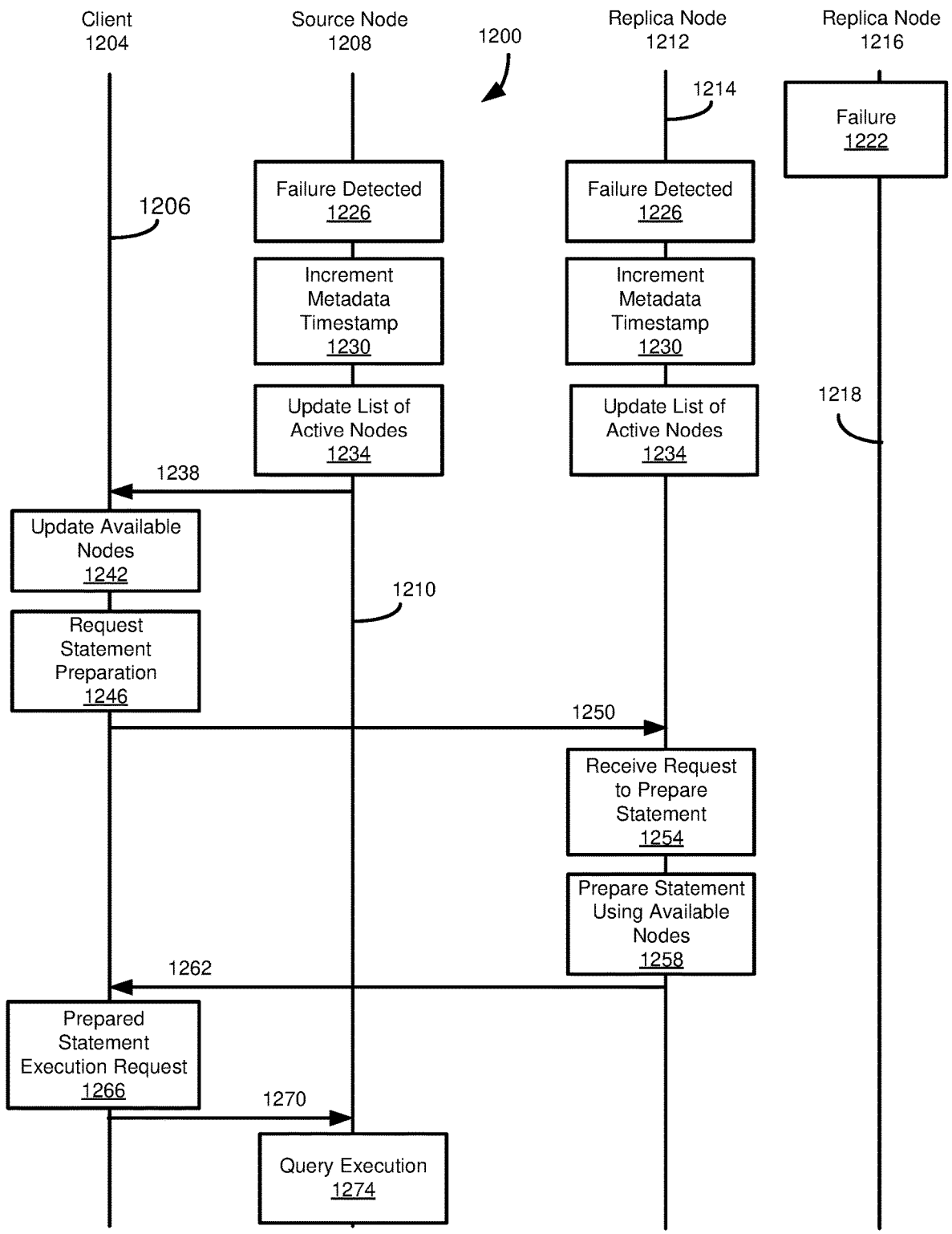
FIG. 12 is a diagram of an example routing protocol for routing prepared statements/queries to a source node when a replica node becomes unavailable.

FIG. 12 illustrates operations 1200 occurring at a database client 1204, a source node 1208, a first replica node 1212, and a second replica node 1216, having respective execution timelines 1206, 1210, 1214, 1218, during an example scenario for statement (or query) routing when the status of a replica node is changed. In particular, the operations 1200 illustrate a scenario where statements are routed to the source node 1208 when a replica node 1212, 1216 is fully or partially unavailable.

The second replica node 1216 experiences a full or partial failure at 1222. The failure is detected by the source node 1208 and the first replica node 1212 at 1226. Although shown as occurring concurrently, in at least some cases, the failure of the second node 1216 can be detected by the source node 1208 and the first replica node 1212 at different times. When the failure of the second replica node 1216 is detected, the source node 1208 and the first replica node 1212 increment a metadata identifier, such as a timestamp, at 1230. At 1234, the source node 1208 and the first replica node 1212 update a list of active nodes.

The source node 1204 sends a communication 1238 to the database client 1204 to update a list of active nodes maintained by the database client. The database client 1204 updates its list of active nodes at 1242. The operations 1200 can carried out differently in some aspects. For instance, rather than the communication 1238 being sent by the source node 1208, it can be sent by the first replica node 1212. Or, operations 1200 can omit the communication 1238, such as if the database client 1204 directly determines that the second replica node 1216 is unavailable (such as by detecting that a network connection with the second replica node has been terminated or is unavailable).

The database client 1204 requests that a statement be prepared (e.g., for a query), or a previously prepared statement be executed, at 1246. The request is sent in a communication 1250 to one of the available nodes in the system. In the case of a prepared statement, if the prepared statement can be directed to a node that is active and capable of executing the prepared statement, it is sent to such node. If such a node is not available, the request to execute the prepared statement can be sent to any active node.

As shown, the communication 1250 is received by the first replica node 1212 at 1254. At 1258, if the request of communication 1250 is to prepare a statement, the statement is prepared indicating that the statement should be executed at the source node 1208. If the request of communication 1250 is to execute the prepared statement, an identifier associated with the prepared statement is examined. The identifier is determined to be older (such as having a lower integer value) that the incremented identifier resulting from 1230. Rather than executing the prepared statement, the first replica node 1212 re-prepares the statement at 1258 to indicate that the prepared statement should be executed at the source node 1208. The prepared, or re-prepared, statement is sent from the first replica node 1212 to the database client 1204 in communication 1262. In other implementations, the communication 1250 can be sent to the source node 1208, which can carry out preparation/re-preparation at 1258 and send the communication 1262.

The database client 1204 issues a request to execute the prepared statement at 1266, which is sent to the source node 1208 in communication 1270. The source node 1208 executes the prepared statement at 1274.

Figure 13:
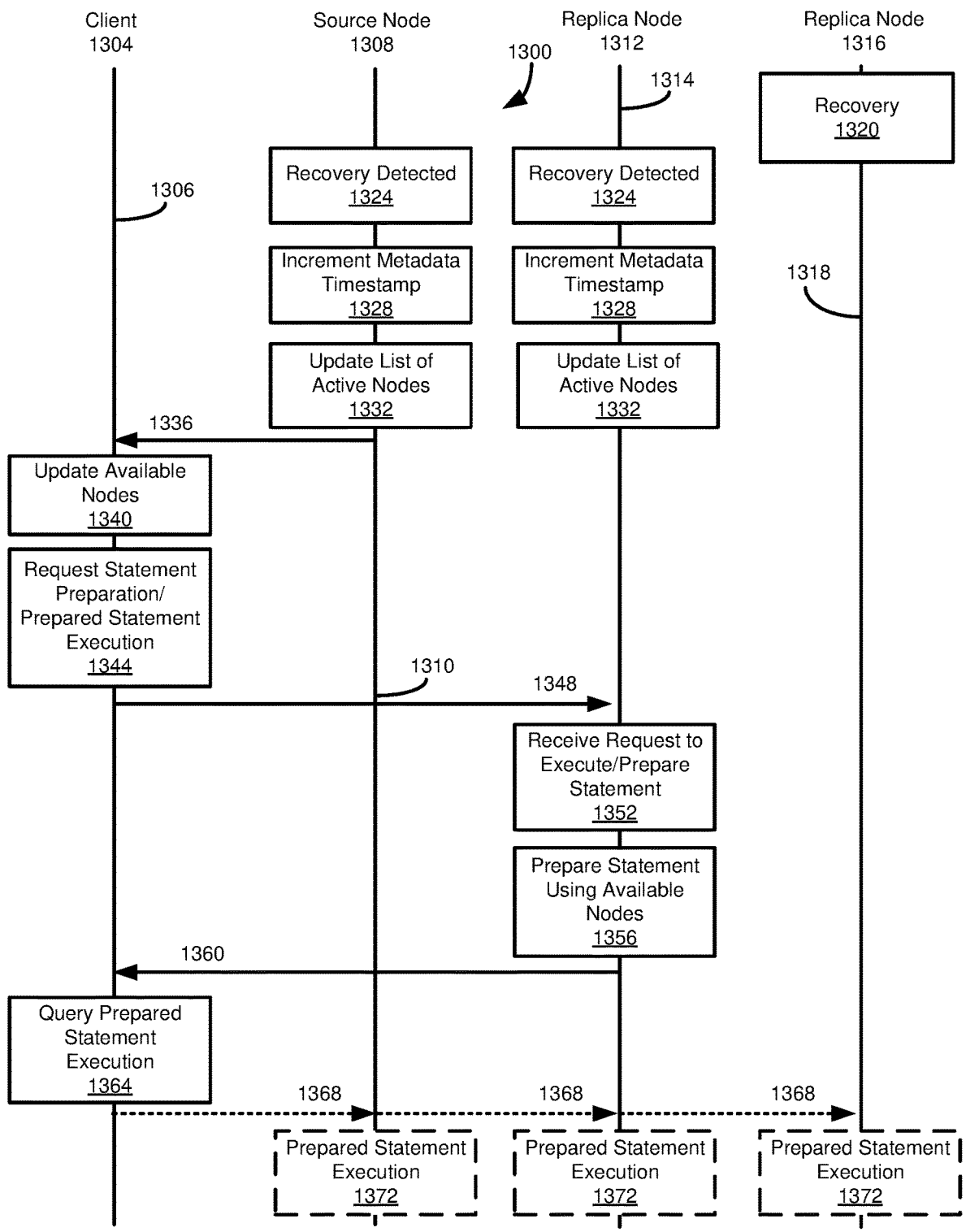
FIG. 13 is a diagram of an example prepared statement/query routing protocol for routing queries/prepared statements to available database system nodes when a replica node becomes available.

FIG. 13 illustrates operations 1300 occurring at a database client 1304, a source node 1308, a first replica node 1312, and a second replica node 1316, having respective execution timelines 1306, 1310, 1314, 1318, if the second replica node becomes available to process prepared statement. At 1320, the second replica node 1316 recovers from a crash or failure situation, or otherwise becomes available to process prepared statements. The recovery is detected by the source node 1308 and the first replica node 1312 at 1324. The source node 1308 and the first replica node 1312 update their identifiers, such as a metadata timestamp, at 1328. The source node 1308 and the first replica node 1312 update their list of active nodes at 1332. The source node 1308 can send a communication 1336 to update the list of active nodes at the database client 1304. The database client 1304 updates its list of active nodes at 1340. Alternatively, the database client 1304 determines that the second replica node 1316 is available in another manner, such as receiving the communication 1336 from the first replica node 1308 or directly detecting that the second replica node has become available.

At 1344, the database client 1304 requests that a prepared statement be executed or, a statement be prepared, and sends the request in a communication 1348. The communication 1348 is received by the first replica node 1312 at 1352. Alternatively, the communication 1348 could be received, and subsequent actions performed, by the source node 1308 or the second replica node 1316. At 1356, the first replica node 1312 prepares or re-prepares the statement (e.g., after determining that a prepared statement is associated with a version timestamp that is less than the value of the identifier produced by 1328) using the list of currently available nodes, including the second replica node 1316. The prepared or re-prepared statement is sent to the database client 1304 in communication 1360. At 1364, the database client 1304 sends the prepared statement for execution at 1372 in communication 1368. The communication 1368 can be sent to, and the execution 1372 performed by, the source node 1308, the first replica node 1312, or the second replica node 1316. Prior to execution, the node to which the communication 1368 is sent can prepare the statement and, optionally, a query execution plan.

Example 10

Routing Queries to Available Replica Nodes on Replica Node Availability Change

Figure 14:
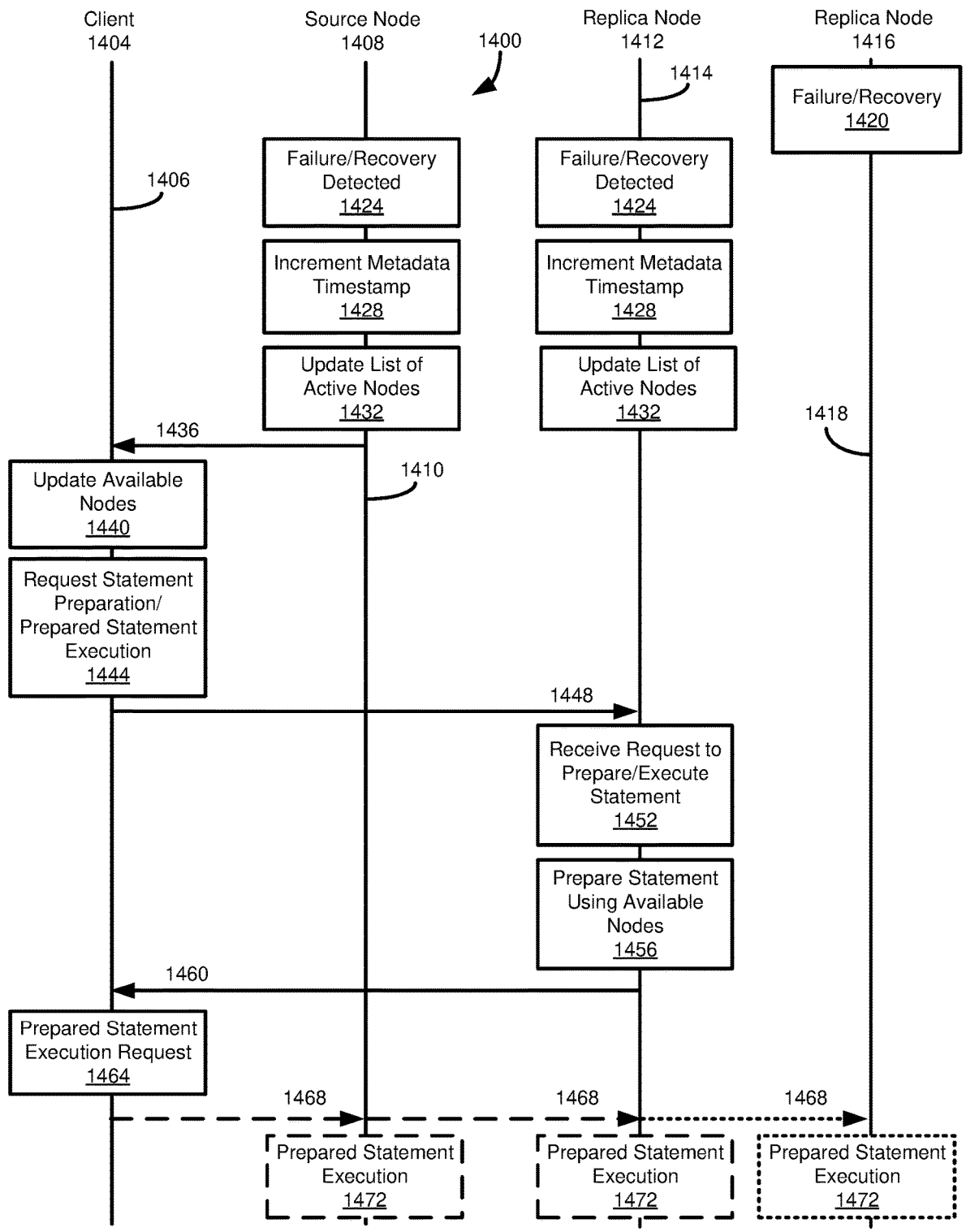
FIG. 14 is a diagram of an example prepared statement/query routing protocol for routing queries/prepared statements to available database system nodes when the availability status of a replica node changes.

FIG. 14 illustrates operations 1400 occurring at a database client 1404, a source node 1408, a first replica node 1412, and a second replica node 1416, having respective execution timelines 1406, 1410, 1414, 1418, during an example scenario for query routing (or statement routing, or query routing using prepared statement) when the status of a replica node is changed. In particular, the operations 1400 illustrate a scenario where prepared statements are routed to any available node 1408, 1412, 1416 when a replica node 1412, 1416 becomes fully or partially unavailable, or when a replica node becomes available again.

The second replica node 1416 becomes unavailable (e.g., crashes, deadlocks, experiences a network error) or becomes available (e.g., recovers from a crash, network error, or deadlock) at 1420. The failure or recovery is detected by the source node 1408 and the first replica node 1412 at 1424. The source node 1408 and the first replica node 1412 update an identifier (e.g., by incrementing an integer value), such as a metadata timestamp, at 1428. In some cases, the identifiers can be updated independently, in other cases a node, such as the source node 1408, can direct another node, such as the first replica node 1412, to update the identifier.

The source node 1408 and the first replica node 1412 update a list of active nodes at 1432. For example, if a failure of the second replica node 1416 was detected, the source node 1408 and the first replica node 1412 can remove the second replica node from the list of active nodes at 1432. If a recovery of the second replica node 1416 was detected, the source node 1408 and the first replica node 1412 can add the second replica node to the list of active nodes at 1432. Although the actions at 1424, 1428, and 1432 are shown as occurring concurrently at the source node 1408 and the first replica node 1412, in some aspects, one or more of these actions can occur at a different times at the source node than at the first replica node.

The source node 1408 sends a communication 1436 to update a list of available nodes maintained at the database client 1404 to the database client. The database client 1404 updates its list of available nodes at 1440. In other cases, the communication 1436 is sent by the first replica node 1412, or, rather than performing the update at 1440 based on the communication 1436, the database client 1404 updates the list of available nodes in another manner, such as by directly detecting that the availability status of the second replica node 1416 has changed (e.g., by a network connection being broken or established between the database client and the second replica node).

At 1444, the database client 1404 requests that a statement be prepared, or a previously prepared statement be executed. The request is sent to the first replica node 1412 in communication 1448. However, the request can be sent to, and subsequent processing carried out by, any available node (e.g., in the example shown, the source node 1408 or the first replica node 1412). The first replica node 1412 receives the communication 1448 at 1452.

If the request is to prepare the statement, the first replica node 1412 prepares the statement using its list of currently active nodes. If the request is to execute a prepared statement, the first replica node 1412 determines that the prepared statement is associated with an identifier (e.g., a version timestamp) that is out of date (e.g., has a lower value) than an identifier, such as a metadata timestamp, maintained by the first replica node. The first replica node 1412 re-prepares the statement at 1456 using its list of currently active available nodes. When a statement is re-prepared, the updated prepared statement can remove a node as compared with a previous version (e.g., when the second replica node 1416 has become unavailable) or add a node as compared with a previous version (e.g., when the second replica node has become available). The prepared statement/updated prepared statement is sent to the database client 1404 by the first replica node 1412 in communication 1460.

At 1464, the database client 1404 sends the prepared statement to be executed. The request is sent in communication 1468. The communication 1468 can be sent to any available node indicated in the prepared statement. In the case of a prepared statement made when the second replica node 1416 become unavailable, the communication 1468 can be sent to the source node 1408 or the first replica node 1412. In the case of a prepared statement made when the second replica node 1416 became available, the communication 1468 can be sent to the source node 1408, the first replica node 1412, or the second replica node 1416. The prepared statement is executed by a node 1408, 1412, 1416 to which the communication 1468 was sent at 1472. Prior to executing the prepared statement, the node 1408, 1412, 1416 is sent can prepare the statement and, optionally generate a query execution plan.

Example 11

Figure 15:
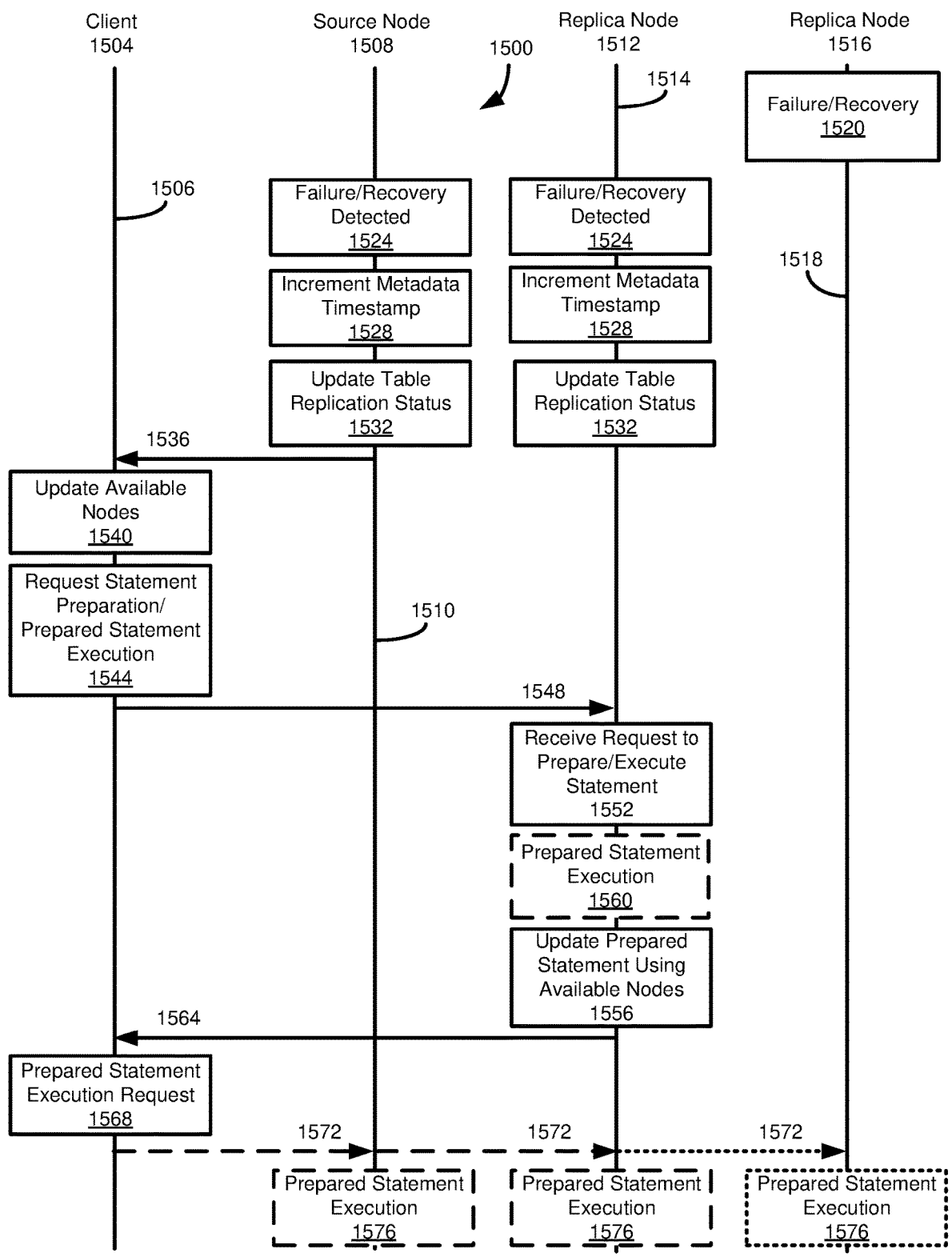
FIG. 15 is a diagram of an example query/prepared statement routing protocol for routing queries/prepared statements to available database system nodes when the availability status of particular tables replicated at a particular replica node changes.

Prepared Statement/Query Routing Based on Table Availability Status at Replica Nodes FIG. 15 illustrates operations 1500 occurring at a database client 1504, a source node 1508, a first replica node 1512, and a second replica node 1516, having respective execution timelines 1506, 1510, 1514, 1518, during an example scenario for prepared statement routing (including for query routing) when the status of a replica node changes. In particular, the operations 1500 illustrate a scenario where prepared statements are routed to any available node 1508, 1512, 1516 replicating the accessed tables when a replica node 1512, 1516 replicating the accessed tables becomes fully or partially unavailable, or when such a replica node becomes available again.

The second replica node 1516 becomes unavailable (e.g., crashes, deadlocks, experiences a network error) or becomes available (e.g., recovers from a crash, network error, or deadlock) at 1520. In this Example, the failure, and subsequent recovery, can affect only a portion of the data (e.g., particular tables or records) replicated at the second replica node 1516. For instance, if the second replica node 1516 replicates tables T1-T4, the failure may affect only T1. Such a failure can be caused, for example, by a deadlock, an error with a particular network connection, or a memory or storage failure that affects less than all of the replicated data.

The failure or recovery is detected by the source node 1508 and the first replica node 1512 at 1524. The source node 1508 and the first replica node 1512 update an identifier (e.g., by incrementing an integer value), such as a metadata timestamp, at 1528. In some cases, the identifiers can be updated independently, in other cases a node, such as the source node 1508, can direct another node, such as the first replica node 1512, to update the identifier.

The source node 1508 and the first replica node 1512 update the replication status of replicated tables at 1532. For example, if a failure is detected that affects replicated table T1 of the second replica node 1516, but not replicated tables T2-T4, the source node 1508 and the first replica node 1512 can update the replication status of the replicated tables to indicate that the second replica node 1516 is not available to service requests for T1, but remains available to service requests for T2-T4. If a recovery of the second replica node 1516 was detected that makes T1 available again at the second replica node, the source node 1508 and the first replica node 1512 can update that replication status of the replicate tables to indicate that tables T1-T4 are available at the second replica node.

Although the actions at 1524, 1528, and 1532 are shown as occurring concurrently at the source node 1508 and the first replica node 1512, in some aspects, one or more of these actions can occur at a different time at the source node than at the first replica node. In particular, a replication failure, or recovery, at the second replica node 1516 may initially be detected by the source node 1508 (e.g., because the source node detected a failure in a commit process for replication of a transaction involving the second replica node). The source node 1508 can communicate this status change to the first replica node 1512, including by sending an updated table replication status to the first replica node. An analogous process can occur if the source node 1508 determines that T1 is accessible again at the second replica node 1516 following a failure.

The source node 1508 sends a communication 1536 to update a list of available nodes maintained at the database client 1504 to the database client. The database client 1504 updates its list of available nodes at 1540. In other cases, the communication is sent by the first replica node 1512, or, rather than performing the update at 1540 based on the communication 1536, the database client 1504 updates the list of available nodes in another manner, such as by directly detecting that the availability status of the second replica node 1516 has changed (e.g., by a network connection being broken or established between the database client and the second replica node).

At 1544, the database client 1504 requests that a statement be prepared, or a previously prepared statement be executed. The request is sent to the first replica node 1508 in communication 1548. In the case of a statement to be prepared, the request can be sent to, and subsequent processing carried out by, any available node (e.g., in the example shown, the source node 1508, the first replica node 1512, or the second replica node 1516), even if the node does not replicate tables needed by the statement. In the case of a prepared statement to be executed, the request can be sent to, and subsequent processing carried out by, any node indicated in the prepared statement (which could be one or more of the source node

1508, the first replica node 1512, and the second replica node 1516, depending on the status of the database system when the statement was originally prepared).

The first replica node 1512 receives the communication 1548 at 1552. If the request is to prepare the statement, the first replica node 1512 prepares the statement using its current table replication status information. If the request is to execute a prepared statement, the first replica node 1512 determines that the prepared statement is associated with an identifier (e.g., a version timestamp) that is out of date (e.g., has a lower value) than an identifier, such as a metadata timestamp, maintained by the first replica node. In one aspect, the first replica node 1512 re-prepares the statement at 1556 using its current table replication status information. When a statement is re-prepared, the updated prepared statement can remove a node as compared with a previous version (e.g., when a needed table at the second replica node 1516 has become unavailable), add a node as compared with a previous version (e.g., when the needed replicated table has become available at the second replica node), or can remain unchanged (e.g., when the second replica node changed status, but the status change did not affect a table needed for the prepared statement).

In another aspect, rather than always repreparing a statement if a version timestamp associated with the prepared statement is out of date with respect to an identifier of the first replica node 1512, the prepared statement can be analyzed to determine whether it accesses a table whose status has changed on the second replica node 1516. In some cases, version information can be maintained for each table, and associated with a prepared statement, such that a prepared statement only need be re-prepared if it involves a table having a changed version (e.g., whose metadata timestamp was incremented in the replication status information at 1528). If the prepared statement does not involve a changed version, the prepared statement can be executed at 1560.

If a statement was prepared, the prepared/re-prepared statement is sent to the database client 1504 by the first replica node 1512 in communication 1564. At 1568, the database client 1504 sends the prepared statement to be executed. The request is sent in communication 1572. The communication can be sent to any available node indicated in the prepared statement. In the case of a prepared statement created when an accessed table became unavailable at the second replica node 1516, the communication 1572 can be sent to the source node 1508 or the first replica node 1512. In the case of a prepared statement created when an accessed table became available at the second replica node 1516, the communication 1572 can be sent to the source node 1508, the first replica node 1512, or the second replica node 1516. The prepared statement is executed by a node 1508, 1512, 1516 to which the communication 1572 was sent at 1576. Prior to executing the prepared statement, the node 1508, 1512, 1516 to which the communication 1572 was sent can prepare the statement, and, optionally, create a query execution plan.

Example 12

Interaction of Replication Processing and Node Availability Update Process

As discussed, in at least some aspects, a database client can send prepared statement to a source node or a replica node while data is being replicated in a replicated database system. Depending on the protocol used for replication (e.g., synchronous replication, optimistic synchronous replication, asynchronous replication), a prepared statement (e.g., for a query) may return different results depending on which node it is executed (e.g., whether it is executed at the source node, a replica node where recent data has been replicated, or a replica node where recent data has not been replicated).

In prior database systems, replication is typically suspended if one of the replica nodes becomes unavailable. In addition to allowing queries to be processed when an error occurs at a replica node, either by the source node, or by the source node or an available replica node, the disclosed innovations can allow replication to continue even if a replica node becomes fully or partially unavailable. In some cases, replication is completely stopped to the failed replica node. In other cases, if the replica node has only partially failed, replication can be continued for data that remains accessible at the replica node.

Figure 16:
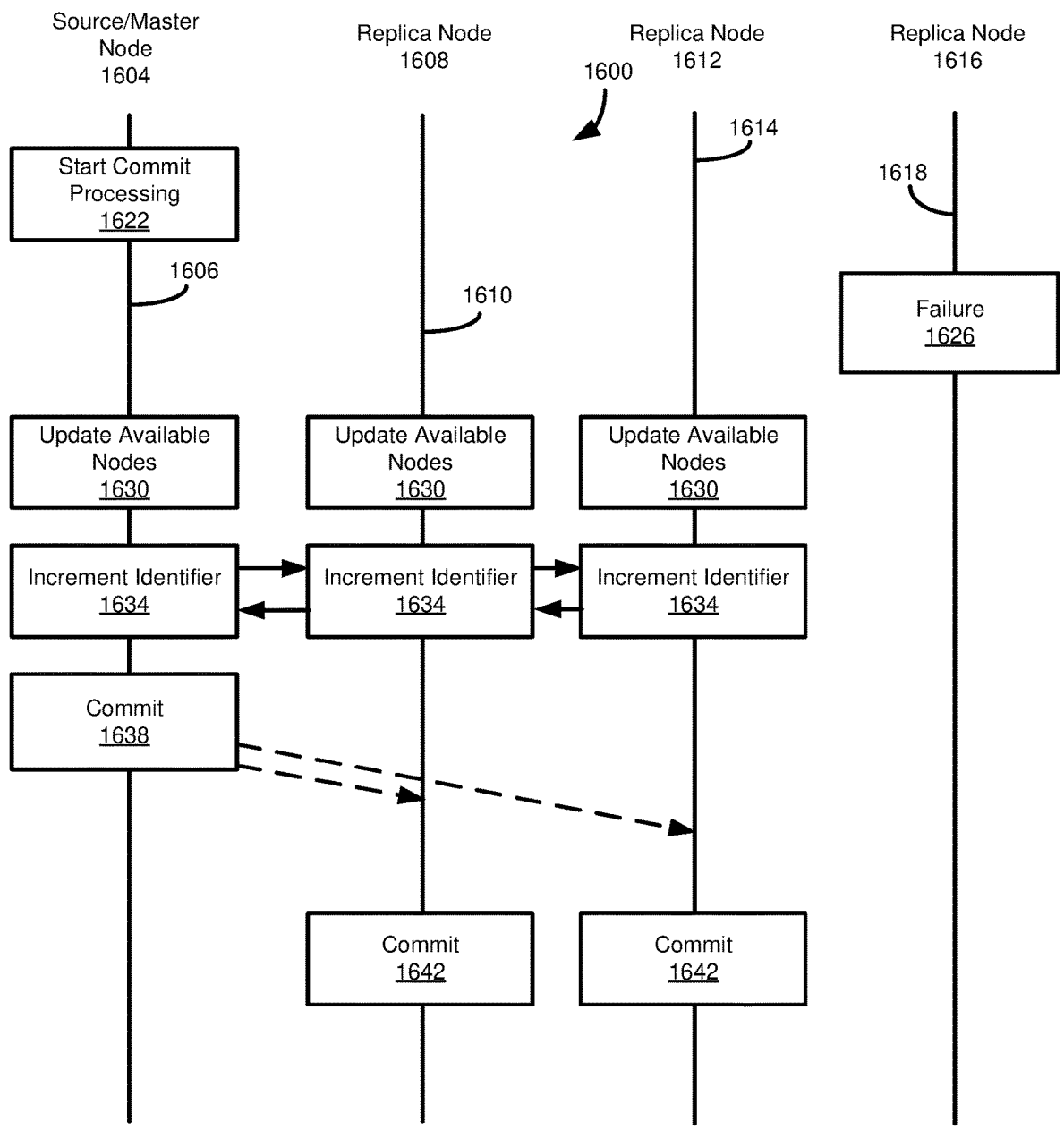
FIG. 16 is a diagram of example operations during a commit process that occurs concurrently with a change in the availability status of a replica node.

FIG. 16 illustrates operations 1600 occurring at a source node 1604, which also serves as a transaction master and coordinates (to a degree depending on the commit/replication protocol used) the commit of replicated transactions at a first replica (or transaction slave) node 1608, a second replica (or transaction slave) node 1612, and a third replica (or transaction slave) node 1616, having respective execution timelines 1606, 1610, 1614, 1618.

The source node 1604 starts commit processing of replicated database operations (e.g., a replicated transaction) at 1622. The commit/replication protocol may be a protocol described in the present disclosure, a variant of a commit/replication protocol described in the present disclosure, or another commit/replication protocol. The third replica node 1616 experiences a failure, which can be a full failure or a partial failure (e.g., affecting only particular replicated tables or records) at 1626. The failure of the third replica node 1616 is detected by the source node 1604, the first replica node 1608, and the second replica node 1612.

The nodes 1604, 1608, 1612 update a list of available nodes at 1630. In some aspects, updating the list of available nodes can include changing the status of the second replica node 1616 to inactive. In other aspects, updating the list of available nodes can include marking only certain data, such as particular records or tables of the third replica node 1616, as inactive. The nodes 1604, 1608, 1612 increment an identifier, such as a metadata identifier than can be used to invalidate prepared statements that may be stored at a database client, at 1634. Incrementing the identifier at 1634 is shown as a synchronous process. If desired, updating the list of available nodes at 1630 may be made synchronous instead of, or in addition to the, incrementing the identifier at 1634. Or, both 1630 and 1634 can be asynchronous. However, the nodes 1604, 1608, 1612 all carry out 1630 and 1634 before the source node commits the transaction at 1638 (e.g., prior to the synchronization step 950 of FIG. 9). The transaction is committed at the replica node 1608, 1612 at 1642. The commit 1642 is shown as occurring asynchronously, however, the commit could occur synchronously, in other implementations.

Thus, as shown in FIG. 16, the commit operation is paused to allow the system to be updated to reflect that the third replica node 1616 is unavailable, so that an error is not encountered during the commit process. Although FIG. 16 is described with respect to failure of a replica node, an analogous process can occur on recovery of a replica node.

Example 13

Example Database Node Operations for Adaptive Prepared Statement/Query Routing

FIG. 17 is a flowchart of example operations 1700 occurring at a database system node in a replicated database environment when a change is detected in the availability status of a replica node in the database system. At 1710, the database system node determines that the availability status of the replica node has changed. The database system node receives a prepared statement from a database client at 1720. The prepared statement specifies one or more nodes useable to execute the prepared statement. At 1730, the database system node updates the prepared statement (e.g., by repreparing the statement). The updated prepared statement includes a database system node that was not included in the prepared statement (e.g., if the replica node became available), or does not include a database system node that was in the prepared statement (e.g., if the replica node became unavailable). The updated prepared statement is sent to the database client at 1740.

Example 14

Example Database Client Operations During Adaptive Prepared Statement/Query Routing FIG. 18 is a flowchart of example operations 1800 occurring at a database client in communication with a replicated database system having a plurality of nodes. At 1810, the database client sends a request to a database system node to prepare a statement. The database client receives the prepared statement at 1820. The prepared statement specifies a plurality of database system nodes on which the prepared statement is executable. At 1830, the database client sends the prepared statement to one of the specified database system nodes. In response to the sending, at 1840, the database client receives an updated prepared statement (e.g., a re-prepared statement). The updated prepared statement specifies one or more nodes on which the updated prepared statement is executable. The nodes on which the updated prepared statement is executable includes a node that was not included in the prepared statement, or omits a node that was specified in the prepared statement.

Example 15

Figure 19:
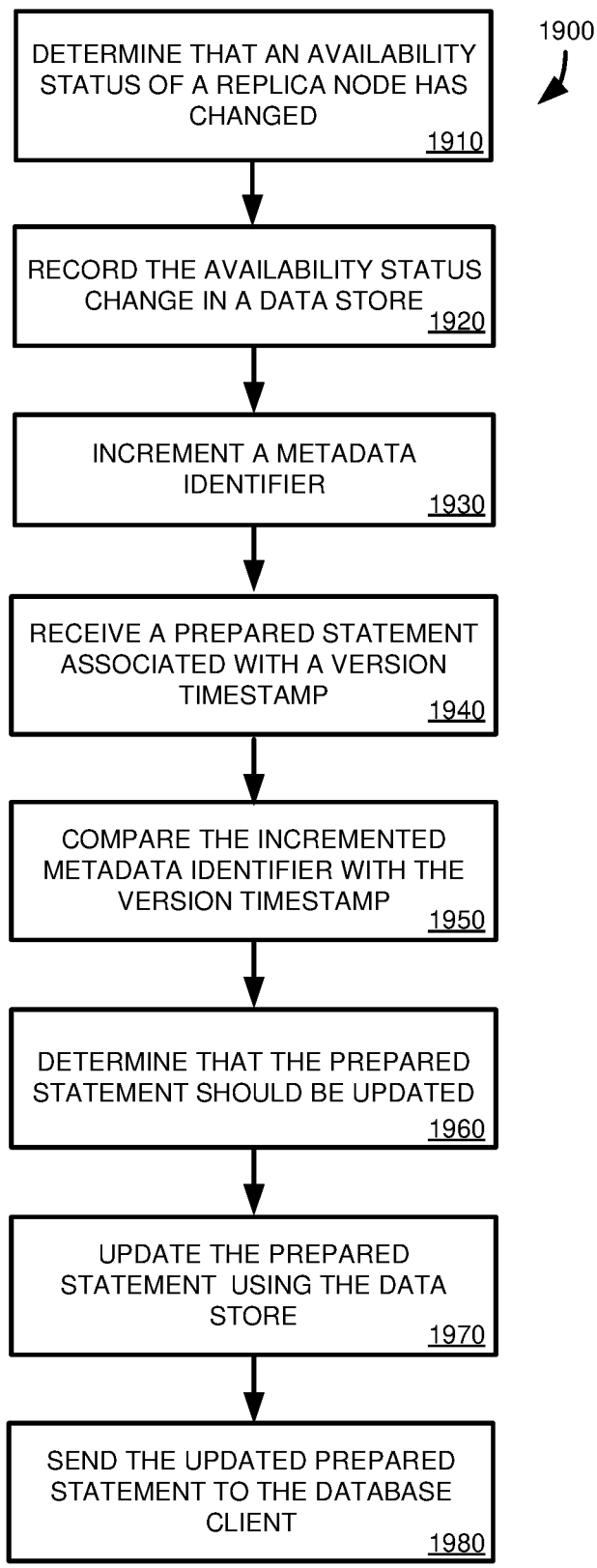
FIG. 19 is a flowchart of example operations, at a database system node, relating to query/prepared statement routing when a replica node of the database system experiences a change in availability status.

Example Database Node Operations for Adaptive Prepared Statement/Query Routing Using Metadata Identifiers FIG. 19 is a flowchart of example operations 1900 occurring at a database system node in a replicated database environment having at least one replica node when there is a change in the availability status of the at least one replica node. At 1910, it is determined that the availability status of the at least one replica node has changed, such as the at least one replica node becoming unavailable, or becoming available after previously being unavailable. The change in availability status is recorded in a data store at 1920, such as by making or modifying an entry in a table, list, file, or other data structure.

A metadata identifier is updated at 1930, such as by incrementing an integer value. At 1940, a prepared statement is received at the database system node, such as from a database client. The prepared statement is associated with a version timestamp (which may be stored on the database system node). At 1950 the updated metadata identifier is compared with the version timestamp of the prepared statement. It is determined, at 1960, that the prepared statement should be updated. For instance, the comparing may indicate that the version timestamp is out of date, and that there may be a change in the database system (e.g., in the availability of nodes of the database system) that may affect the execution of the prepared statement. At 1970, the prepared statement is updated using node availability information of the data store. The updated prepared statement is sent to the database client at 1980.

Example 16

Maintaining Cross-Table Transactional Consistency on Re-Activation of Table Replication Certain Examples of the present disclosure can involve synchronizing a replica system with a source system after replication, such as synchronous table replication with optimistic commit at a replica node, as described in Example 6, has been activated or reactivated. For example, in some situations, table replication may be manually deactivated (such as to perform maintenance) and subsequently reactivated, or may be restarted due to an exception occurring during table replication.

Figure 20:
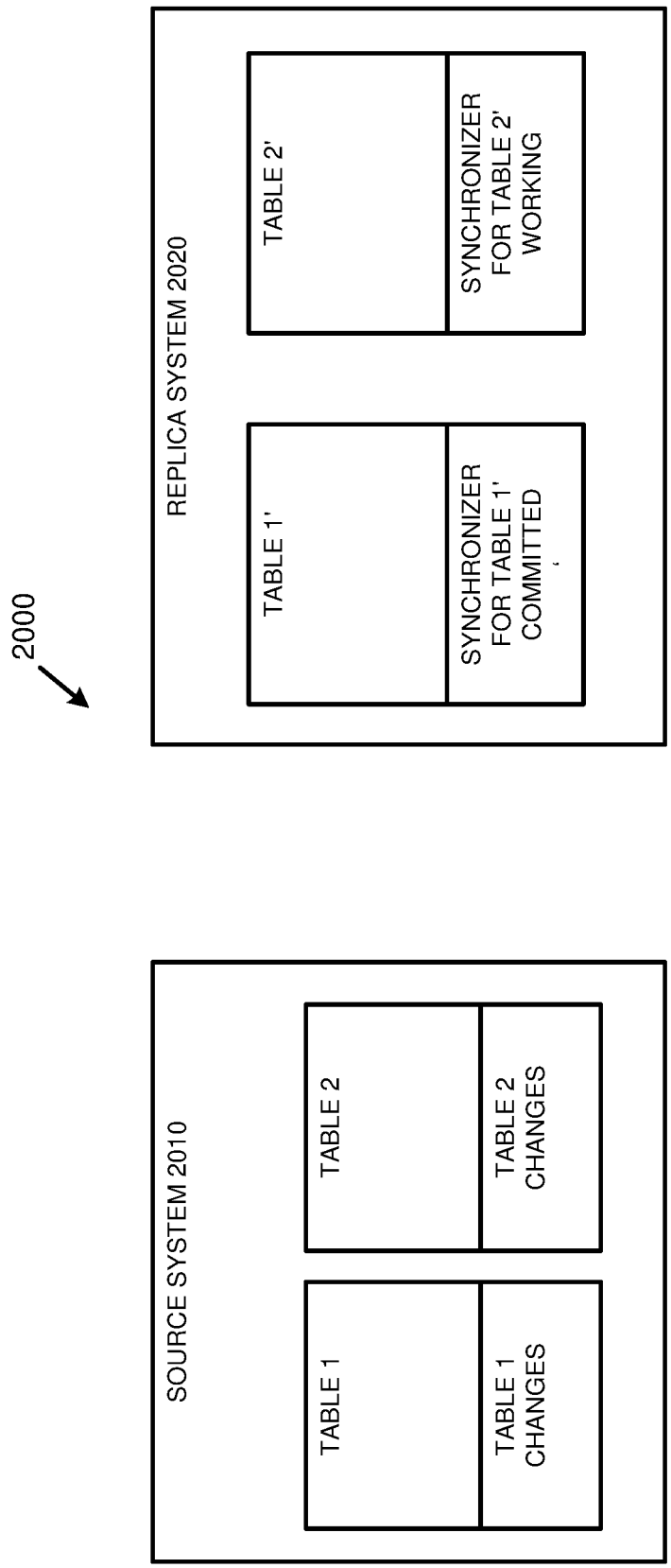
FIG. 20 is diagram depicting a database environment for synchronizing database tables maintained at a source system with copies of the database tables maintained at a replica system.

FIG. 20 illustrates a potential problem that can develop if tables are allowed to reactivate incrementally on a table-by-table basis. FIG. 20 illustrates a system 2000 having a source system 2010 that contains Tables 1 and 2 and a replica system 2020 that contains copies of Tables 1 and 2, which are being incrementally synchronized. In the source system 2010, changes to Table 1 and Table 2 have accumulated after synchronization was deactivated. Replica system 2020 shows that the synchronizer for Table 1 has finished committing the changes to Table 1', but the synchronizer for Table 2' is still working. If replica system 2020 is accessed at this point, a join operation between Table 1' and Table 2' can return inconsistent data (compared to the same join operation between Table 1 and Table 2 at the source system 2010).

Figure 21:
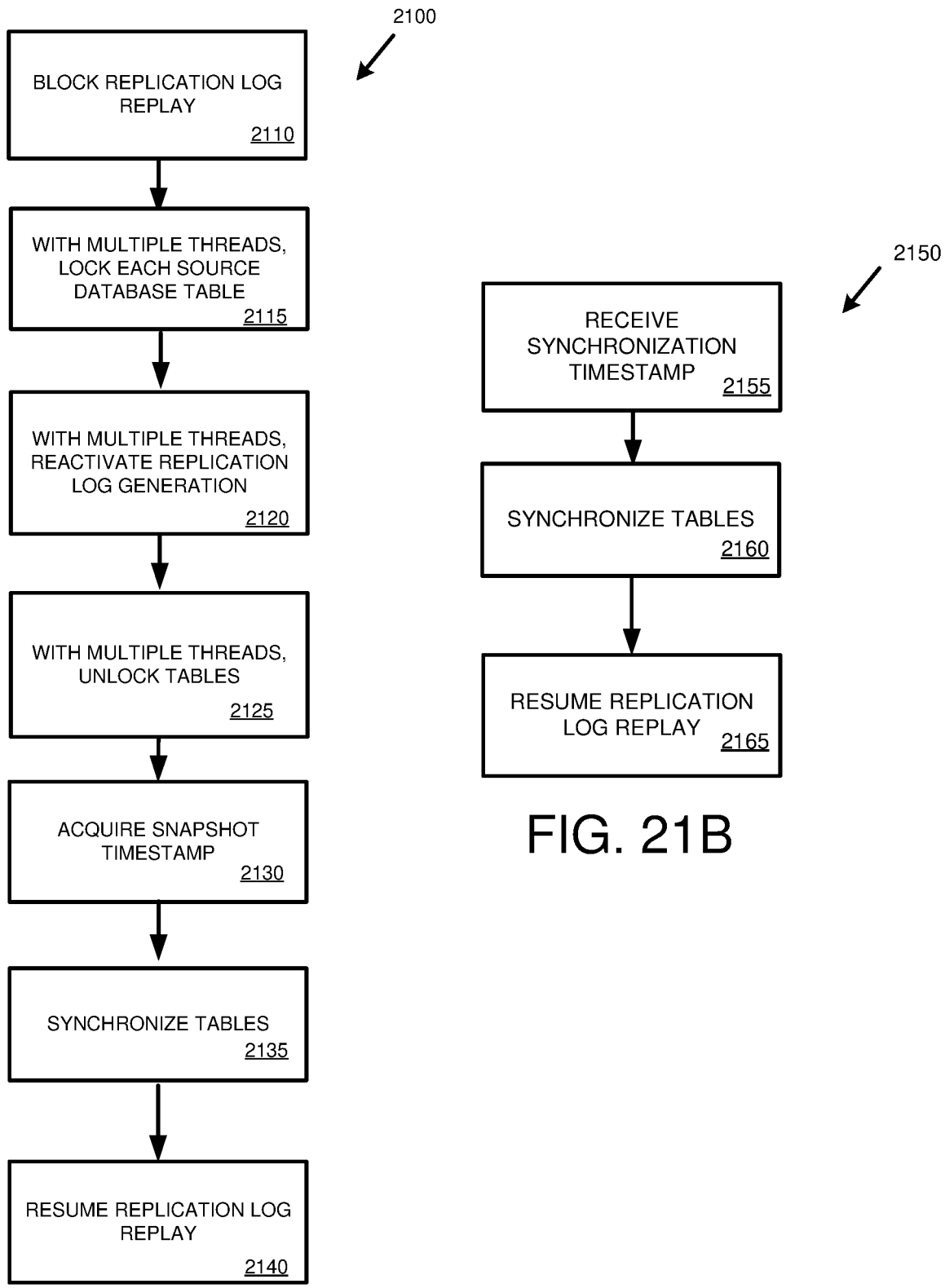
FIG. 21A is a flowchart of an example method involving a source node for synchronizing database tables maintained at a source system with copies of the database tables maintained at a replica node.
FIG. 21B is a flowchart of an example method involving a replica node for synchronizing database tables maintained at a source system with copies of the database tables maintained at a replica node.

FIG. 21A provides a flowchart of an example method 2100 for assisting in maintaining consistency in read operations received by a replica system during resynchronization following activation or reactivation of table replication. In step 2110, replication log replay, such as the processes described in Examples 1-6, is blocked. In a particular implementation, log entries continue to be generated by the source system, and may be sent to the replica system, even though the log entries are blocked from being replayed by the replica system.

To address this problem of potential inconsistencies during a reactivation period, the source system and the replica system can reactivate tables with a single internal transaction. In this way, the changes applied during reactivation can become visible at the same time, for all of the replicated tables.

In a parallel, multi-threaded process, each table in the source node is locked in step 2115. In step 2120, in a parallel, multi-threaded process, replication log generation is reactivated at each source table. The source tables are unlocked in step 2125, in a parallel, multi-threaded process. A snapshot timestamp is acquired in step 2130. The order of steps 2125 and 2130 may be reversed in some implementations of the method 2100.

In step 2135, the replica tables are selectively synchronized with the source tables. As described above, during this process, replica logs may be generated by the source node(s) and, if desired, sent to the appropriate replica node(s). However, the replica logs are not yet replayed.

Synchronization may be carried out in any suitable manner. In one specific example, synchronization is carried out by comparing the row-IDs values (as described in Example 4) of each source table and its replica table. If a row-ID value is present in the source table, but not in the replica table, the record is copied to the replica table. If the row-ID value is present in the replica table, but not in the source table, the record having that row-ID value is removed from the replica table. If the row-ID value is present in the source table and the replica table, no action is taken. Synchronization is carried out using the timestamp acquired in step 2130 (e.g., using the timestamp to select which transactions to ignore for replication log replay, and instead recover using synchronization). Thus, for example, records are synchronized between the copies of the tables (replica tables) and the source tables for any transaction having a transaction commit timestamp not later than the synchronization timestamp.

In step 2140, the resumption of replication log replay is initiated at the source host for the copies of the replicated database tables. In various implementations, initiation is carried out by the source system, the replica system, or another system in communication with the replica system.

During replication log replay, the log entry (write logs and transaction commit logs) is only replayed if the timestamp of the operation occurred later than the synchronization timestamp acquired in step 2125. Advantageously, this can help prevent transactions from being carried out multiple times, or missed logs being played even though the synchronization process already made appropriate changes to the replicated table.

FIG. 21B provides a method 2150 of synchronization operations implemented at least in part by the replica host. In step 2155, the replica host receives a synchronization timestamp. The copies of the database tables replicated at the replica host are selectively synchronized with the source database tables, based at least in part on the synchronization timestamp, in step 2160. In step 2165, replication log replay is resumed at the replica host, based at least in part on the synchronization timestamp. For example, the replica host executes an entry of a DML replayer log for any entry having an update timestamp not earlier than the synchronization timestamp or having a corresponding transaction commit timestamp later than the synchronization timestamp. The replica host can also execute any entry of a transaction log for any transaction commit timestamp later than the synchronization timestamp.

As described in method 2150, replica log replay is blocked for the replicated tables until the synchronization process is complete. In at least one implementation, during synchronization, the replicated tables may still receive read requests while synchronization is being carried out. However, the read requests will see the unsynchronized version of the tables, so join operations on different tables will still operate on table versions that are consistent with one another (although they may be out of date compared with data available in the source tables). Once synchronization is complete, join operations will be able to access the synchronized versions of the tables.

Figure 22:
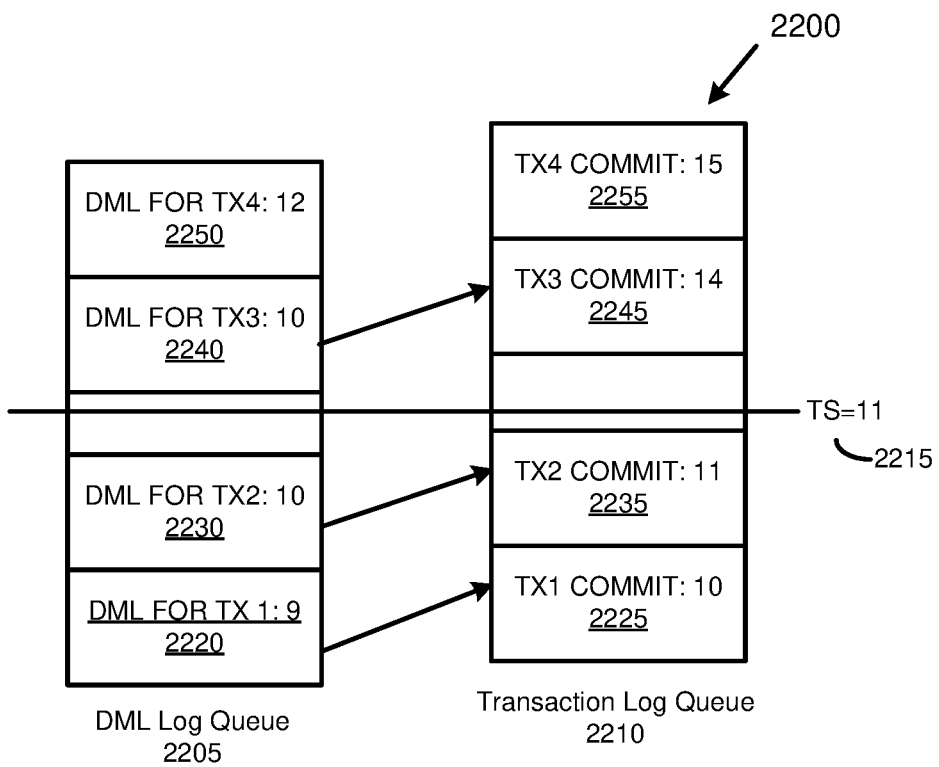
FIG. 22 is a diagram of a replica node illustrating how a synchronization timestamp may be used to determine whether write operations are replayed at the replica node.

FIG. 22 provides a diagram of a system 2200 illustrating DML and transaction log queues 2205, 2210 of a replica node illustrating how the method 2100 of FIG. 21A can assist in avoiding multiple log replay or replay of missed logs. The DML log queue 2205 is shown with multiple DML statements 2220, 2230, 2240, 2250 and the transaction log queue is shown with multiple transaction commit operations 2225, 2235, 2245, 2255. In FIG. 22, the arrows indicate relations between write operations and their corresponding transaction commit operations.

In this example, replica and source tables were synchronized with a timestamp 2215 of 11. In one aspect of a method of using the system 2200 of FIG. 22, write operations are replayed if the associated timestamp is greater than or equal to the synchronization timestamp 2215, as those statements will have occurred after synchronization completed. Write operations are also replayed if the timestamp of the commit operation is greater than the synchronization timestamp 2215, even if the timestamp of the write operation itself is less than the synchronization timestamp. Note that, in example implementations, the timestamp of a write operation is always less than the timestamp of its corresponding transaction commit operation.

Write operations 2220 and 2230 will not be replayed since their write timestamps are less than 11 and their commit timestamp is not greater than 11. Write operation 2240 will be replayed even though its write timestamp is less than 11, because the timestamp of its commit operation 2245 is greater than 11. Write operation 2250 will be replayed since its write timestamp is greater than 11. Transaction commit operations are replayed if their timestamps are greater than the synchronization timestamp. In the example of FIG. 22, transaction commit operations for TX entry 2245 and TX 2255 are replayed.

In a specific implementation, if the timestamp of the write operation is less than the synchronization timestamp, the write operation is held until the corresponding commit log is received and analyzed. As described above, if the timestamp of the commit operation is less than the synchronization timestamp, the write operation is not replayed. The write operation is replayed if the commit timestamp is greater than the synchronization timestamp.

In this way, transactions are divided by the synchronizing timestamp. Some updates (earlier updates), are replication by synchronization, while other updates (later updates, or updates from around the time the synchronization timestamp is acquired) are replicated by playback of the replication log. Missed transactions and double playback of transactions are avoided. Further, since the synchronization timestamp in effect defines a single internal transaction, readers see a consistent view of tables (all updated or all not updated).

Example 17

Alternative Scenarios

In many of the examples described above, a single source node replicates a database table with a single replica node. More generally, the protocols described herein can be used for 1-to-n replication between a source node and n replica nodes, where n is 2 or more, each of the n replica nodes storing a copy (replica) of the database table. In some implementations, n is 20, 50, 100, or more nodes. The protocol can also be used for n-to-1 replication, where at least a portion of a distributed source system (such as one or more selected tables, or portions thereof) has multiple source nodes and is replicated to a single replica node. The protocol can also be used with m-n replication, where at least part of a distributed source system (such as one or more selected tables, or portions thereof) are replicated to multiple replica nodes.

In many of the examples described above, a database table is replicated between a source node and replica node. As noted, term database table indicates any portion of a database, however organized. As such, the protocols describes herein can be used for system (database-wide) replication, where the "database table" is in effect the entire database system. Similarly, when the "database table" is a defined section of the entire database system, e.g., one of multiple tables in the database system, the protocols can be applied on a table-by-table basis. In this context, table replication can be selectively applied on a table-by-table basis, such that some tables are replicated while others are not replicated.

In further implementations, the database table may be partitioned, such as being partitioned among multiple source nodes, multiple replica nodes, or multiple source nodes and multiple replica nodes. In some cases, one or both of the source node and the replica node hold a partition of the table, with the other holding the entire table. In other cases, both the source and replica hold partitions of the table, which partitions may be the same or different.

In many of the examples describes above, a source node replicates data with a replica node. The terms "source node" and "replica node" denote roles in the table replication process. Depending on configuration, a given node may be a source node for some table replication operations (e.g., for a first table or set of tables) and a replica node for other table replication operations (e.g., for a second table or set of tables).

Example 18

Computing Systems

Figure 23:
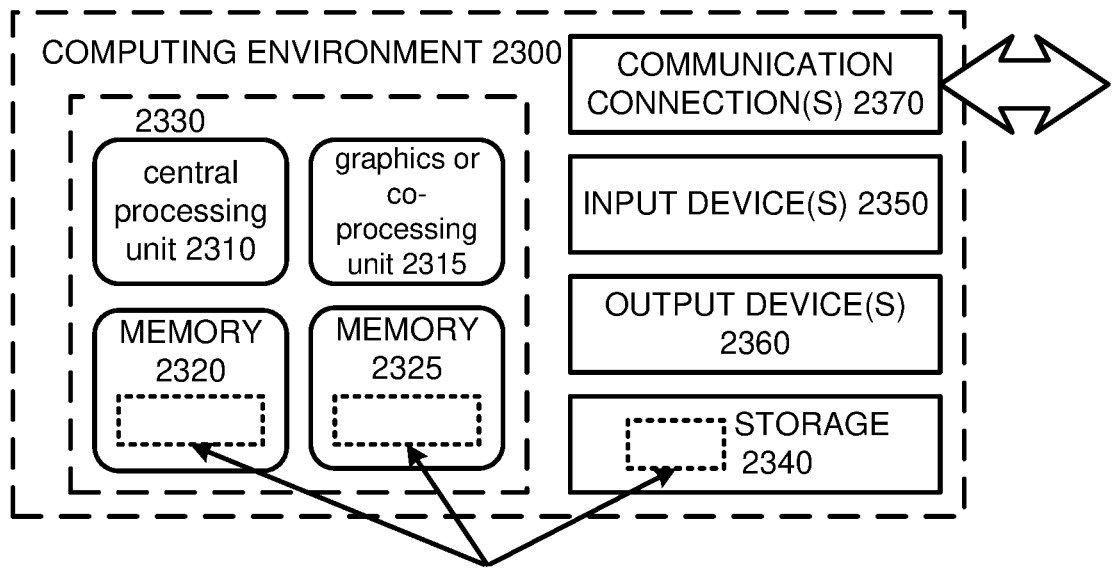
FIG. 23 is a diagram of an example computing system in which some described embodiments can be implemented.

FIG. 23 depicts a generalized example of a suitable computing system 2300 in which the described innovations may be implemented. The computing system 2300 is not intended to suggest any limitation as to scope of use or functionality of the present disclosure, as the innovations may be implemented in diverse general-purpose or special-purpose computing systems.

With reference to FIG. 23, the computing system 2300 includes one or more processing units 2310, 2315 and memory 2320, 2325. In FIG. 23, this basic configuration 2330 is included within a dashed line. The processing units 2310, 2315 execute computer-executable instructions. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 23 shows a central processing unit 2310 as well as a graphics processing unit or co-processing unit 2315. The tangible memory 2320, 2325 may be volatile memory (e.g., registers, cache, RAM), nonvolatile memory (e.g., ROM, EEPROM, flash memory, etc.), or some combination of the two, accessible by the processing unit(s). The memory 2320, 2325 stores software 2380 implementing one or more innovations described herein, in the form of computer-executable instructions suitable for execution by the processing unit(s) 2310, 2315.

A computing system 2300 may have additional features. For example, the computing system 2300 includes storage 2340, one or more input devices 2350, one or more output devices 2360, and one or more communication connections 2370. An interconnection mechanism (not shown) such as a bus, controller, or network interconnects the components of the computing system 2300. Typically, operating system software (not shown) provides an operating environment for other software executing in the computing system 2300, and coordinates activities of the components of the computing system 2300.

The tangible storage 2340 may be removable or non-removable, and includes magnetic disks, magnetic tapes or cassettes, CD-ROMs, DVDs, or any other medium which can be used to store information in a non-transitory way and which can be accessed within the computing system 2300. The storage 2340 stores instructions for the software 2380 implementing one or more innovations described herein.

The input device(s) 2350 may be a touch input device such as a keyboard, mouse, pen, or trackball, a voice input device, a scanning device, or another device that provides input to the computing system 2300. The output device(s) 2360 may be a display, printer, speaker, CD-writer, or another device that provides output from the computing system 2300.

The communication connection(s) 2370 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general purpose program, such as one or more lines of code in a larger or general purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 19

Cloud Computing Environment

Figure 24:
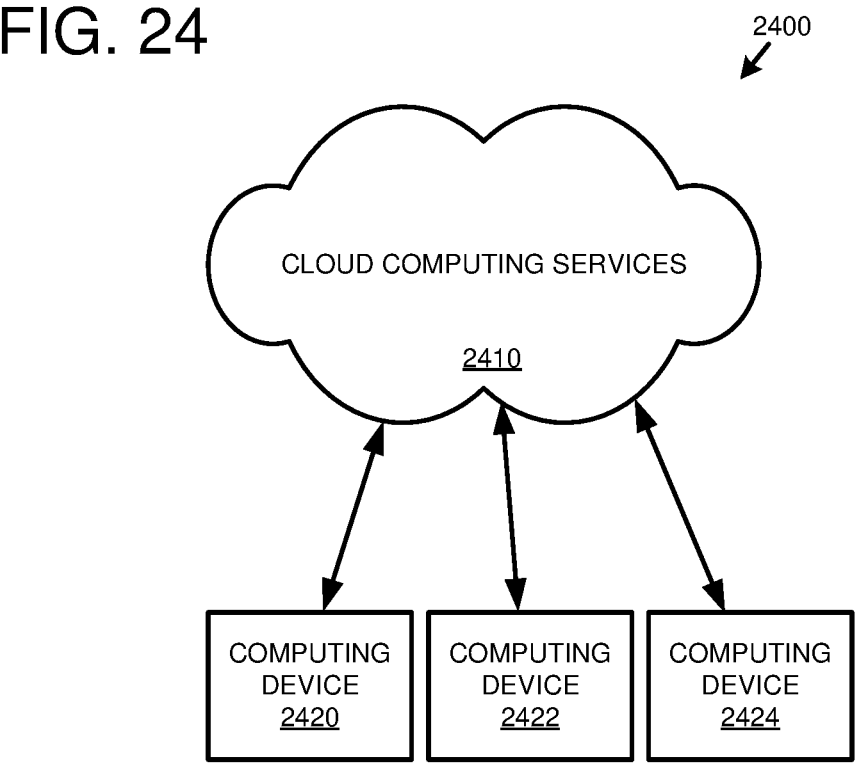
FIG. 24 is an example cloud computing environment that can be used in conjunction with the technologies described herein.

FIG. 24 depicts an example cloud computing environment 2400 in which the described technologies can be implemented. The cloud computing environment 2400 comprises cloud computing services 2410. The cloud computing services 2410 can comprise various types of cloud computing resources, such as computer servers, data storage repositories, networking resources, etc. The cloud computing services 2410 can be centrally located (e.g., provided by a data center of a business or organization) or distributed (e.g., provided by various computing resources located at different locations, such as different data centers and/or located in different cities or countries).

The cloud computing services 2410 are utilized by various types of computing devices (e.g., client computing devices), such as computing devices 2420, 2422, and 2424. For example, the computing devices (e.g., 2420, 2422, and 2424) can be computers (e.g., desktop or laptop computers), mobile devices (e.g., tablet computers or smart phones), or other types of computing devices. For example, the computing devices (e.g., 2420, 2422, and 2424) can utilize the cloud computing services 2410 to perform computing operations (e.g., data processing, data storage, and the like).

Example 20

Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 23, computer-readable storage media include memory 2320 and 2325, and storage 2340. The term computer-readable storage media does not include signals and carrier waves. In addition, the term computer-readable storage media does not include communication connections (e.g., 2370).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Python, Ruby, ABAP, SQL, Adobe Flash, or any other suitable programming language, or, in some examples, markup languages such as html or XML, or combinations of suitable programming languages and markup languages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computing system comprising:
   at least one hardware processor;
   at least one memory coupled to the at least one hardware processor; and
   one or more computer-readable storage media storing computer-executable instructions that, when executed, cause the computing system to perform operations comprising:
   at a node of a database system comprising a plurality of nodes, the plurality of nodes comprising at least one source node and at least one replica node, receiving a prepared statement from a database client, the prepared statement specifying one or more nodes of the database system useable to execute the prepared statement;
   at the node, updating the prepared statement to provide an updated prepared statement, the updating comprising adding a node to the one or more nodes in the prepared statement, or removing at least one of the one or more nodes in the prepared statement, depending on a type of availability status change of the replica node, wherein the type of availability status change of the replica node is (1) the replica node becoming unavailable and the updating the prepared statement comprises not including the replica node in the updated prepared statement; or (2) the replica node becoming available and the updating the prepared statement comprises including the replica node in the updated prepared statement; and at the node, sending the updated prepared statement to the database client.

2. The computing system of claim 1, wherein the type of availability status change of the replica node comprises the replica node becoming unavailable and the updating the prepared statement comprises not including the replica node in the updated prepared statement.

3. The computing system of claim 1, wherein the type of availability status change of the replica node comprises the replica node becoming available and the updating the prepared statement comprises including the replica node in the updated prepared statement.

4. The computing system of claim 1, the operations further comprising:
at the node, in response to determining that the availability status of the replica node has changed, incrementing an identifier maintained by the node;
at the node, comparing the incremented identifier with a version timestamp associated with the prepared statement; and
at the node, determining that the version timestamp identifier is associated with an earlier state of the database system than a state of the database system associated with the incremented identifier;
wherein the updating is carried out in response to determining that the version timestamp identifier is associated with an earlier state of the database system.

5. The computing system of claim 1, wherein the availability status change of the replica node comprises the replica node being unavailable and the updating the prepared statement comprises specifying that the prepared statement should be executed at the source database system node.

6. The computing system of claim 1, wherein the availability status change of the replica node comprises the replica node being unavailable, the replica node is a first replica node, and the updating the prepared statement comprises specifying that the updated prepared statement may be executed at the source database system node and at least a second replica node.

7. The computing system of claim 1, the operations further comprising:
determining that the availability status of the replica node has changed by determining that a portion of data replicated at the replica node is not available, a portion of the replicated data remains available, and updating the prepared statement comprises:
at the node, determining data accessed by the prepared statement;
at the node, determining whether data accessed by the prepared statement includes the portion of data replicated at the replica node that is not available; and
at the node, when data accessed by the prepared statement is not available at the replica node, not including the replica node in the updated prepared statement.

8. The computing system of claim 1, the operations further comprising:
determining that the availability status of the replica node has changed by determining that a portion of data replicated at the replica node is not available, a portion of the replicated data remains available, and updating the prepared statement comprises:
at the node, determining data accessed by the prepared statement;
at the node, determining whether data accessed by the prepared statement includes the portion of data replicated at the replica node that is not available; and
at the node, when data accessed by the prepared statement is available at the replica node, including the replica node in the updated prepared statement.

9. The computing system of claim 1, the operations further comprising:
updating a node status store to indicate the change in status of the replica node.

10. The computing system of claim 9, wherein the node status store maintains status information for at least a portion of the database system nodes, wherein each node is indicated as active or inactive, and updating the prepared statement comprising updating the prepared statement based on nodes having an active status.

11. The computing system of claim 1, wherein the operations are performed at the source node, the replica node is a first replica node, and the database system further comprises at least a second replica node, the operations further comprising:
at the source node, receiving a request to commit a database transaction, the database transaction comprising one or more database operations to be replicated at least at the at least a second replica node;
at the source node, beginning a process to commit the database transaction;
at the source node, marking the status of the first replica node as inactive; and
at the source node, after marking the status of the first replica node as inactive, committing the transaction.

12. The computing system of claim 11, the operations further comprising:
at the source node, receiving a communication from the at least a second replica node that the at least a second replica node marked the first replica node as inactive, wherein the committing occurs after receiving the communication.

13. The computing system of claim 11, the operations further comprising:
at the source node, incrementing a first identifier maintained by the source node; and
at the source node, receiving a notification that the at least a second replica node has incremented a second identifier; wherein the first and second identifiers are useable to invalidate prepared statements maintained by the database client and the committing occurs after the incrementing and receiving the notification.

14. A computing system comprising:
at least one hardware processor;
at least one memory coupled to the at least one hardware processor; and
one or more computer-readable storage media storing computer-executable instructions that, when executed, cause the computing system to perform operations comprising:
at a database system client, sending a request to a database system node to prepare a statement, the database system node being part of a database system comprising a plurality of database system nodes, at least one of the database system nodes being a source node and at least one of the database system nodes being a replica node;

at the database system client, receiving a prepared statement from the database system node, the prepared statement specifying at least one database system node on which the prepared statement is executable;

at the database system client, sending the prepared statement to the at least one database system node specified in the prepared statement; and at the database system client, receiving an updated prepared statement, the updated prepared statement specifying one or more database system nodes on which the updated prepared statement is executable, the one or more database system nodes (1) comprising a database system node that was not the at least one database system node specified in the prepared statement, or (2) not comprising the at least one database system node specified in the prepared statement.

15. The computing system of claim 14, the operations further comprising:

at the database system client, sending the updated prepared statement to a database system node of the one or more database system nodes specified in the updated prepared statement for execution; and at the database system client, receiving execution results.

16. A computing system comprising:

at least one hardware processor;

at least one memory coupled to the at least one hardware processor; and one or more computer-readable storage media storing computer-executable instructions that, when executed, cause the computing system to perform operations comprising:

at a database system node of a replicated database, determining that an availability status of a replica node of a replicated database environment has changed, wherein the database system node stores at least one database table and the replicated database environment comprises a plurality of database system nodes, including the database system node and the replica node, and in communication with a database client, wherein an availability status change of the replica node is (1) the replica node becoming unavailable; or (2) the replica node becoming available;

at the database system node, recording the availability status change in a data store comprising availability status information for nodes of the replicated database system;

at the database system node, incrementing a metadata identifier;

at the database system node, receiving a prepared statement from the database client, the prepared statement associated with a version timestamp;

at the database system node, comparing the incremented metadata identifier with the version timestamp;

at the database system node, determining that the prepared statement should be updated;

at the database system node, updating the prepared statement using the availability status information of the data store; and at the database system node, sending the updated prepared statement to the database client.

17. The computing system of claim 16, wherein determining that an availability status of a replica node of the replicated database environment has changed comprises determining at least one replicated table that is not accessible at the replica node and recording the availability status change in the data store comprises recording that the at least one replicated table is not available at the replica node.

18. The computing system of claim 17, wherein, after the recording, the data store comprises at least one replicated table that is accessible at the replica node.

19. The computing system of claim 18, wherein updating the prepared statement comprises comparing tables accessed by the prepared statement with accessible tables recorded in the data store.

20. The computing system of claim 16, the operations further comprising:

at the database system node, associating the incremented metadata identifier with the updated prepared statement.

21. One or more computer-readable storage media comprising:

computer-executable instructions that, when executed by a computing system comprising at least hardware processor and at least one memory coupled to the at least one hardware processor, cause the computing system to, at a node of a database system comprising a plurality of nodes, the plurality of nodes comprising at least one source node and at least one replica node, receive a prepared statement from a database client, the prepared statement specifying one or more nodes of the database system useable to execute the prepared statement;

computer-executable instructions that, when executed by the computing system, cause the computing system to update the prepared statement to provide an updated prepared statement, the updating comprising adding a node to the one or more nodes in the prepared statement, or removing at least one of the one or more nodes in the prepared statement, depending on a type of availability status change of the replica node, wherein the type of availability status change of the replica node is (1) the replica node becoming unavailable and the updating the prepared statement comprises not including the replica node in the updated prepared statement; or (2) the replica node becoming available and the updating the prepared statement comprises including the replica node in the updated prepared statement; and computer-executable instructions that, when executed by the computing system, cause the computing system to, at the node, send the updated prepared statement to the database client.

22. The one or more computer-readable storage media of claim 21, wherein the type of availability status change of the replica node comprises the replica node becoming unavailable and the computer-executable instructions that cause the computing system to update the prepared statement comprise computer-executable instructions that, when executed by the computing system, cause the computing system to not include the replica node in the updated prepared statement.

23. The one or more computer-readable storage media of claim 21, wherein the type of availability status change of the replica node comprises the replica node becoming available and the computer-executable instructions that cause the computing system to update the prepared statement comprise computer-executable instructions that, when executed by the computing system, cause the computing system to include the replica node in the updated prepared statement.

24. The one or more computer-readable storage media of claim 21, further comprising:
computer-executable instructions that, when executed by the computing system, cause the computing system to, at the node, in response to determining that the availability status of the replica node has changed, increment an identifier maintained by the node;
computer-executable instructions that, when executed by the computing system, cause the computing system to, at the node, compare the incremented identifier with a version timestamp associated with the prepared statement; and
computer-executable instructions that, when executed by the computing system, cause the computing system to, at the node, determine that the version timestamp identifier is associated with an earlier state of the database system than a state of the database system associated with the incremented identifier;
wherein the computer-executable instructions that cause the computing system to update the prepared statements are executed in response to determining that the version timestamp identifier is associated with an earlier state of the database system.

25. The one or more computer-readable storage media of claim 21, wherein the availability status change of the replica node comprises the replica node being unavailable and the computer-executable instructions that cause the computing system to update the prepared statement comprise computer-executable instructions that, when executed by the computing system, cause the computing system to specify that the prepared statement should be executed at the source database system node.

26. The one or more computer-readable storage media of claim 21, wherein the availability status change of the replica node comprises the replica node being unavailable, the replica node is a first replica node, and the computer-executable instructions that cause the computing system to update the prepared statement comprise computer-executable instructions that, when executed by the computing system, cause the computing system to specify that the updated prepared statement may be executed at the source database system node and at least a second replica node.

27. The one or more computer-readable storage media of claim 21, further comprising:
computer-executable instructions that cause the computing system to determine that the availability status of the replica node has changed by at the node, determining that a portion of data replicated at the replica node is not available, a portion of the replicated data remains available, and the computer-executable instructions that cause the computing system to update the prepared statement comprise:
computer-executable instructions that, when executed by the computing system, cause the computing system to, at the node, determine data accessed by the prepared statement;
computer-executable instructions that, when executed by the computing system, cause the computing system to, at the node, determine whether data accessed by the prepared statement includes the portion of data replicated at the replica node that is not available; and
computer-executable instructions that, when executed by the computing system, cause the computing system to, at the node, when data accessed by the prepared statement is not available at the replica node, not include the replica node in the updated prepared statement.

28. The one or more computer-readable storage media of claim 21, further comprising:
computer-executable instructions that cause the computing system to determine that the availability status of the replica node has changed by, at the node, determining that a portion of data replicated at the replica node is not available, a portion of the replicated data remains available, and the computer-executable instructions that cause the computing system to update the prepared statement comprise:
computer-executable instructions that, when executed by the computing system, cause the computing system to, at the node, determine data accessed by the prepared statement;
computer-executable instructions that, when executed by the computing system, cause the computing system to, at the node, determine whether data accessed by the prepared statement includes the portion of data replicated at the replica node that is not available; and
computer-executable instructions that, when executed by the computing system, cause the computing system to, at the node, when data accessed by the prepared statement is available at the replica node, include the replica node in the updated prepared statement.

29. The one or more computer-readable storage media of claim 21, further comprising:
computer-executable instructions that, when executed by the computing system, cause the computing system to, at the node, update a node status store to indicate the change of the replica node.

30. The one or more computer-readable storage media of claim 29, wherein the node status store maintains status information for at least a portion of the database system nodes, wherein each node is indicated as active or inactive, and the computer-executable instructions that cause the computing system to update the prepared statement comprise computer-executable instructions that, when executed by the computing system, cause the computing system to, at the node, update the prepared statement based on nodes having an active status.

31. The one or more computer-readable storage media of claim 21, wherein the node is the source node, the replica node is a first replica node, and the database system further comprises at least a second replica node, further comprising:
computer-executable instructions that, when executed by the computing system, cause the computing system to, at the source node, receive a request to commit a database transaction, the database transaction comprising one or more database operations to be replicated at least at the at least a second replica node;
computer-executable instructions that, when executed by the computing system, cause the computing system to, at the source node, begin a process to commit the database transaction;
computer-executable instructions that, when executed by the computing system, cause the computing system to, at the source node, mark the status of the first replica node as inactive; and
computer-executable instructions that, when executed by the computing system, cause the computing system to, at the source node, after marking the status of the first replica node as inactive, commit the transaction.

32. The one or more computer-readable storage media of claim 31, further comprising computer-executable instructions that, when executed by the computing system, cause the computing system to, at the source node, receive a communication from the at least a second replica node that the at least a second replica node marked the first replica node as inactive, wherein the committing occurs after receiving the communication.

33. The one or more computer-readable storage media of claim 31, further comprising:
   computer-executable instructions that, when executed by the computing system, cause the computing system to, at the source node, increment a first identifier maintained by the source node; and
   computer-executable instructions that, when executed by the computing system, cause the computing system to, at the source node, receive a notification that the at least a second replica node has incremented a second identifier; wherein the first and second identifiers are useable to invalidate prepared statements maintained by the database client and the committing occurs after the incrementing and receiving the notification.

34. One or more computer-readable storage media comprising:
   computer-executable instructions that, when executed by a computing system comprising at least one hardware processor and at least one memory coupled to the at least one hardware processor, cause the computing system to, at a database system client, send a request to a database system node to prepare a statement, the database system node being part of a database system comprising a plurality of database system nodes, at least one of the database system nodes being a source node and at least one of the database system nodes being a replica node;
   computer-executable instructions that, when executed by the computing system, cause the computing system to, at the database system client, receive a prepared statement from the database system node, the prepared statement specifying at least one database system node on which the prepared statement is executable;
   computer-executable instructions that, when executed by the computing system, cause the computing system to, at the database system client, send the prepared statement to the at least one database system node specified in the prepared statement; and
   computer-executable instructions that, when executed by the computing system, cause the computing system to, at the database system client, receive an updated prepared statement, the updated prepared statement specifying one or more database system nodes on which the updated prepared statement is executable, the one or more database system nodes comprising (1) a database system node that was not the at least one database system node specified in the prepared statement, or (2) no comprising the at least one database system node specified in the prepared statement.

35. The one or more computer-readable storage media of claim 34, further comprising:
   computer-executable instructions that, when executed by the computing system, cause the computing system to, at the database system client, send the updated prepared statement to a database system node of the one or more database system nodes specified in the updated prepared statement for execution; and
   computer-executable instructions that, when executed by the computing system, cause the computing system to, at the database system client, receive execution results.

36. A method, implemented in a computing system comprising at least one hardware processor and at least one memory coupled to the at least one hardware processor, the method comprising:
   at a database system node of a replicated database, determining that an availability status of a replica node of a replicated database environment has changed, wherein the database system node stores at least one database table and the replicated database environment comprises a plurality of database system nodes, including the database system node and the replica node, and in communication with a database client, wherein an availability status change of the replica node is (1) the replica node becoming unavailable; or (2) the replica node becoming available;
   at the database system node, recording the availability status change in a data store comprising availability status information for nodes of the replicated database system;
   at the database system node, incrementing a metadata identifier;
   at the database system node, receiving a prepared statement from the database client, the prepared statement associated with a version timestamp;
   at the database system node, comparing the incremented metadata identifier with the version timestamp;
   at the database system node, determining that the prepared statement should be updated;
   at the database system node, updating the prepared statement using the availability status information of the data store; and
   at the database system node, sending the updated prepared statement to the database client.

37. The method of claim 36, wherein determining that an availability status of a replica node of the replicated database environment has changed comprises determining at least one replicated table that is not accessible at the replica node and recording the availability status change in the data store comprises recording that the at least one replicated table is not available at the replica node.

38. The method of claim 37, wherein, after the recording, the data store comprises at least one replicated table that is accessible at the replica node.

39. The method of claim 38, wherein updating the prepared statement comprises comparing tables accessed by the prepared statement with accessible tables recorded in the data store.

40. The method of claim 36, the method further comprising:
   at the database system node, associating the incremented metadata identifier with the updated prepared statement.

* * * * *